(12) United States Patent
Shigeta et al.

(10) Patent No.: US 10,976,828 B2
(45) Date of Patent: *Apr. 13, 2021

(54) INFORMATION PROCESSING APPARATUS AND INFORMATION PROCESSING METHOD TO REDUCE USER BURDEN

(71) Applicant: SONY CORPORATION, Tokyo (JP)

(72) Inventors: Osamu Shigeta, Chiba (JP); Seiji Suzuki, Kanagawa (JP); Kentaro Ida, Tokyo (JP); Yousuke Kawana, Tokyo (JP); Takuya Ikeda, Tokyo (JP); Maki Imoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 16/313,561

(22) PCT Filed: Apr. 14, 2017

(86) PCT No.: PCT/JP2017/015271
§ 371 (c)(1),
(2) Date: Dec. 27, 2018

(87) PCT Pub. No.: WO2018/008225
PCT Pub. Date: Jan. 11, 2018

(65) Prior Publication Data
US 2019/0243460 A1 Aug. 8, 2019

(30) Foreign Application Priority Data
Jul. 5, 2016 (JP) .................. 2016-133482

(51) Int. Cl.
*G06F 3/01* (2006.01)
*G06F 3/0482* (2013.01)
(Continued)

(52) U.S. Cl.
CPC .............. *G06F 3/017* (2013.01); *G06F 3/011* (2013.01); *G06F 3/013* (2013.01); *G06F 3/0304* (2013.01);
(Continued)

(58) Field of Classification Search
None
See application file for complete search history.

(56) References Cited

U.S. PATENT DOCUMENTS 6,353,764 B1 3/2002 Imagawa et al.
9,342,921 B2 * 5/2016 Konami .................. G06T 15/08
(Continued)

FOREIGN PATENT DOCUMENTS

CN 1223391 A 7/1999
DE 69830295 T2 10/2005
(Continued)

OTHER PUBLICATIONS

International Search Report and Written Opinion of PCT Application No. PCT/JP2017/015271, dated Jun. 13, 2017, 09 pages of ISRWO.

*Primary Examiner* — David D Davis
(74) *Attorney, Agent, or Firm* — Chip Law Group

(57) ABSTRACT

An information processing apparatus includes a display control unit that controls display of selection objects related to devices to be operated, which have been selected through first device selection based on information from which a form of a body of an operation subject directed to the devices to be operated is estimated and a device control unit that controls the devices to be operated, which have been selected through second device selection based on information related to a selecting operation performed by the operation subject to the selection objects.

18 Claims, 60 Drawing Sheets

(51) Int. Cl.
*G06F 3/03* (2006.01)
*G06F 3/042* (2006.01)
*G06F 3/0484* (2013.01)

(52) U.S. Cl.
CPC .......... *G06F 3/0425* (2013.01); *G06F 3/0482* (2013.01); *G06F 3/04842* (2013.01)

(56) References Cited

U.S. PATENT DOCUMENTS

| | | | | |
|---|---|---|---|---|
| 2014/0225824 A1* | 8/2014 | Shpunt | .................. | G06F 3/0488 345/156 |
| 2015/0145830 A1* | 5/2015 | Kim | ....................... | G08C 17/00 345/175 |
| 2016/0050173 A1* | 2/2016 | Nakamura | ......... | H04N 1/00103 709/206 |
| 2019/0324526 A1* | 10/2019 | Suzuki | .................... | G06F 3/011 |

FOREIGN PATENT DOCUMENTS

| | | |
|---|---|---|
| EP | 0919906 A2 | 6/1996 |
| JP | 2004-303251 A | 10/2004 |
| JP | 2009-223490 A | 10/2009 |
| JP | 2010-224767 A | 10/2010 |
| JP | 2012-006552 A | 1/2012 |
| JP | 2013-105203 A | 5/2013 |
| JP | 2015-090547 A | 5/2015 |
| TW | 494308 B | 7/2002 |

\* cited by examiner

FIG. 32
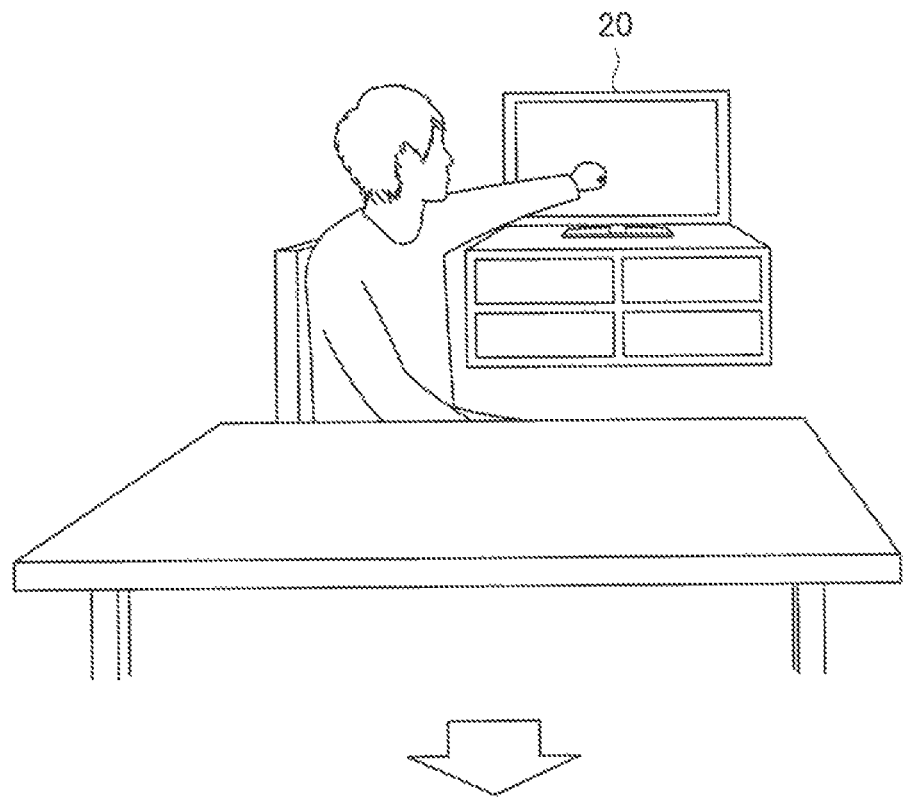
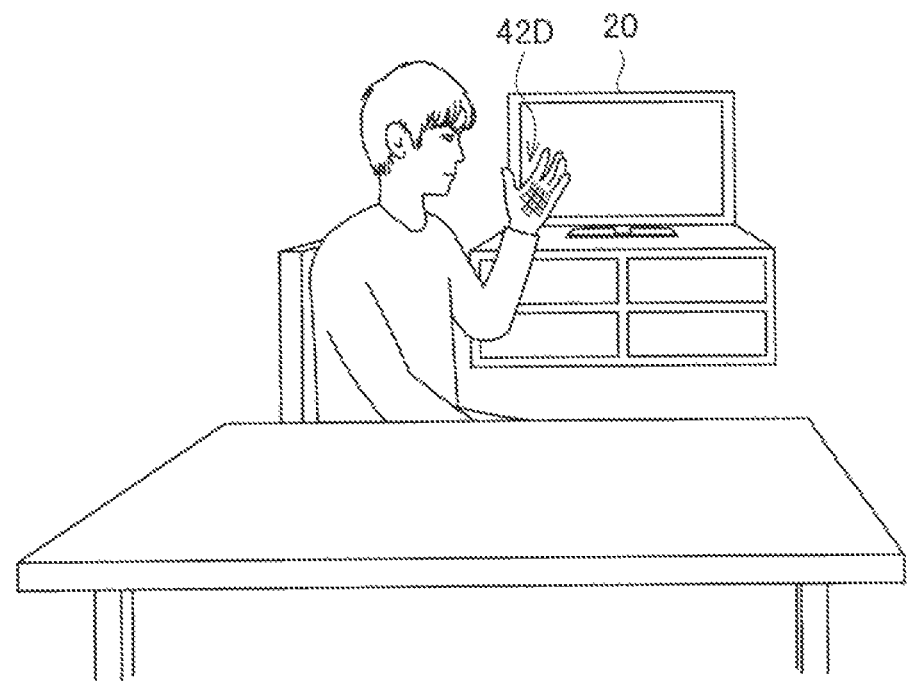

FIG. 37
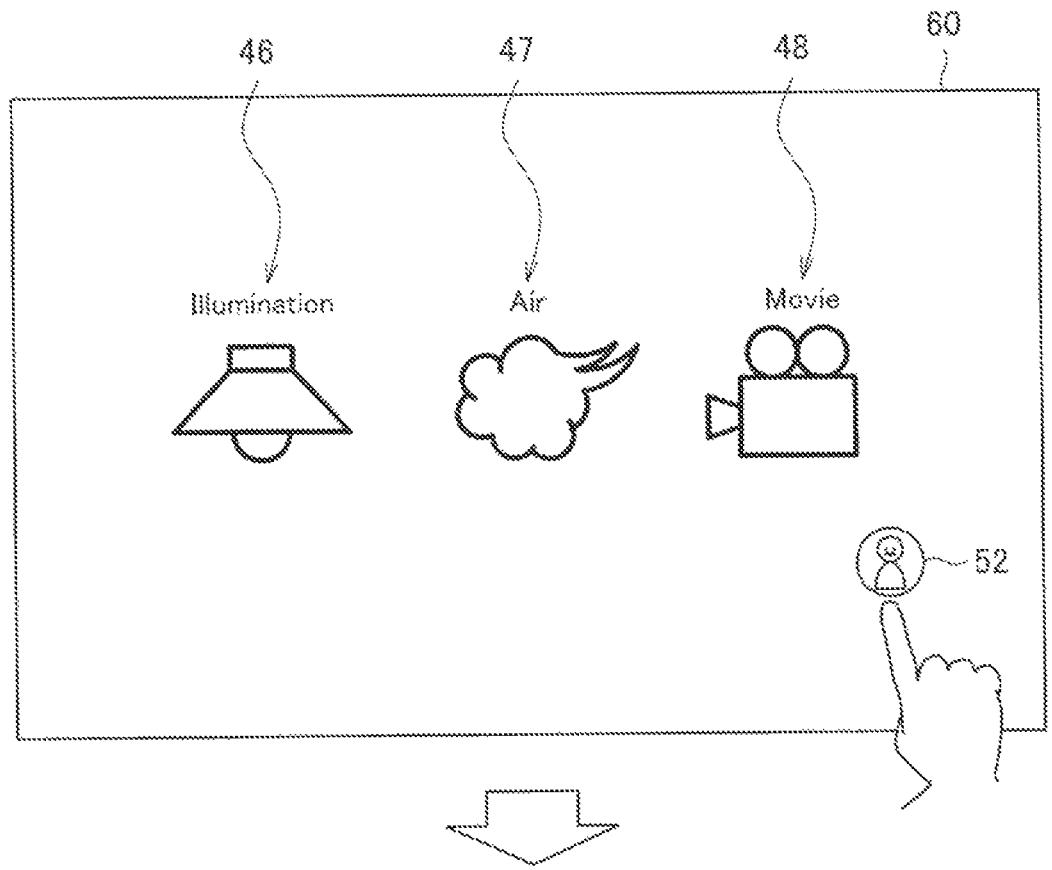
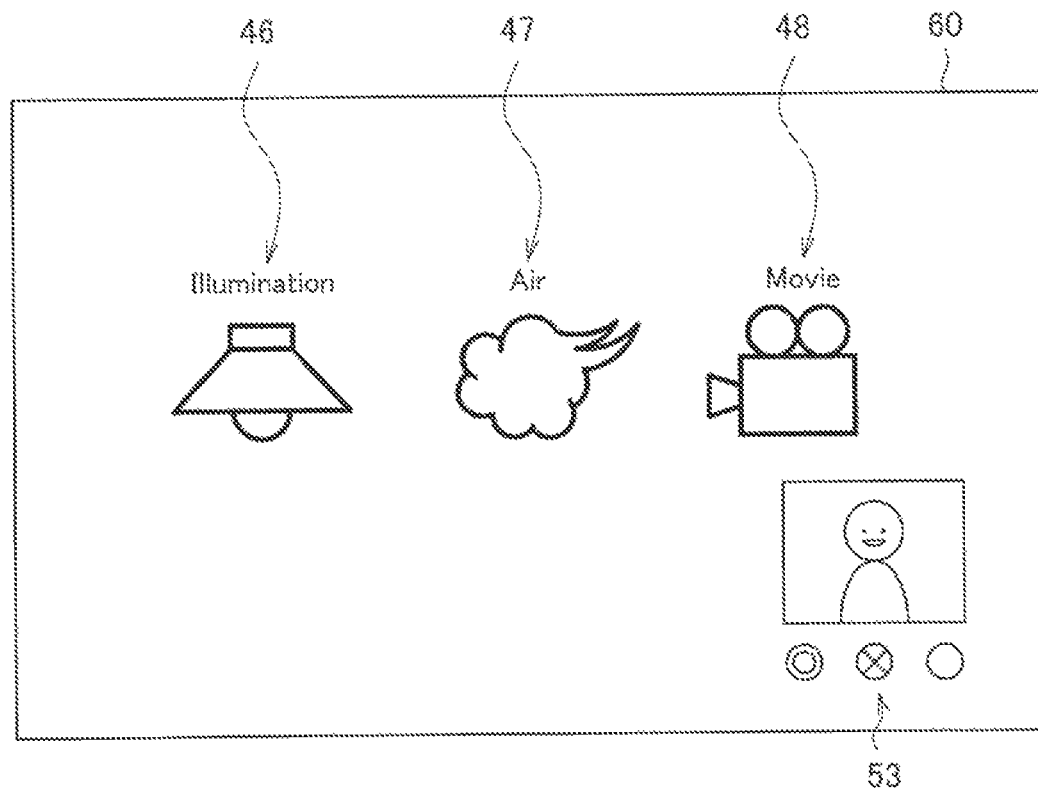

FIG. 46
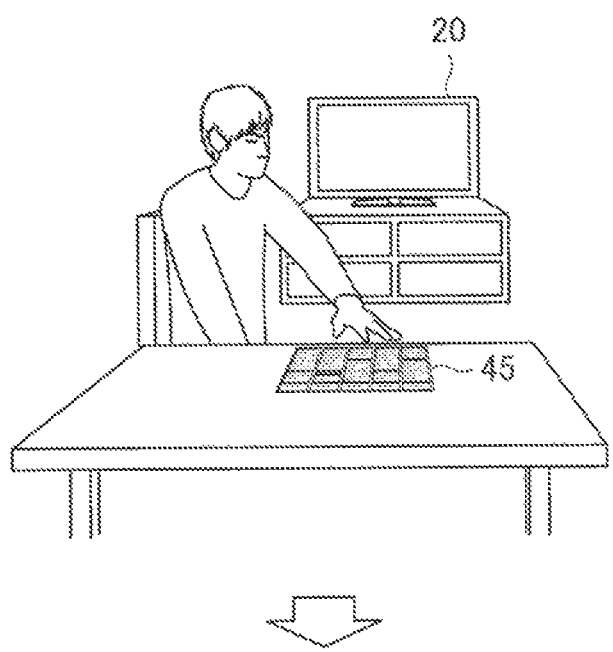
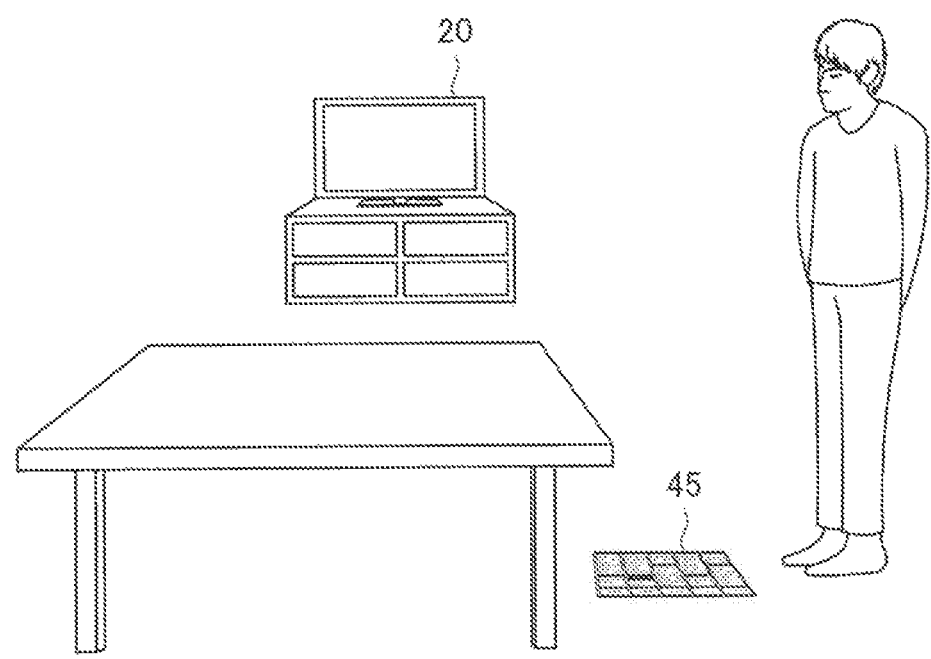

FIG. 50
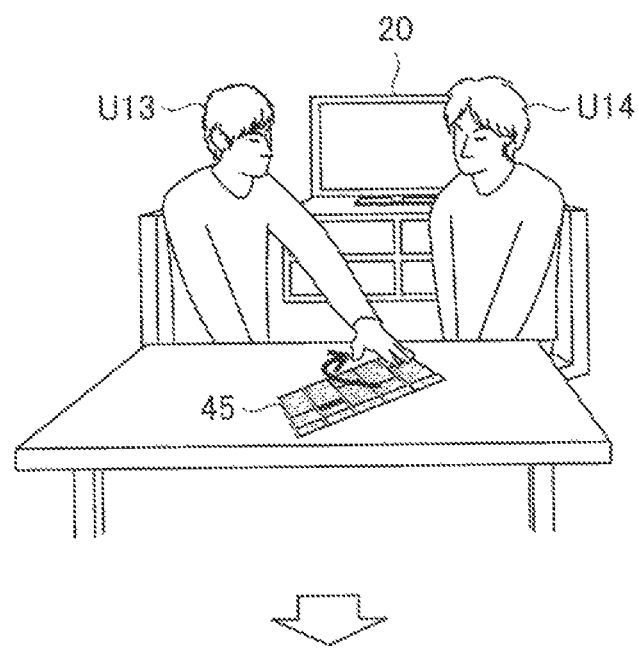
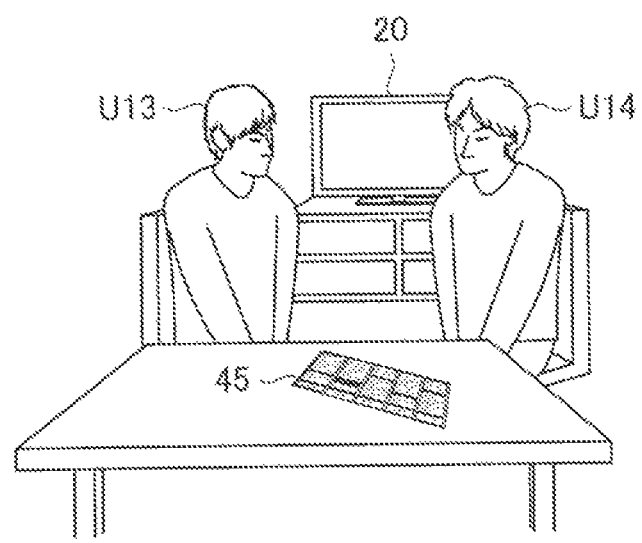

FIG. 51
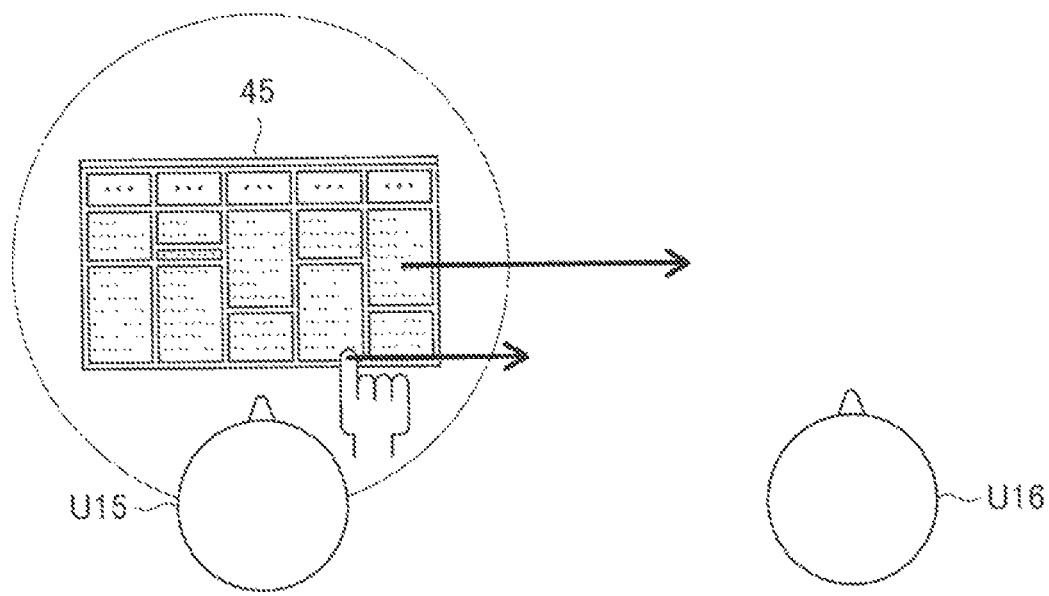
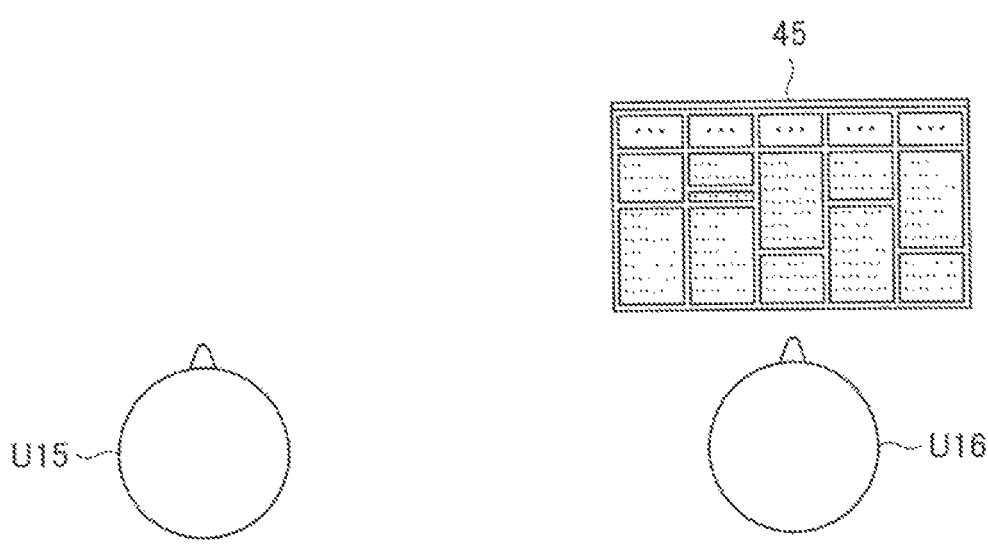

FIG. 54
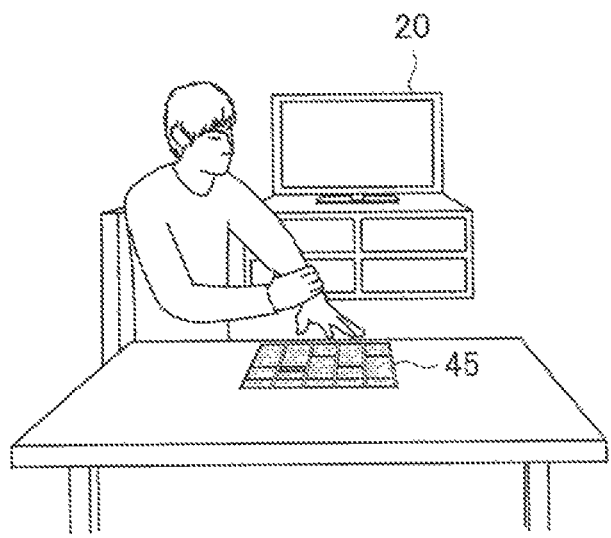
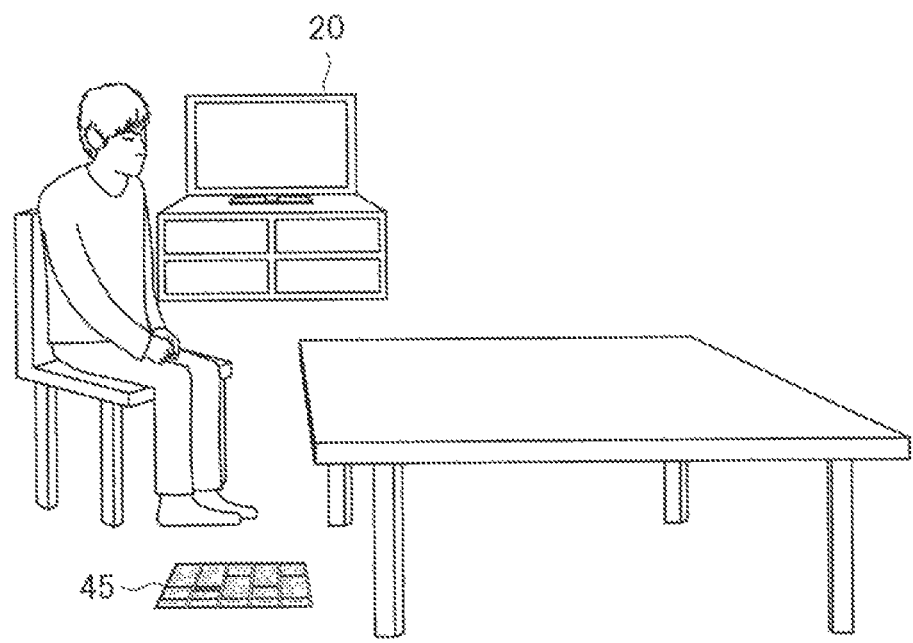

FIG. 57
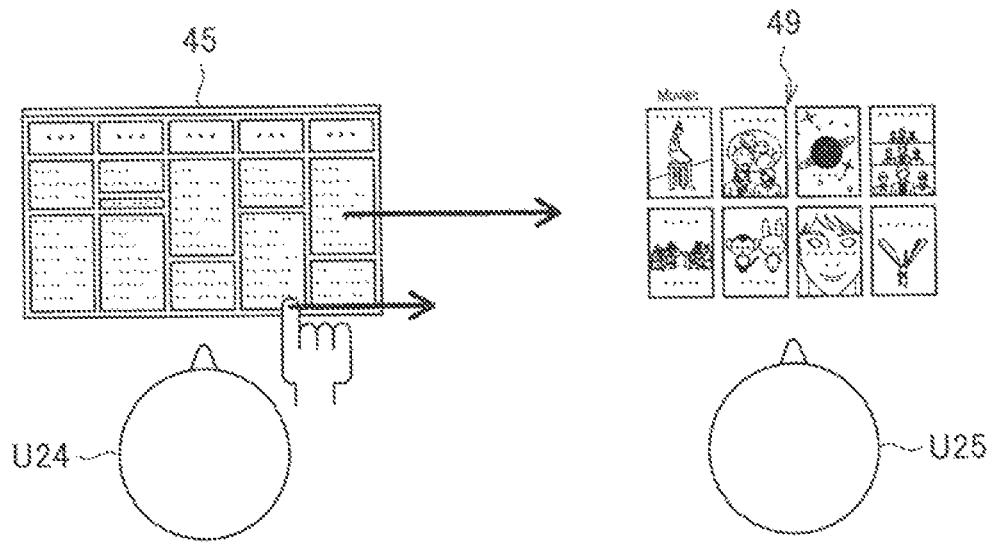
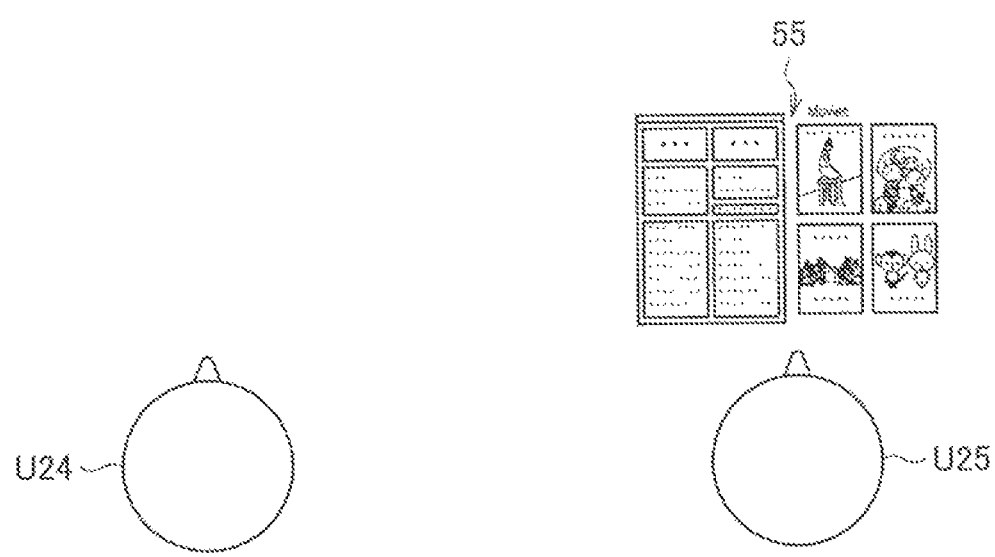

FIG. 58
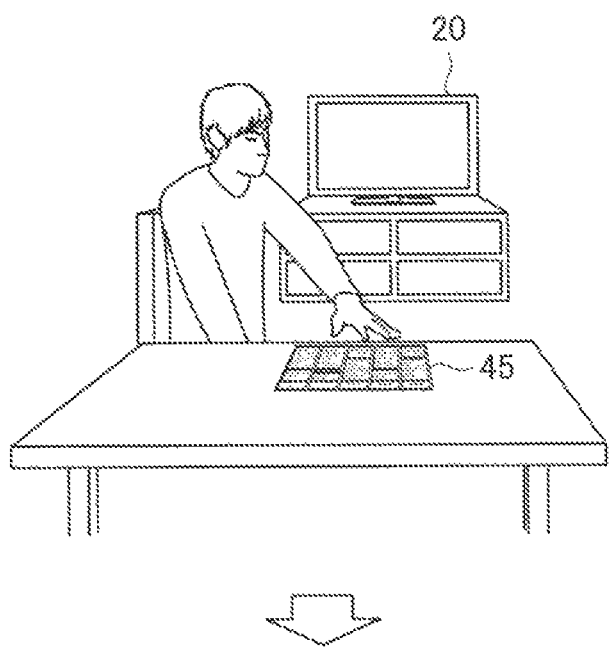
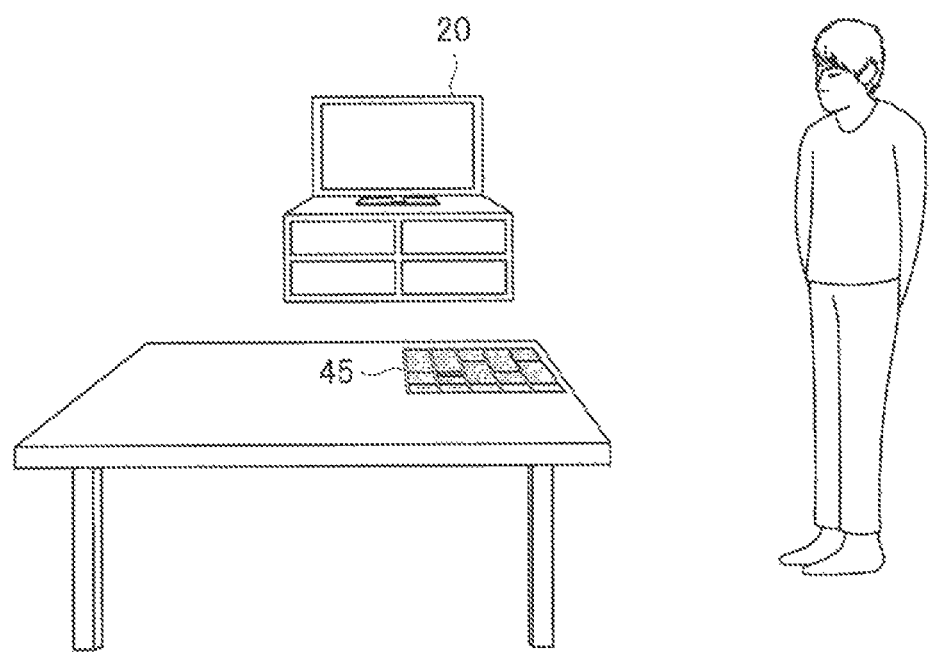

INFORMATION PROCESSING APPARATUS AND INFORMATION PROCESSING METHOD TO REDUCE USER BURDEN

CROSS REFERENCE TO RELATED APPLICATIONS

This application is a U.S. National Phase of International Patent Application No. PCT/JP2017/015271 filed on Apr. 14, 2017, which claims priority benefit of Japanese Patent Application No. JP 2016-133482 filed in the Japan Patent Office on Jul. 5, 2016. Each of the above-referenced applications is hereby incorporated herein by reference in its entirety.

TECHNICAL FIELD

The present disclosure relates to an information processing apparatus, an information processing method, and a program.

BACKGROUND ART

In recent years, a variety of interfaces for controlling devices have been researched and developed with the development of information communication technologies. There are roughly two types of interface as such interfaces. One is a first interface in a form in which a user operates an operation target device in contact with or in proximity to the operation target device. The other is a second interface in a form in which a user operates an operation target device in a remote manner. According to the first interface, the device is controlled by a user's touching operation, button pressing operation, or the like, for example. Meanwhile, according to the second interface, the device is controlled by a user's gesture operation, remote controller operation, or the like, for example.

For example, an invention related to an information input apparatus that provides a user interface in accordance with a distance between a user and an input device is disclosed in Patent Literature 1. For example, a touch operation performed to a touch panel is provided for a short distance, a gesture operation is provided for an intermediate distance, and an operation using a remote controller is provided for a long distance.

CITATION LIST

Patent Literature

Patent Literature 1: JP 2015-90547A

SUMMARY OF INVENTION

Technical Problem

However, there is a concern that selection of an operation target device (hereinafter, also referred to as a device to be operated) may become a burden on the user in the conventional technology. According to the aforementioned first interface, for example, the user has to move to a device that the user desires to operate. According to the aforementioned second interface, it may be difficult for the user to select a device that the user desires to operate in a case of employing a gesture operation, for example, and when there are a plurality of devices with respect to which a gesture operation can be performed. Also, in a case of employing an operation using a remote controller, for example, the user has to find a remote controller for a device that the user desires to operate from among a plurality of remote controllers. In particular, the user may forget the location where the user has placed the remote controller in many cases, and it may take a long time to start the operation of the device. Thus, the present disclosure proposes a mechanism capable of reducing a burden on the user for selecting a device to be operated that the user desires to operate.

Solution to Problem

According to the present disclosure, there is provided an information processing apparatus including: a display control unit that controls display of selection objects related to devices to be operated, which have been selected through first device selection based on information from which a form of a body of an operation subject directed to the devices to be operated is estimated; and a device control unit that controls the devices to be operated, which have been selected through second device selection based on information related to a selecting operation performed by the operation subject to the selection objects.

In addition, according to the present disclosure, there is provided an information processing method including, by using a processor: controlling display of selection objects related to devices to be operated, which have been selected through first device selection based on information from which a form of a body of an operation subject directed to the devices to be operated is estimated; and controlling the devices to be operated, which have been selected through second device selection based on information related to a selecting operation performed by the operation subject to the selection objects.

In addition, according to the present disclosure, there is provided a program that is for causing a computer system to realize: a display control function that controls display of selection objects related to devices to be operated, which have been selected through first device selection based on information from which a form of a body of an operation subject directed to the devices to be operated is estimated; and a device control function that controls devices to be operated, which have been selected through second device selection based on information related to a selecting operation performed by the operation subject to the selection objects.

Advantageous Effects of Invention

According to the present disclosure, a mechanism capable of reducing a burden on a user for selecting a device to be operated that the user desires to operate as described above is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 32 is a diagram illustrating another example of the display control for the operation objects in the information processing system according to a fifth modification example of the embodiment.

FIG. 37 is a diagram illustrating an example of display control for notification operation objects in an information processing system according to a seventh modification example of the embodiment.

FIG. 46 is a diagram illustrating an example of followability of the operation objects in a case in which the reference of the display location is a person in the information processing system according to the embodiment.

FIG. 50 is a diagram illustrating another example of a predetermined operation in the information processing system according to the first modification example of the embodiment.

FIG. 51 is a diagram illustrating yet another example of a predetermined operation in the information processing system according to the first modification example of the embodiment.

FIG. 54 is a diagram illustrating an example in which a reference of a display location is changed in an information processing system according to a second modification example of the embodiment.

FIG. 57 is a diagram illustrating an example of merging of operation objects in an information processing system according to a fifth modification example of the embodiment.

FIG. 58 is a diagram illustrating an example of display control for operation objects in an information processing system according to a sixth modification example of the embodiment.

DESCRIPTION OF EMBODIMENTS

Figure 1:
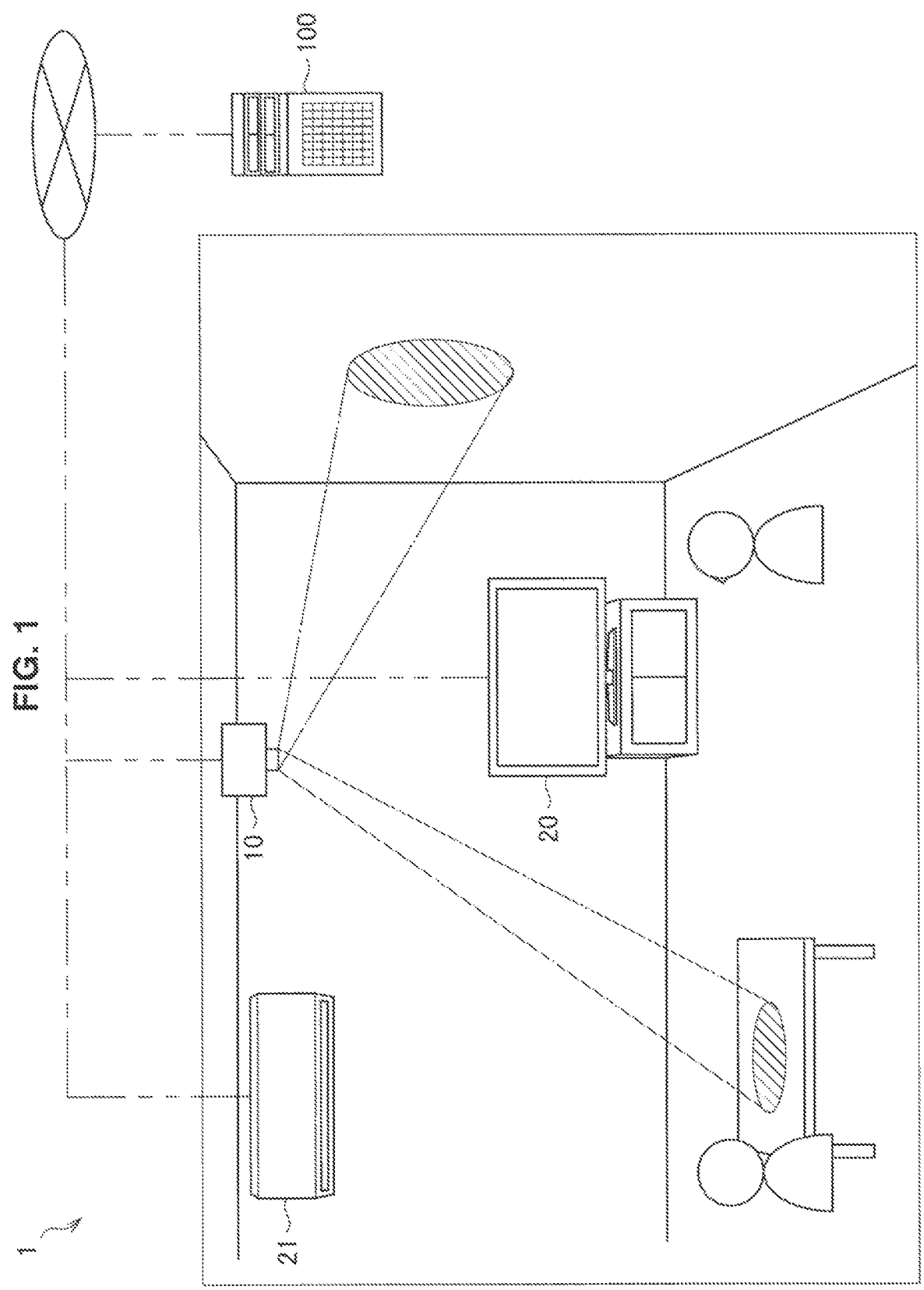
FIG. 1 is a diagram for describing an outline of an information processing system according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, different numbers may be added to the same reference numbers for distinguishing a plurality of elements that have substantially the same functions in the specification and drawings in some cases. For example, a plurality of elements that have substantially the same functions are distinguished like a selection object 31A, a selection object 31B, and the like as needed. However, only the same reference numerals are given in a case in which it is not necessary to distinguish elements that have substantially the same functions. In a case in which it is not necessary to particularly distinguish the selection object 31A and the selection object 31B, for example, the selection object 31A and the subject object 31B will be simply referred to as selection objects 31.

In addition, information processing apparatuses 100 according to first to third embodiments will be distinguished as an information processing apparatus 100-1 to an information processing apparatus 100-3 by adding the numbers corresponding to the embodiments to the end for convenience of description.

Note that the description will be given in the following order.
1. Introduction
2. Outline of information processing system according to one embodiment of the present disclosure
3. First embodiment of the present disclosure (selection of device to be operated)
3-1. Configuration of system
3-2. Processing of system
3-3. Summary of first embodiment
3-4. Modification examples
4. Second embodiment of the present disclosure (display of operation objects)
4-1. Configuration of system
4-2. Processing of system
4-3. Summary of second embodiment
4-4. Modification examples
5. Third embodiment of the present disclosure (displacement of operation objects)
5-1. Configuration of system
5-2. Processing of system
5-3. Summary of third embodiment
5-4. Modification examples
6. Hardware configuration according to one embodiment of the present disclosure
7. Conclusion 1. Introduction First, technologies related to the information processing systems according to the respective embodiments of the present disclosure will be described.

Electronic devices (hereinafter, also referred to as devices to be operated) such as domestic electrical appliances are generally operated by using remote controllers. For example, remote controllers are provided for the respective devices to be operated, and a user operates a device to be operated, which is an operation target, by using a remote controller for the device to be operated.

However, since the number of remote controllers also increases as the number of devices to be operated increases, there is a concern that it may become complicated for the user to operate the devices to be operated. For example, user's efforts to find a remote controller for a desired device to be operated increase. Also, management of the remote controllers also becomes an additional burden.

Meanwhile, operating a plurality of devices to be operated by using one device corresponding to the remote controllers is conceivable. For example, switching GUIs (Graphical User Interfaces) for operating the devices to be operated in accordance with the devices to be operated in a device in which a GUI is displayed may be exemplified.

However, complication still remains for the user in this case. For example, the user has to pick up the aforementioned device with his/her hand to operate the devices to be operated. Also, since a desired GUI is selected from among the GUIs for the plurality of devices to be operated, the number of GUIs also increases as the number of devices to be operated increases, and selection of the GUIs becomes complicated. In addition, it thus takes time until it becomes possible to perform an operation. Further, in a case in which there are a plurality of users, it is necessary to provide the aforementioned devices corresponding to the number of users.

In consideration of the above points, providing an operation interface in which the aforementioned devices are not used is conceivable. For example, devices to be operated recognizing a so-called NUI (Natural User Interface) such as speech, lines of sight, or gestures of the user and executing an operation that the user desires may be exemplified.

However, in a case in which a plurality of devices to be operated are present, it is generally difficult to select a desired device to be operated through an NUI. For example, if a user tries to select a device to be operated by using a line of sight, a line sight not only to the desired device to be operated but also to devices to be operated in the surroundings may be recognized due to deviation of the line sight, and improper operating may occur. Also, curbing of deviation in a line of sight is a burden on the user. Further, in a case in which an operation of a device to be operated, particularly a detailed operation such as adjustment of parameters and the like is performed, the burden further increases even if the desired device to be operated is selected.

Meanwhile, utilizing a projected GUI instead of the aforementioned NUI may also be conceivable. For example, projecting a GUI in the surroundings of a user and operating a device to be operated in accordance with operations performed to the projected GUI may be exemplified.

However, the difficulty in selecting a device to be operated is still not solved even in this case.

Thus, one embodiment of the present disclosure will propose a mechanism capable of reducing a burden on a user for selecting a device to be operated that the user desires to operate. Moreover, a mechanism capable of providing operation objects suitable for conditions of the user and a mechanism capable of performing an operation regarding a display location of the operation objects in a sense of moving actual objects will also be proposed.

2. Outline of Information Processing System According to one Embodiment of the Present Disclosure Next, an outline of an information processing system according to one embodiment of the present disclosure will be described with reference to FIG. 1. FIG. 1 is a diagram for describing the outline of the information processing system according to one embodiment of the present disclosure.

The information processing system according to the one embodiment of the present disclosure includes an information processing apparatus 100 that has a user form recognition function, a projection control function, a device control function, and a communication function, a projection device, an imaging device, and devices to be operated. The user form recognition function is a function of recognizing a user's body form. The projection control function is a function of controlling a form, a projection location, and the like of an image that the projection device is caused to project. The device control function is a function of controlling processing of the devices to be operated. The communication function is a function of communicating information to apparatuses or devices outside the information processing apparatus 100. Therefore, the information processing apparatus 100 can control devices to be operated that are connected via communication in response to an operation using a user's body on the image for operating the devices to be operated that the projection device is caused to project (hereinafter, also referred to as operation objects).

Further, the information processing apparatus 100 has a device-to-be-operated selecting function, an operation object form control function, and an operation object moving function, in addition to the aforementioned functions. The device-to-be-operated selecting function is a function of selecting a device to be operated, which is an operation target, from among a plurality of devices to be operated. The operation object display function is a function of controlling a display form of operation objects to be displayed. The operation object moving function is a function of controlling displacement of the operation objects to be displayed.

As illustrated in FIG. 1, for example, the information processing system 1 includes an information processing apparatus 100, a projection imaging device 10, a display device 20, and an air conditioner device 21. The information processing apparatus 100 is connected to the projection imaging device 10, the display device 20, and the air conditioner device 21 via a network such as the Internet. Note that the projection imaging device 10 may be a projection device and an imaging device as separate devices.

First, the information processing apparatus 100 selects the display device 20 and the air conditioner device 21 as devices to be operated. Next, the information processing apparatus 100 causes the projection imaging device 10 to project operation objects for operating the selected display device 20 or air conditioner device 21. In addition, the projection imaging device 10 images a range within which the user falls and transmits image information related to the image obtained by the imaging to the information processing apparatus 100. The information processing apparatus 100 recognizes a user's operation from a user's body form recognized on the basis of the received image information. Then, the information processing apparatus 100 causes a display location of the operation objects to move in accordance with the user's operation. Also, the information processing apparatus 100 controls processing of the display device 20 or the air conditioner device 21 on the basis of the user's operation performed to the operation objects.

Figure 2:
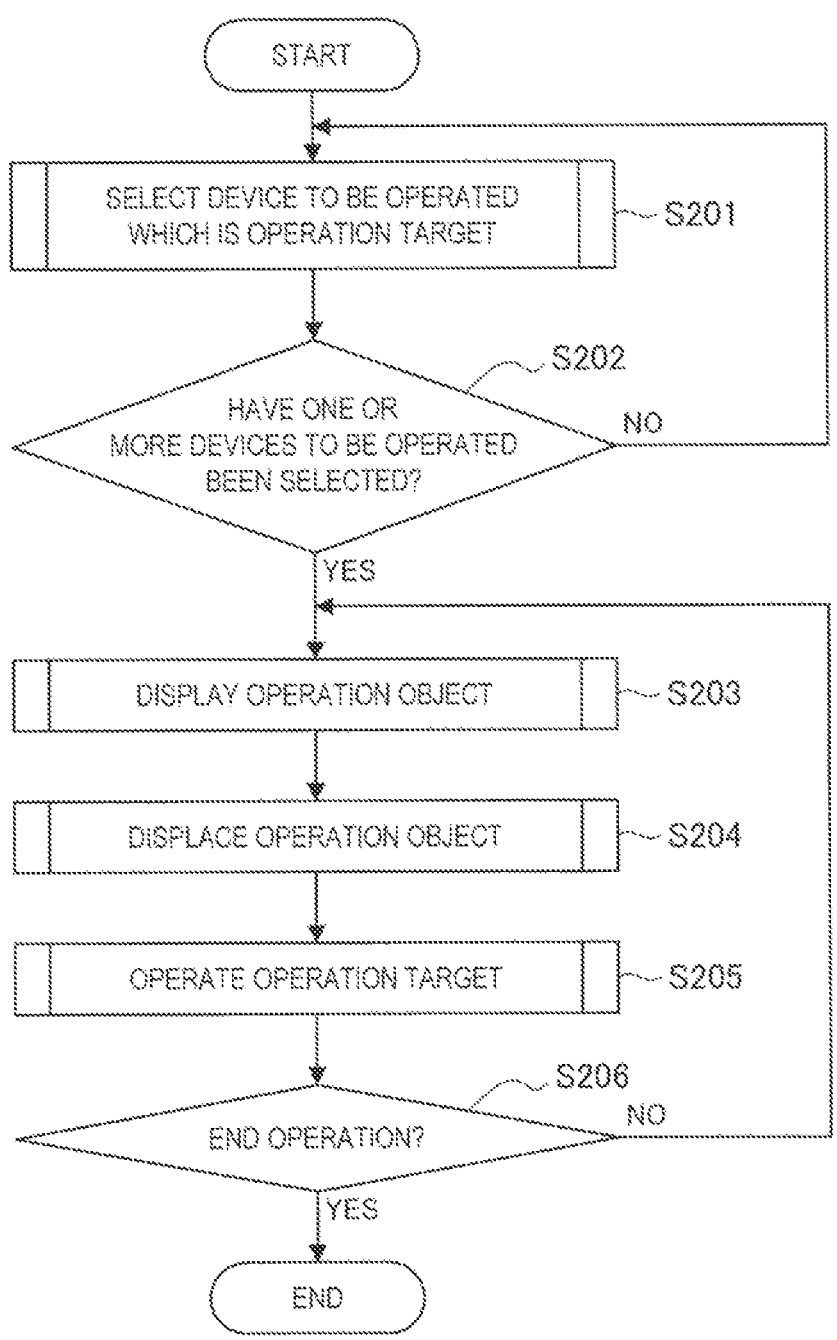
FIG. 2 is a flowchart illustrating an outline of processing of the information processing system according to one embodiment of the present disclosure.

Further, an outline of processing of the information processing system 1 will be described with reference to FIG. 2. FIG. 2 is a flowchart illustrating an outline of processing of the information processing system 1 according to one embodiment of the present disclosure.

The information processing system 1 selects a device to be operated, which is an operation target (Step S201). Specifically, the information processing apparatus 100 selects a device to be operated, which is an operation target, from among a plurality of devices to be operated that are connected via communication.

Next, the information processing system 1 determines whether or not one or more devices to be operated have been selected (Step S202). Specifically, the information processing apparatus 100 determines whether or not one or more devices to be operated have been selected as operation targets.

If it is determined that one or more devices to be operated have been selected, the information processing system 1 displays operation objects (Step S203). Specifically, the information processing apparatus 100 causes the projection imaging device 10 to project operation objects for the device to be operated, which has been selected as an operation target.

Next, the information processing system 1 causes the operation objects to move (Step S204). Specifically, the information processing apparatus 100 causes a projection location of the operation objects to move in accordance with a user's operation performed to the projected operation objects.

In addition, the information processing system 1 operates a device to be operated which is the operation target (Step S205). Specifically, the information processing apparatus 100 causes the device to be operated corresponding to an operation object to execute processing in accordance with the user's operation performed to the projected operation object.

Then, the information processing system 1 determines whether or not the operation has ended (Step S206). Specifically, the information processing apparatus 100 determines whether or not the operation of the device to be operated by using the operation object has ended. Note that if it is determined that the operation has ended, the information processing system 1 causes the display of the operation object to end.

The above is a description regarding the outline of the information processing system according to one embodiment of the present disclosure. Hereinafter, the aforementioned device-to-be-operated selecting function, the operation object form control function, and the operation object moving function will be respectively described in detail in different embodiments.

3. First Embodiment of the Present Disclosure (Selection of Device to be Operated)

First, an information processing system 1 according to a first embodiment of the present disclosure will be described. In the first embodiment of the present disclosure, an embodiment of the aforementioned device-to-be-operated selecting function in the information processing system 1 will mainly be described.

3-1. Configuration of System

Figure 3:
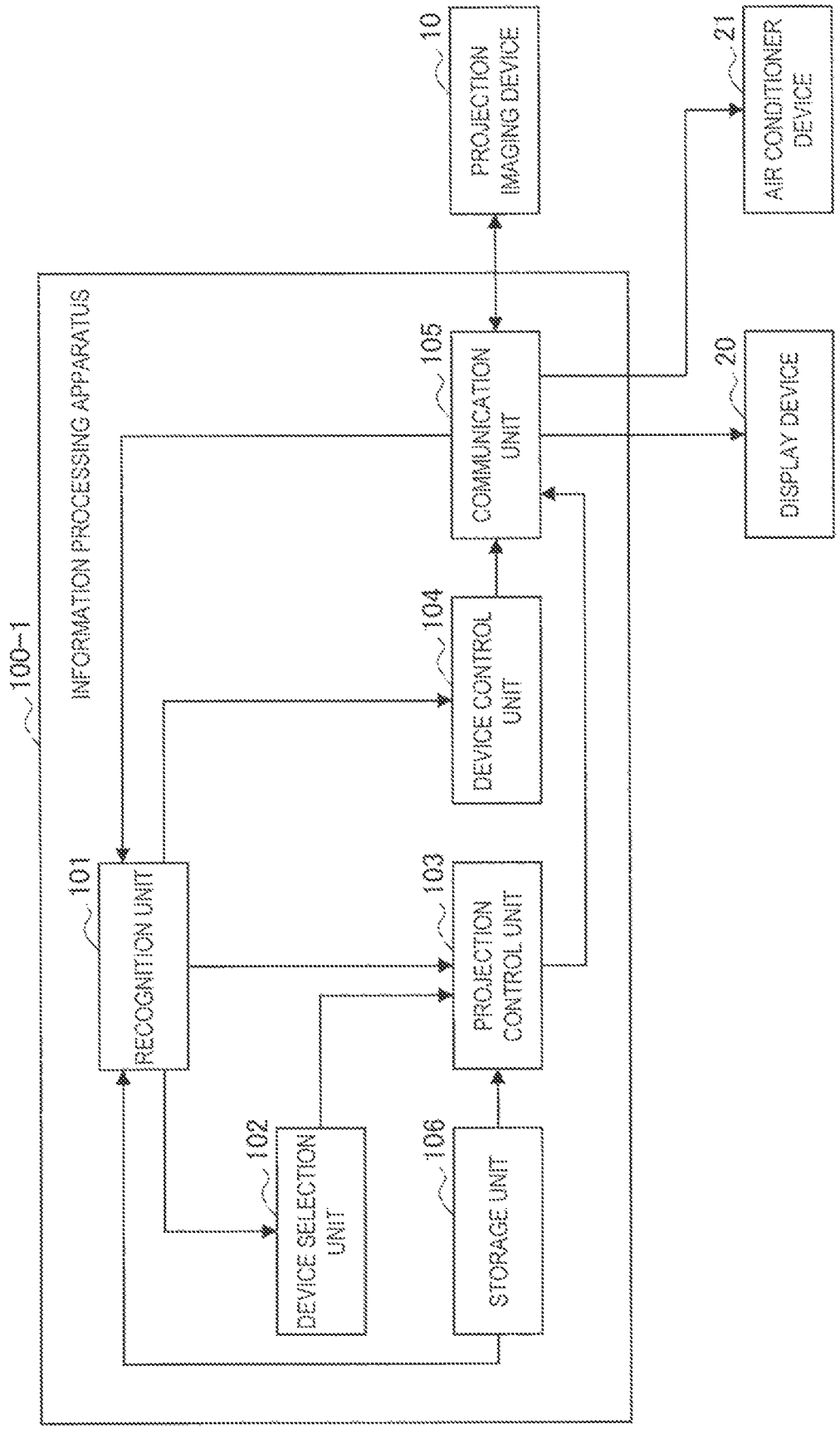
FIG. 3 is a block diagram schematically illustrating an example of a functional configuration of an information processing system according to a first embodiment of the present disclosure.

A functional configuration of the information processing system 1 according to the embodiment will be described with reference to FIG. 3. FIG. 3 is a block diagram schematically illustrating an example of the functional configuration of the information processing system 1 according to the first embodiment of the present disclosure.

The information processing system 1 includes an information processing apparatus 100-1, a projection imaging device 10, and a display device 20 and an air conditioner device 21 as devices to be operated, as illustrated in FIG. 3. Hereinafter, functions of the information processing apparatus 100-1 and the projection imaging device 10 will be described in detail.

(Information Processing Apparatus)

The information processing apparatus 100-1 includes a recognition unit 101, a device selection unit 102, a projection control unit 103, a device control unit 104, a communication unit 105, and a storage unit 106.

(Recognition Unit)

The recognition unit 101 recognizes a user's form as an operation subject. Specifically, the recognition unit 101 recognizes a user's body form on the basis of observation information. More specifically, the observation information is image information related to an image in which the user appears, and the recognition unit 101 recognizes the user's body form by analyzing an image related to the image information. For example, the recognition unit 101 recognizes a user's face or user's eyes that appear in an image and recognizes a user's line of sight on the basis of the arrangement, the shape, and the like of the recognized face or eyes. Note that the observation information may be measurement information related to a user's motion, position, or the like, and the recognition unit 101 may recognize the user's body form on the basis of the measurement information. The body form includes a form of visual recognition such as a line of sight or a field of view. In addition, the measurement information may be acquired from a sensor that the user wears, a sensor that is mounted on an object that is present in the surroundings of the user, or the like.

In addition, the recognition unit 101 recognizes a user's operation on the basis of the recognized user's form. Specifically, the recognition unit 101 recognizes an operation performed to a device to be operated on the basis of the user's form with respect to an operation object that the projection control unit 103 is caused to project. For example, if an operation of touching an operation object is recognized, the recognition unit 101 recognizes that an operation has been performed to the operation object.

(Device Selection Unit)

Figure 4:
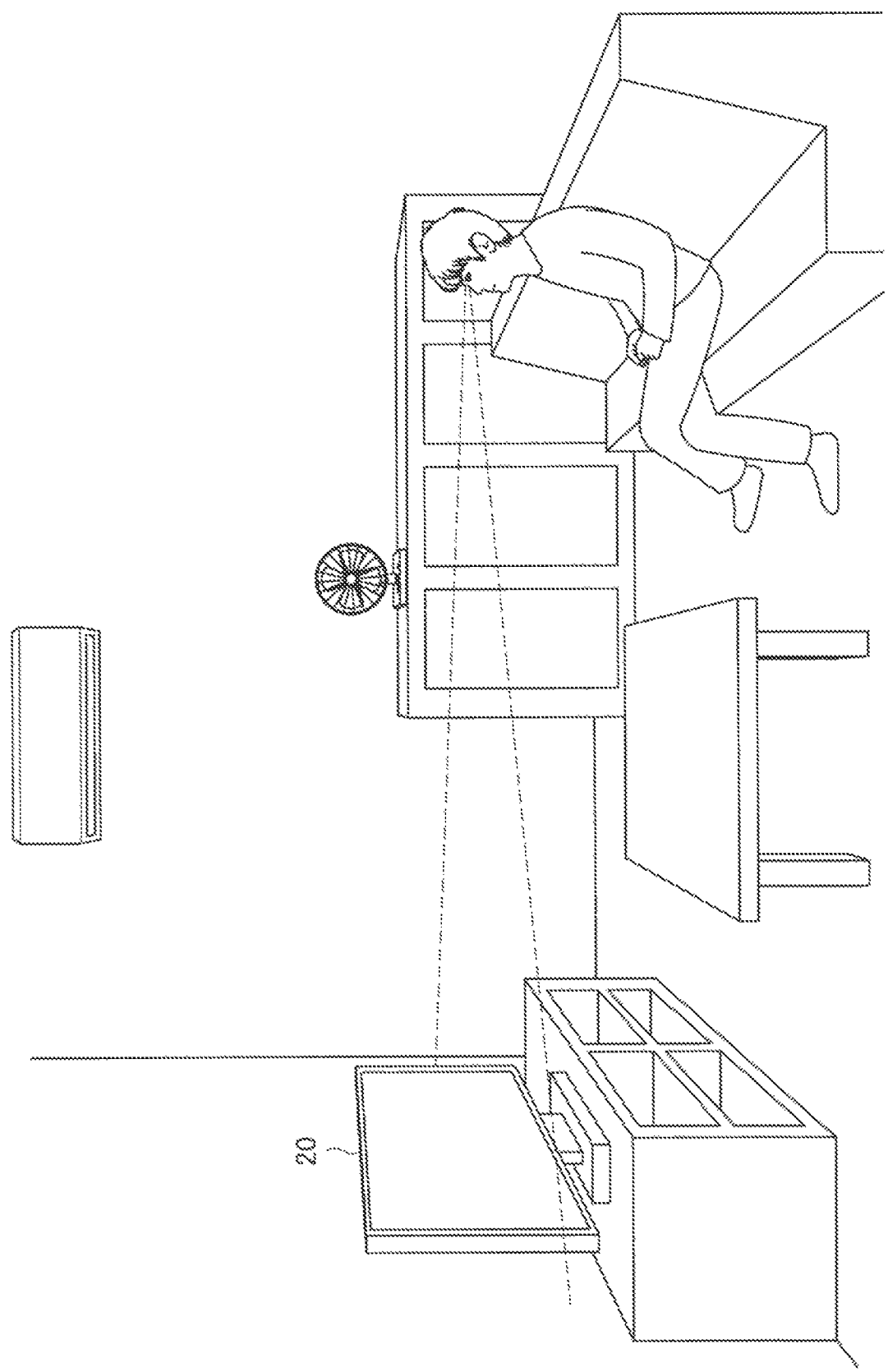
FIG. 4 is a diagram for describing an example of first device selection through which one device to be operated is selected in the information processing system according to the embodiment.

The device selection unit 102 selects a device to be operated which is an operation target (hereinafter, also referred to as an operation target device) on the basis of the user's body form). Specifically, the device selection unit 102 selects the operation target device on the basis of the user's body form directed to the device to be operated in first device selection. For example, the device selection unit 102 selects an operation target device on the basis of a user's visual recognition form directed to the device to be operated. Further, the first device selection will be described in detail with reference to FIG. 4. FIG. 4 is a diagram for describing an example of the first device selection through which one device to be operated is selected in the information processing system 1 according to the embodiment.

The device selection unit 102 decides a device selection range on the basis of line-of-sight information related to the user's line of sight recognized by the recognition unit 101. For example, the device selection unit 102 decides a range in a real space corresponding to the user's eyesight as illustrated in FIG. 4 as the device selection range, on the basis of the line-of-sight information provided from the recognition unit 101. Note that the device selection range may be smaller than that of the estimated user's eyesight.

Next, the device selection unit 102 selects a device to be operated that is determined to fall within the device selection range in accordance with the user's decision operation. For example, if the user's decision operation for the device selection range is recognized by the recognition unit 101, the device selection unit 102 determines whether or not any device to be operated is present within the decided range. Then, the device selection unit 102 selects the device to be operated that is determined to be present within the decided range, for example, the display device 20 as illustrated in FIG. 4 as the operation target device. Note that position information of the device to be operated in the real space may be provided from the recognition unit 101 or may be provided from an external device.

Figure 5:
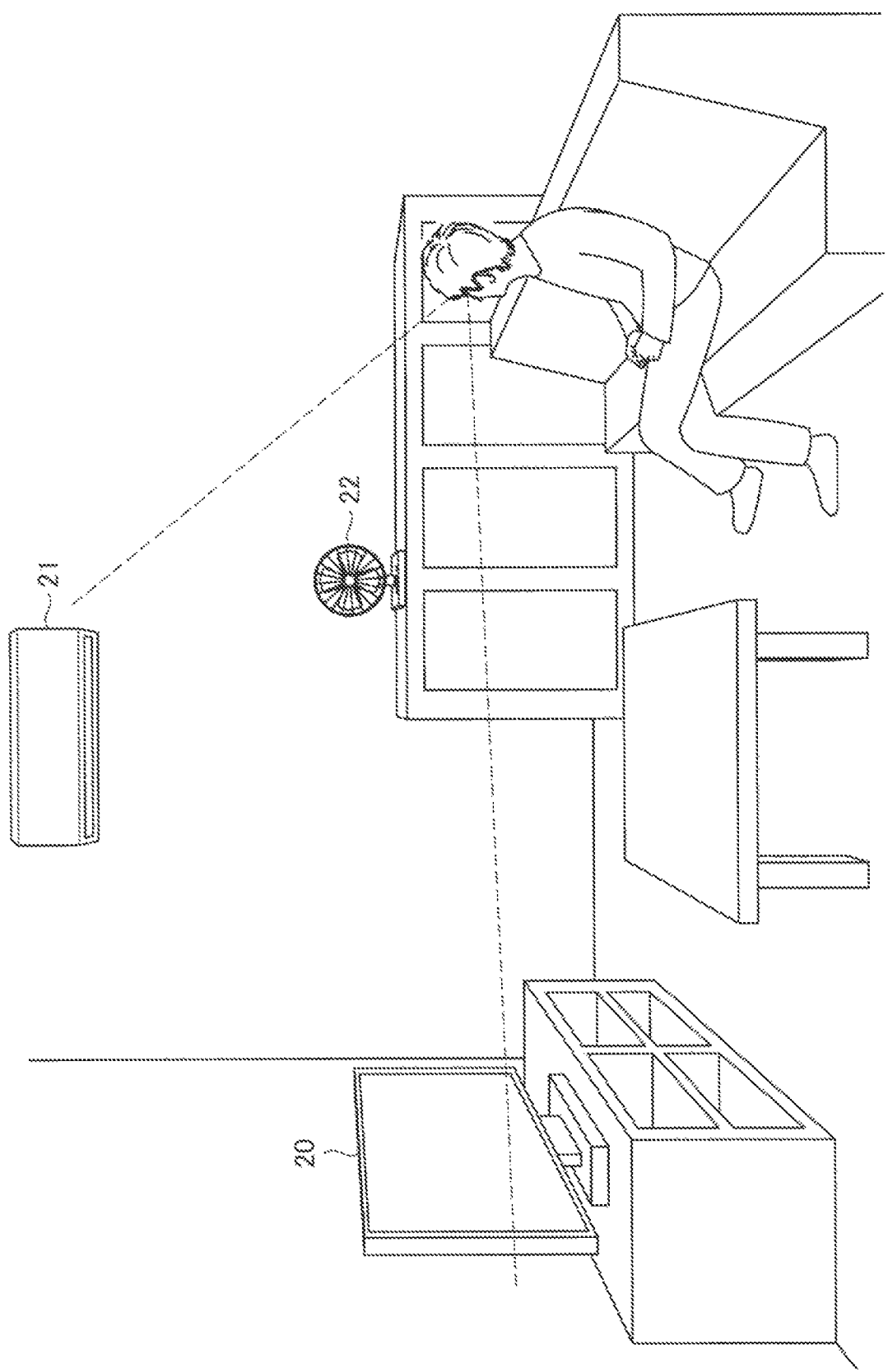
FIG. 5 is a diagram for describing an example of first device selection through which a plurality of devices to be operated are selected in the information processing system according to the embodiment.

In addition, in a case in which a plurality of devices to be operated are included in the device selection range, the device selection unit 102 selects the plurality of devices to be operated as candidates for the operation target device (hereinafter, also referred to as candidate devices). Further, the first device selection in a case in which a plurality of devices to be operated are selected as candidate devices will be described in detail with reference to FIG. 5. FIG. 5 is a diagram for describing an example of the first device selection through which a plurality of devices to be operated are selected in the information processing system 1 according to the embodiment. Note that description of processing that is substantially the same as the aforementioned processing will be omitted.

The device selection unit 102 decides a device selection range on the basis of line-of-sight information related to the user's line of sight recognized by the recognition unit 101.

Next, the device selection unit 102 selects devices to be operated that are determined to fall within the device selection range. For example, the device selection unit 102 determines whether or not any devices to be operated are present within the decided range. The device selection unit 102 selects the plurality of devices to be operated that are determined to be present within the decided range, for example, all of the display device 20, the air conditioner device 21, and a blower device 22 as illustrated in FIG. 5, for example, as candidate devices.

Note that although the example in which all the devices to be operated that fall within the device selection range are selected as candidate devices has been described above, a part of the devices to be operated that fall within the device selection range may be selected as candidate devices. For example, only devices to be operated at distances of equal to or less than a threshold value from the line of sight may be selected as the candidate devices from among the devices to be operated within the device selection range.

In addition, although the example in which the device to be operated that is actually present in the region decided from the user's body form (that is, the device selection range) is selected through the first device selection has been described above, a device to be operated that is linked to the device selection range may be selected. In this case, it is possible to select the device to be operated even in a case in which the device to be operated cannot be visually recognized in a direct manner. For example, tags linked to devices to be operated are arranged in a real space, and the device selection unit 102 selects a device or devices to be operated linked to a tag or tags within the device selection range as candidate devices or an operation target device. In addition, for example, a specific region in the real space is linked to a device or devices to be operated, and the device selection unit 102 selects the device or devices to be operated linked to the specific region within the device selection range as candidate devices or an operation target device. When the aforementioned tags are provided, the user can reliably recognize the device to be operated and then perform the first device selection. Also, when the aforementioned specific region is provided, it is possible to omit the aforementioned tags and to reduce efforts or costs for prior preparation or changing in the linking.

Figure 6:
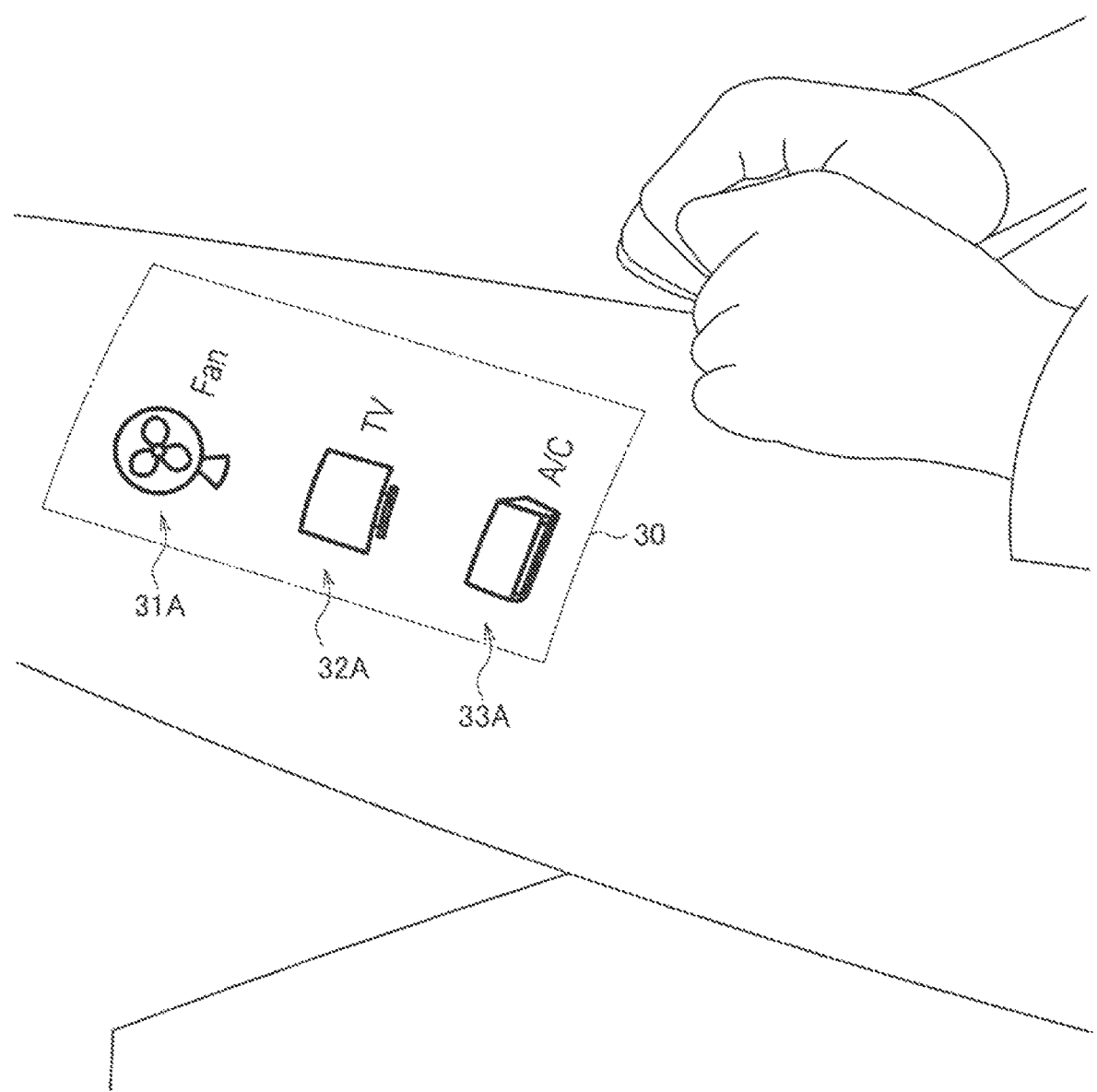
FIG. 6 is a diagram for describing an example for describing an example of second device selection through which an operation target device is selected on the basis of an operation performed to the selection object in the information processing system according to the embodiment.

Further, the device selection unit 102 selects an operation target device from among candidate devices selected through the first device selection. Specifically, the device selection unit 102 selects an operation target device from among the candidate devices selected through the first device selection on the basis of the user's selecting operation performed to selection objects projected by the projection imaging device 10, in second device selection. Further, the second device selection will be described in detail with reference to FIG. 6. FIG. 6 is a diagram for describing an example of the second device selection through which an operation target device is selected on the basis of an operation performed to a selection object in the information processing system according to the embodiment.

First, information indicating a plurality of candidate devices selected through the first device selection is presented as selection objects to the user after the first device selection. For example, selection objects 31A, 32A, and 33A respectively corresponding to the blower device 22, the display device 20, and the air conditioner device 21 as illustrated in FIG. 6, which have been selected through the first device selection, are respectively projected in a selection object display region 30 by the projection imaging device 10.

Next, if an operation of selecting one candidate device from among the plurality of candidate devices is recognized by the recognition unit 101, the device selection unit 102 selects the selected candidate device as an operation target device. For example, if an operation of touching the selection object 32A is recognized by the recognition unit 101, the device selection unit 102 selects the display device 20 corresponding to the selected selection object 32A as the operation target device.

(Projection Control Unit)

Figure 7:
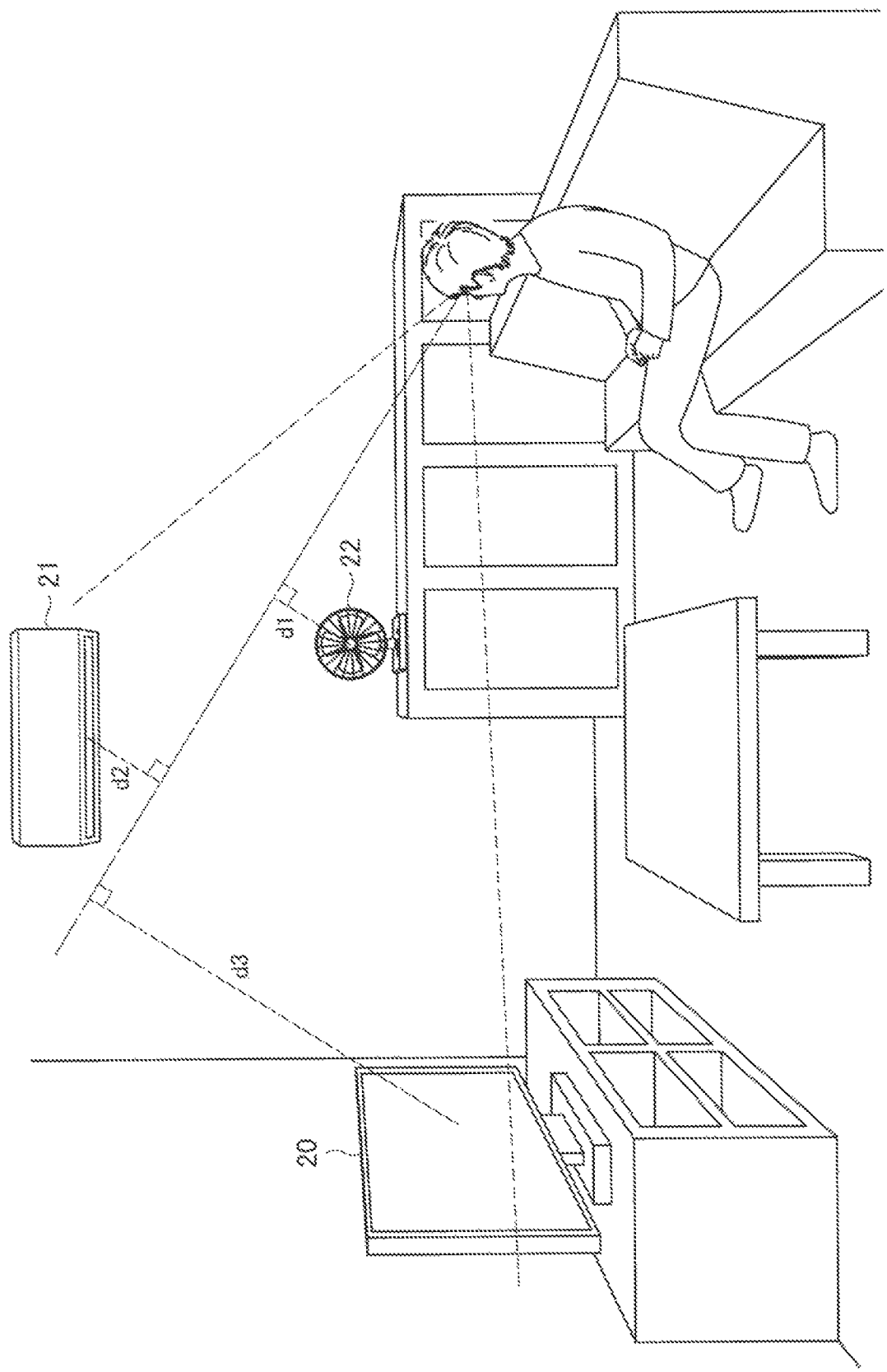
FIG. 7 is a diagram for describing an example of priority information in the information processing system according to the embodiment.

The projection control unit 103 serves as a display control unit and controls projection performed by the projection imaging device 10. Specifically, the projection control unit 103 controls projection of selection objects related to candidate devices selected through the first device selection. More specifically, the projection control unit 103 causes the projection imaging device 10 to project selection objects indicating the candidate devices selected through the first device selection. Further, selection objects will be described in detail with reference to FIGS. 6 and 7. FIG. 7 is a diagram for describing an example of priority information in the information processing system 1 according to the embodiment.

If a plurality of candidate devices are selected through the first device selection, the projection control unit 103 decides forms of selection objects for the plurality of candidate devices on the basis of priority information. The priority information includes information decided on the basis of a body form in the first device selection. More specifically, the projection control unit 103 decides arrangement of the selection objects on the basis of a user's line of sight in the first device selection. For example, the projection control unit 103 decides forms of the selection objects in accordance with distances from the user's line of sight to the candidate devices in a three-dimensional space in the first device selection. In detail, the projection control unit 103 calculates a distance d1 from the user's line of sight to the blower device 22, a distance d2 from the user's line of sight to the air conditioner device 21, a distance d3 from the user's line of sight to the display device 20 as illustrated in FIG. 7. Then, the projection control unit 103 decides alignment of the selection object in an ascending order or a descending order of the calculated distances. Note that it is a matter of course that the distances from the line of sight to the candidate devices may be distances in a two-dimensional space. In addition, the selection objects may be arranged at locations that become closer to the user as priority becomes higher, that is, as the aforementioned distances become shorter.

In addition, the projection control unit 103 decides a location in accordance with the user's decision operation in the first device selection as a projection location of the selection objects. The location in accordance with the decision operation includes a user's body part designated by the decision operation. In a case in which a tap operation as a decision operation for a device selection range in the first device selection is performed to the user's thigh, for example, the projection control unit 103 decides a region 30 on the user's thigh as a projection location of the selection objects. Note that the projection control unit 103 may decide the display location of the selection objects in accordance with an operation of designating the display location of the selection objects, which is different from the aforementioned decision operation in the first device selection.

Then, the projection control unit 103 causes the projection imaging device 10 to project the selection objects in a decided form at the decided projection location. For example, the projection control unit 103 causes the projection imaging device 10 to project the selection objects 31A, 32A, and 33A in a form of a list of decided alignment in the region 30 on the user's thigh as illustrated in FIG. 6 decided as the projection location.

Note that selection objects may be projected for devices to be operated related to the candidate devices selected through the first device selection. Specifically, the projection control unit 103 grasps the devices to be operated that operate in conjunction with the candidate devices and causes the projection imaging device 10 to project the selection objects for the grasped devices to be operated along with selection objects for the candidate devices. For example, selection objects for a recording device, a sound output device, an illumination device, or the like that operates in conjunction with the display device 20 may be projected. In addition, selection objects for devices to be operated that have functions that are similar to functions of the candidate devices may be projected. In this case, it is possible to improve usability by selection objects for devices that the user is likely to desire to operate being projected.

Figure 8:
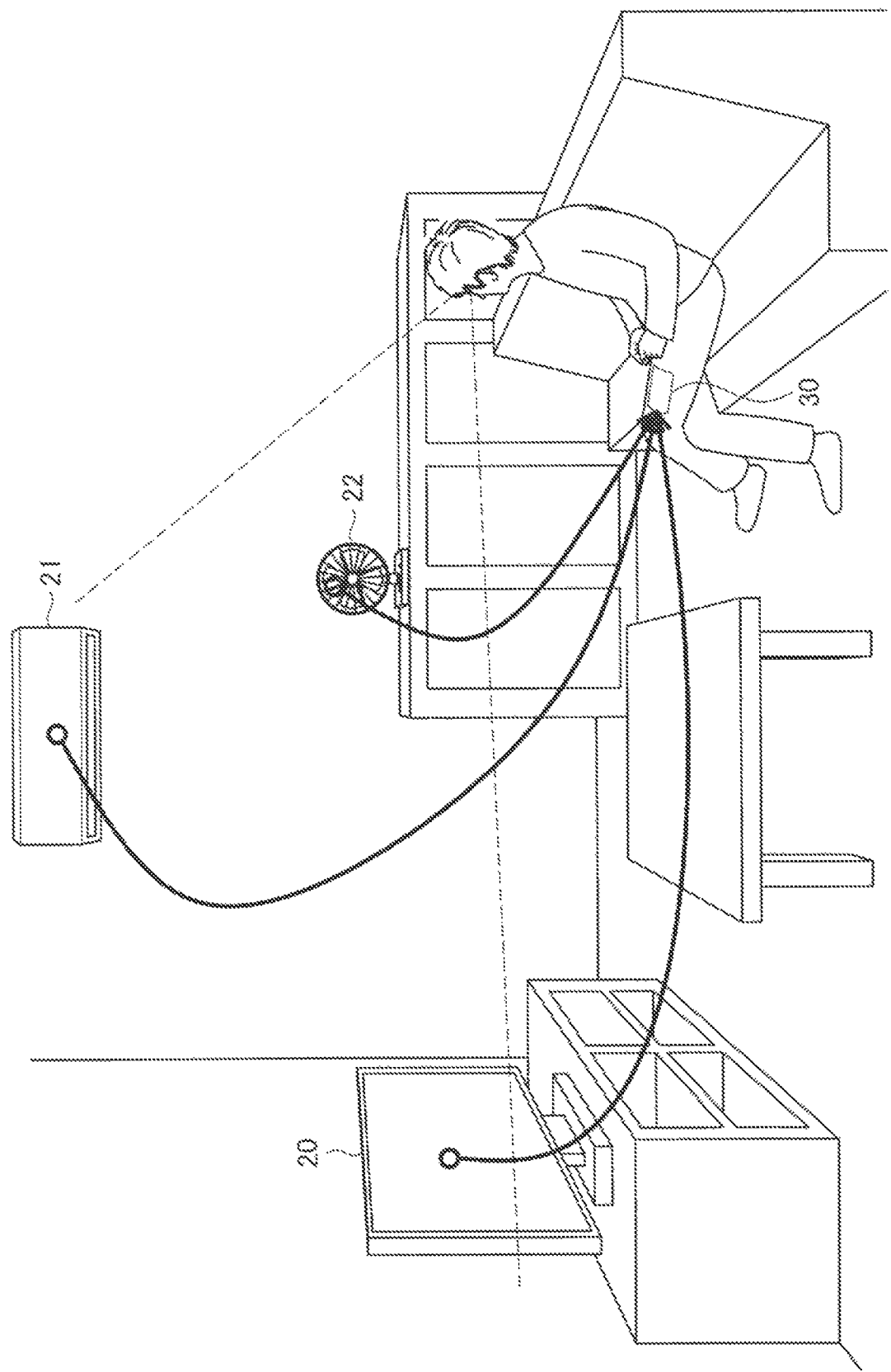
FIG. 8 is a diagram illustrating an example of a notification of devices to be operated, which have been selected through first device selection in the information processing system according to the embodiment.

Further, the projection control unit 103 may serve as a notification control unit and control a notification of the devices to be operated, which have been selected through the first device selection, when the selection objects are projected. Specifically, the projection control unit 103 controls projection indicating linkage between the devices to be operated, which have been selected through the first device selection, and the selection objects. Further, the notification of the devices to be operated, which have been selected through the first device selection, will be described in detail with reference to FIG. 8. FIG. 8 is a diagram illustrating an example of the notification of the devices to be operated, which have been selected through the first device selection, in the information processing system 1 according to the embodiment.

If the decision operation in the first device selection is recognized, the projection control unit 103 causes the projection imaging device 10 to project display indicating linkage between a plurality of respective candidate devices selected through the first device selection and the location at which the decision operation has been performed. Specifically, if the decision operation is recognized as having been performed to the user's thigh in the first device selection, animation of an image (including simple light) with a track that follows a line connecting each of the display device 20, the air conditioner device 21, and the blower device 22 with the region 30 on the user's thigh in accordance with the decision operation is projected. For example, animation in which an image moves from the candidate devices to the region 30 may be projected, and the selection objects may be projected when the image reaches the region 30.

The projection control in the selection of devices has been described above. In addition, the projection control unit 103 controls projection of operation objects for a device to be operated, which has been selected through the second device selection. Specifically, if a selecting operation of a candidate device is recognized in the second device selection, the projection control unit 103 causes the projection imaging device 10 to project operation objects for the selected candidate device. For example, if a selecting operation performed to a selection object is recognized, the projection of the selection objects is caused to end, and the operation objects may be projected at the location at which the selection objects have been projected.

(Device Control Unit)

The device control unit 104 controls a device to be operated. Specifically, the device control unit 104 controls processing of the device to be operated on the basis of a user's operation recognized by the recognition unit 101. For example, the device control unit 104 decides processing of the display device 20 in accordance with an operation of an operation object for the display device 20 and causes the communication unit 105 to transmit a processing execution request for requesting execution of the decided processing to the display device 20.

(Communication Unit)

The communication unit 105 communicates with devices outside the information processing apparatus 100-1. Specifically, the communication unit 105 transmits image information to the projection imaging device 10 and receives image information from the projection imaging device 10. In addition, the communication unit 105 transmits a processing execution request to the display device 20 and the air conditioner device 21. Note that the communication unit 105 may perform communication in either a wired communication scheme or a wireless communication scheme.

(Storage Unit)

The storage unit 106 stores information that is used in processing of the information processing apparatus. Specifically, the storage unit 106 stores information that is used for analyzing observation information in recognition processing performed by the recognition unit 101. In addition, the storage unit 106 stores image information related to an image that the projection control unit 103 causes the projection imaging device 10 to project. Note that information stored in an external device may be acquired via communication instead of the information being stored in the storage unit 106.

(Projection Imaging Device)

The projection imaging device 10 projects an image on the basis of an instruction from the information processing apparatus 100-1. Specifically, the projection imaging device 10 projects an image related to image information that is provided from the information processing apparatus 100-1 to a designated location. For example, the projection imaging device 10 may be a projector capable of rotating a projection direction with respect to two axes. Note that the projection imaging device 10 may be an omnidirectional projector, a hologram video device, or a display device that an object arranged in the surroundings of the user (for example, a table or a sofa) has. In addition, the projection imaging device 10 may project different images to a plurality of locations at the same time.

In addition, the projection imaging device 10 images the surroundings of the device itself. Specifically, the projection imaging device 10 images the surroundings of the device itself at predetermined time intervals or in response to a request from the information processing apparatus 100-1. Then, the projection imaging device 10 transmits image information related to the image acquired by the imaging to the information processing apparatus 100-1. Note that an imaging available range may be the same as a projection available range or may be broader than the projection available range. In addition, an imaging range may be caused to conform to a projection range. Also, there may be a plurality of imaging ranges.

3-2. Processing of System

Next processing of the information processing system 1 according to the embodiment will be described.

(Overall Processing)

Figure 9:
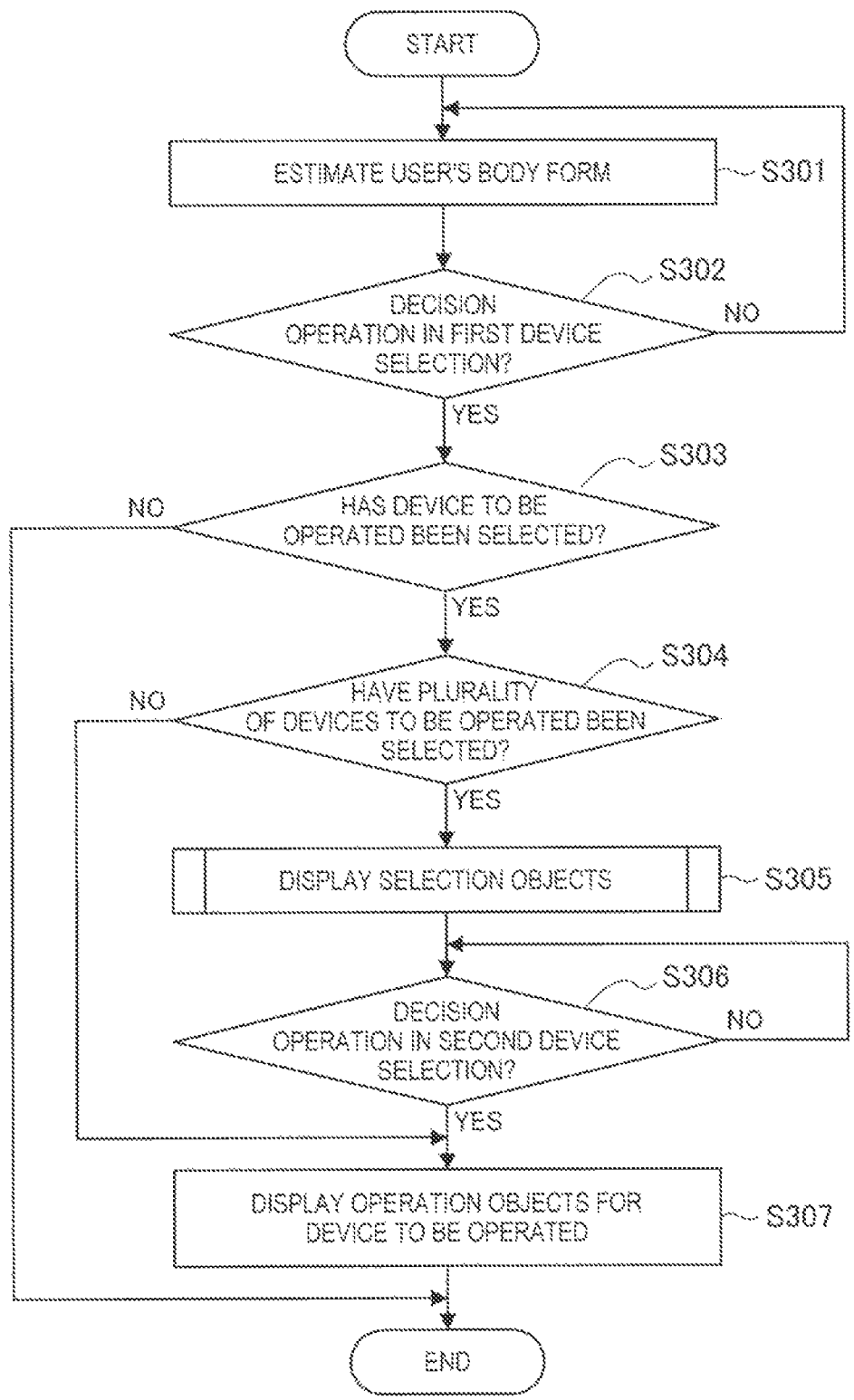
FIG. 9 is a flowchart conceptually illustrating an example of overall processing of the information processing system according to the embodiment.

First, overall processing of the information processing system 1 will be described with reference to FIG. 9. FIG. 9 is a flowchart conceptually illustrating an example of the overall processing of the information processing system 1 according to the embodiment.

The information processing system 1 estimates a user's body form (Step S301). Specifically, the recognition unit 101 recognizes the user's body form by using image information or the like.

Next, the information processing system 1 determines whether or not a decision operation in the first device selection has been performed (Step S302). Specifically, the recognition unit 101 decides a device selection range on the basis of the recognized user's body form. In addition, the recognition unit 101 attempts to recognize the decision operation in the first device selection on the basis of the recognized user's body form. Then, the device selection unit 102 determines whether or not the decision operation in the first device selection has been recognized by the recognition unit 101.

If it is determined that the decision operation in the first device selection has been performed, the information processing system 1 determines whether or not devices to be operated have been selected (Step S303). Specifically, if it is determined that the decision operation in the first device selection has been recognized by the recognition unit 101, the device selection unit 102 determines whether or not one or more devices to be operated are present in the device selection range.

If it is determined that the devices to be operated have been selected, the information processing system 1 determines whether or not a plurality of devices to be operated have been selected (Step S304). Specifically, the device selection unit 102 determines whether or not two or more devices to be operated are present within the device selection range.

If it is determined that a plurality of devices to be operated have been selected, the information processing system 1 displays selection objects (Step S305). Specifically, if it is determined that two or more devices to be operated are present, the device selection unit 102 selects the two or more devices to be operated as candidate devise. Then, the projection control unit 103 causes the communication unit 105 to transmit image information related to selection objects for the candidate devices to the projection imaging device 10. Then, the projection imaging device 10 projects the selection objects related to the received image information to a designated location. Note that details thereof will be described later.

Next, the information processing system 1 determines whether or not a decision operation in the second device selection has been performed (Step S306). Specifically, the recognition unit 101 attempts to recognize the decision operation in the second device selection. Then, the device selection unit 102 determines whether or not the decision operation in the second device selection has been recognized by the recognition unit 101.

If it is determined that the decision operation in the second device selection has been performed, the information processing system 1 displays operation objects for the device to be operated (Step S307). Specifically, if it is determined that the decision operation in the second device selection has been recognized by the recognition unit 101, the device selection unit 102 causes the communication unit 105 to transmit image information related to the operation objects to the projection imaging device 10. Then, the projection imaging device 10 projects the operation objects related to the received image information instead of the selection objects.

(Overall Processing)

Figure 10:
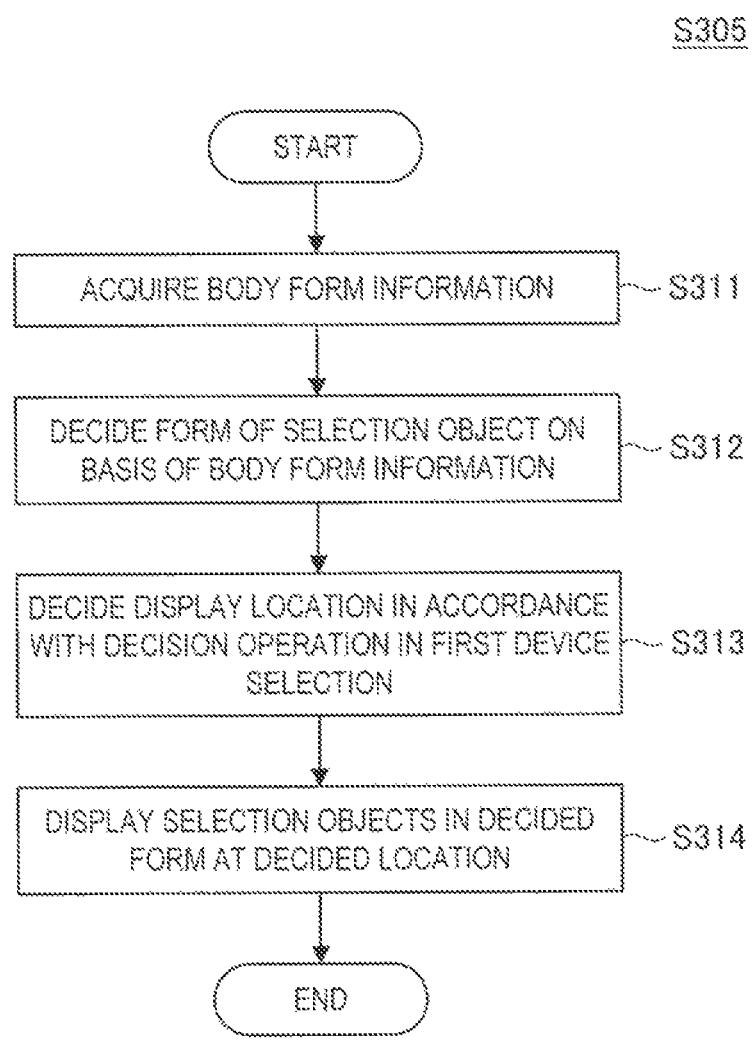
FIG. 10 is a flowchart conceptually illustrating an example of selection object display processing of the information processing system according to the embodiment.

Subsequently, selection object display processing of the information processing system 1 will be described with reference to FIG. 10. FIG. 10 is a flowchart conceptually illustrating an example of the selection object display processing of the information processing system 1 according to the embodiment.

The information processing system 1 acquires user's body form information (Step S311). Specifically, the projection control unit 103 acquires information related to a user's body form recognized by the recognition unit 101.

Next, the information processing system 1 decides a form of selection objects on the basis of the body form information (Step S312). Specifically, the projection control unit 103 decides priority information on the basis of the acquired body form information. Then, the projection control unit 103 decides alignment of the selection objects on the basis of the priority information.

In addition, the information processing system 1 decides a display location in accordance with a decision operation in the first device selection (Step S313). Specifically, the projection control unit 103 decides the location at which the decision operation in the first device selection has been performed as the display location of the selection objects.

Then, the information processing system 1 displays the selection objects in the decided form at the decided location (Step S314). Specifically, the projection control unit 103 causes the communication unit 105 to transmit image information related to the selection objects in the decided alignment along with an instruction of the projection location to the projection imaging device 10. Then, the projection imaging device 10 projects the selection objects related to the received image information to the designated location.

3-3 Summary of First Embodiment

In this manner, according to the first embodiment of the present disclosure, the information processing system 1, that is, the information processing apparatus 100-1 controls display of selection objects related to devices to be operated, which have been selected through the first device selection based on information from which a body form of an operation subject directed to the devices to be operated is estimated. Then, the information processing apparatus 100-1 controls a device to be operated, which has been selected through the second device selection based on information related to a selecting operation performed by the operation subject to the selection objects.

Conventionally, either a first interface that operates the device to be operated in proximity to the device or a second interface that operates the device to be operated in a remote manner has mainly be provided. However, the user has to move up to the device to be operated according to the first interface. Also, it is difficult to accurately select the device to be operated with an NUI operation such as a gesture operation in the second interface. In addition, in a case in which a plurality of devices to be operated are present, efforts to find remote controllers corresponding to the devices to be operated occur in a remote controller operation in the second interface.

Meanwhile, according to the embodiment, candidates for a device to be operated, which is selected through the first device selection based on a user's body form, are presented to the user, and the user can select a device to be operated from among the candidates. Therefore, it is not necessary for the user to move to the device to be operated first. In addition, it is possible to suppress improper selection of the device to be operated and to prevent reselection of the device to be operated by the user selecting an operation target from among the presented candidates for the device to be operated. Also, it is possible to operate the device to be operated without any specific device such as a remote controller and to suppress occurrence of efforts to find the remote controller or the like by the device to be operated being operated on the basis of selection from among selection objects. Therefore, it is possible to reduce a burden on the user for selecting the device to be operated that the user desires to operate.

In addition, the aforementioned selection objects include objects indicating the devices to be operated, which have been selected through the aforementioned first device selection. Therefore, it is possible for the user to reliably select the device to be operated that the user himself/herself intends by the candidate devices selected through the first device selection being explicitly indicated.

In addition, the aforementioned selection objects are displayed such that the selection objects are visually recognized on a form based on the priority information. Although a plurality of candidate devices are selected through the first device selection, the user generally desires to operate one device to be operated in practice. Thus, it is possible to improve operability of the selection objects by causing the projection imaging device 10 to project the selection objects such that the desired device to be operated is easily selected. In addition, a form of the selection objects controlled on the basis of priority information includes arrangement of the selection objects. Therefore, it is possible to prompt the user to intuitively grasp the device to be operated that the user desires to operate. Accordingly, it is possible to improve the operability of the selection objects.

In addition, the aforementioned priority information includes information decided on the basis of information from which the aforementioned user's body form in the aforementioned first device selection is estimated. The user has already decided the device to be operated that the user desires to operate at the timing of the first device selection. Therefore, the selection objects for the desired device to be operated are more likely to be selected, and the operability can be further improved by the form of the selection objects being decided in accordance with how high the probability of being the desired device to be operated, which estimated from the body form in the first device selection, is.

In addition, the information processing apparatus 100-1 controls display of operation objects for the device to be operated, which has been selected through the aforementioned second device selection. Therefore, it is possible to operate the desired device to be operated in accordance with user's intention. Therefore, it is possible to improve usability in the operation of the selected device to be operated.

In addition, the aforementioned selection objects are displayed at a location in accordance with a decision operation performed by the aforementioned operation subject in the first device selection, in accordance with the decision operation. Therefore, it is possible to promote selection of the desired device to be operated as a candidate device by the first device selection being performed in accordance with the user's intention. In addition, it is possible to improve the operability of the selection objects by the selection objects being projected at a location that the user intends.

In addition, the location in accordance with the aforementioned decision operation includes a body part of the operation subject that is designated through the aforementioned decision operation. Therefore, it is possible to project the selection objects at a location at which the user can easily operate the selection objects even in a case in which a projection space for the selection objects is not secured in the surroundings of the user, by the selection objects being projected to the user's body. Also, in a case in which the projection location is tracked, it is possible to continuously operate the projected selection objects since the selection objects move even if the user moves.

In addition, the information processing apparatus 100-1 controls a notification of the devices to be operated, which have been selected through the aforementioned first device selection, when the aforementioned selection objects are displayed. Therefore, it is possible for the user to check the candidate devices selected through the first device selection. In a case in which the desired device to be operated has not been selected, for example, the user can retry the first device selection. Therefore, it is possible to suppress improper selection of the operation target device and to improve efficiency in the selection of the operation target device.

In addition, the aforementioned notification includes a display output indicating linkage between the aforementioned selected device to be operated and the aforementioned selection objects. Therefore, it is possible to prompt the user to check the selected candidate devices and to guide the user to the selection objects. In a case in which the first device selection is performed on the basis of a user's visual recognition form, in particular, it is possible to guide the user's line of sight from the devices to be operated to the selection objects. Therefore, it is possible to smoothly guide the user from the first device selection to the second device selection and to make it easy to select the operation target device.

In addition, the aforementioned body form includes a visual recognition form of the aforementioned operation subject, and devices to be operated that are determined to fall within at least a part of the eyesight of the operation subject are selected through the aforementioned first device selection. Therefore, it is possible to select the devices to be operated without moving a user's body part such as a hand or a leg of the user. Therefore, the user can select a device to be operated that the user desires to operate and operate the device while performing another task or the like. In addition, in a case in which the user operates the device to be operated, the user's line of sight is generally directed to the device to be operated. Therefore, it is possible to improve the probability that the candidate device is the device to be operated that the user desires to operate, by the first device selection being performed on the basis of the visual recognition form.

3-4. Modification Examples

The first embodiment of the present disclosure has been described above. Note that the embodiment is not limited to the aforementioned example. Hereinafter, first to fifth modification examples of the embodiment will be described.

First Modification Example

Figure 11:
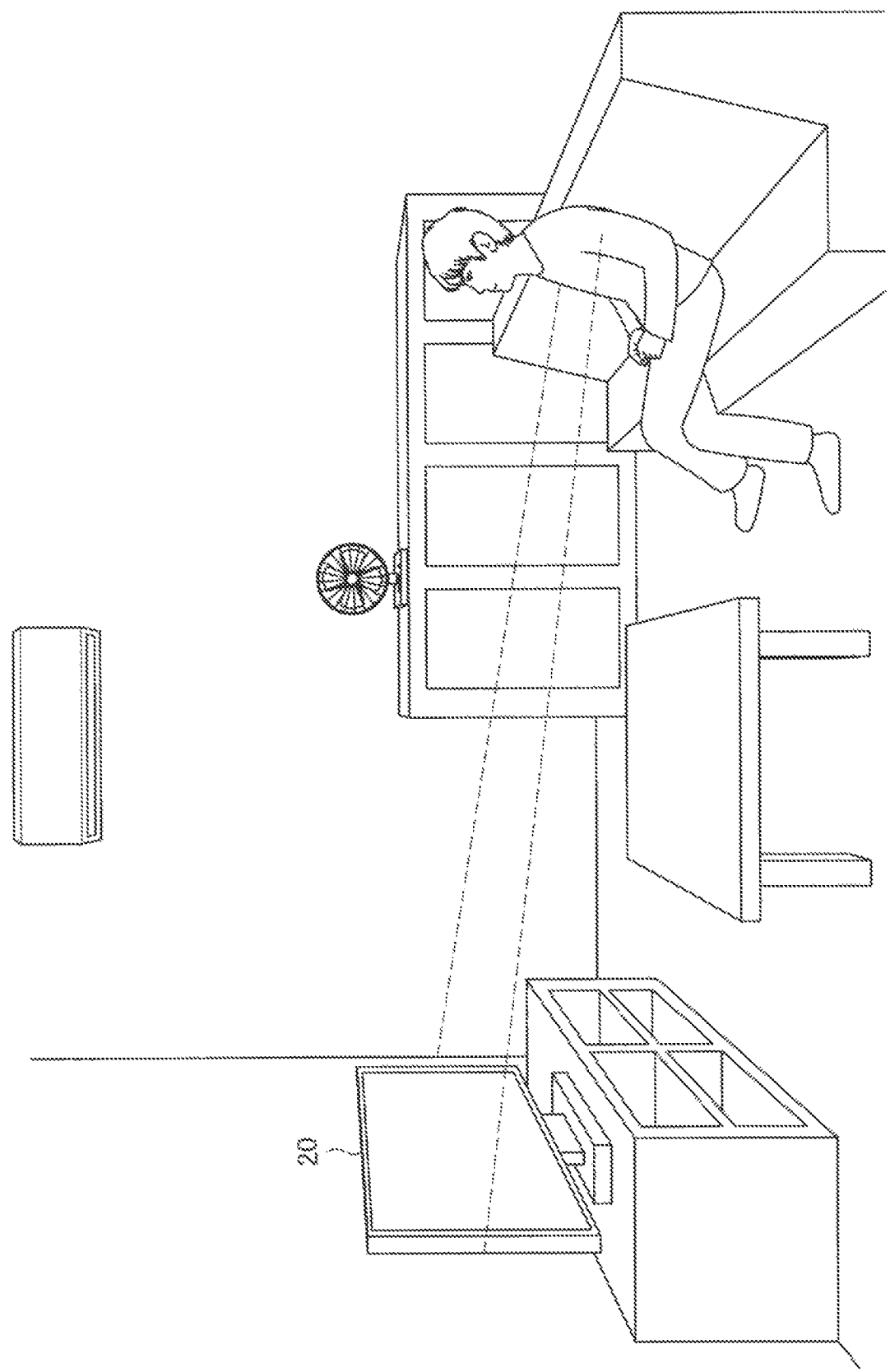
FIG. 11 is a diagram for describing an example of first device selection in an information processing system according to a first modification example of the embodiment.

In a first modification example of the embodiment, the information processing system 1 may perform the first device selection on the basis of another body form. Specifically, the information processing apparatus 100-1 performs the first device selection on the basis of a user's posture. More specifically, the device selection unit 102 selects a device or devices to be operated that is determined to fall within a range decided from the user's posture in the first device selection as an operation target device or candidate devices. Further, processing in the modification example will be described with reference to FIG. 11. FIG. 11 is a diagram for describing an example of the first device selection in the information processing system 1 according to the first modification example of the embodiment.

The recognition unit 101 recognizes a posture of at least a part of the user's body on the basis of image information or the like. For example, the recognition unit 101 recognizes an orientation of the user's face or body that appears in an image on the basis of image information related to a three-dimensional image received from the projection imaging device 10.

Next, the device selection unit 102 decides a device selection range on the basis of the user's posture. For example, the device selection unit 102 decides a device selection range as illustrated in FIG. 11 with reference to the recognized orientation of the user's face or body.

Then, the device selection unit 102 selects a device or devices to be operated that falls within the decided device selection range as an operation target device or candidate devices. For example, the device selection unit 102 selects the display device 20 that falls within the decided device selection range as illustrated in FIG. 11 as an operation target device. Note that in a case in which a plurality of devices to be operated fall within the decided device selection range, the plurality of devices to be operated are selected as candidate devices.

Figure 12:
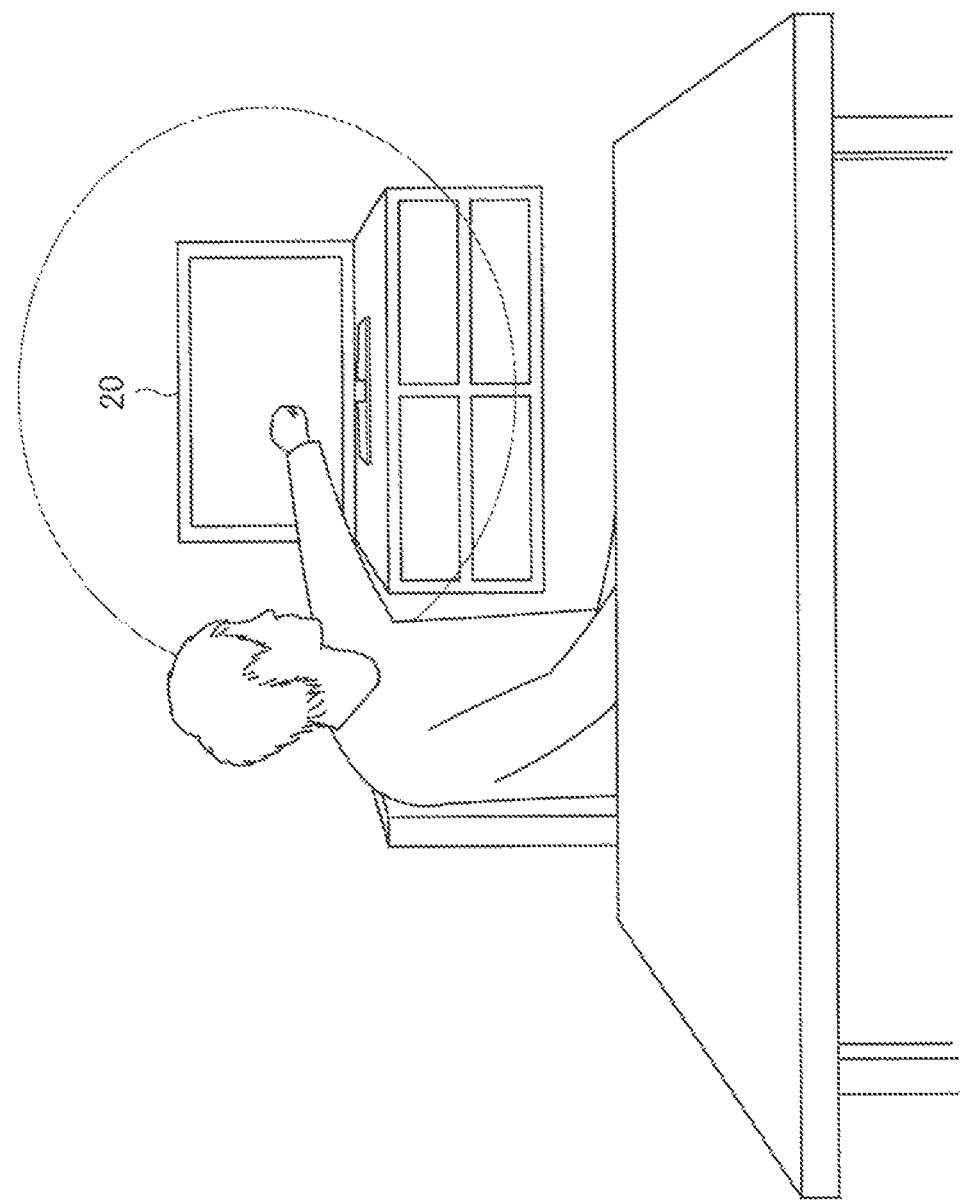
FIG. 12 is a diagram for describing another example of the first device selection in the information processing system according to the first modification example of the embodiment.

In addition, the information processing apparatus 100-1 may perform the first device selection on the basis of user's motion in another example. Specifically, the device selection unit 102 selects a device or devices to be operated that are determined to fall within a range decided from user's motion in the first device selection as an operation target device or candidate devices. Further, processing in this another example of the modification example will be described with reference to FIG. 12. FIG. 12 is a diagram for describing another example of the first device selection in the information processing system 1 according to the first modification example of the embodiment.

The recognition unit 101 recognizes user's motion on the basis of image information or the like. For example, the recognition unit 101 recognizes a user's gesture or action that appears in an image on the basis of image information related to a three-dimensional image received from the projection imaging device 10. The gesture includes, for example, a motion of depicting a circle, double tapping, flicking, clapping, contact to an object, and the like.

Next, the device selection unit 102 decides a device selection range on the basis of user's motion. If gripping of a hand directed to a device to be operated as illustrated in FIG. 12 is recognized, for example, the device selection unit 102 decides the device selection range as illustrated in FIG. 12 with reference to the hand.

Then, the device selection unit 102 selects a device or devices to be operated that falls within the decided device selection range as an operation target device or candidate devices. Specifically, the device selection unit 102 selects the display device 20 that falls within the decided device selection range as illustrated in FIG. 12 as an operation target device. Note that in a case in which a plurality of devices to be operated fall within the decided device selection range, the plurality of devices to be operated are selected as candidate devices.

Figure 13:
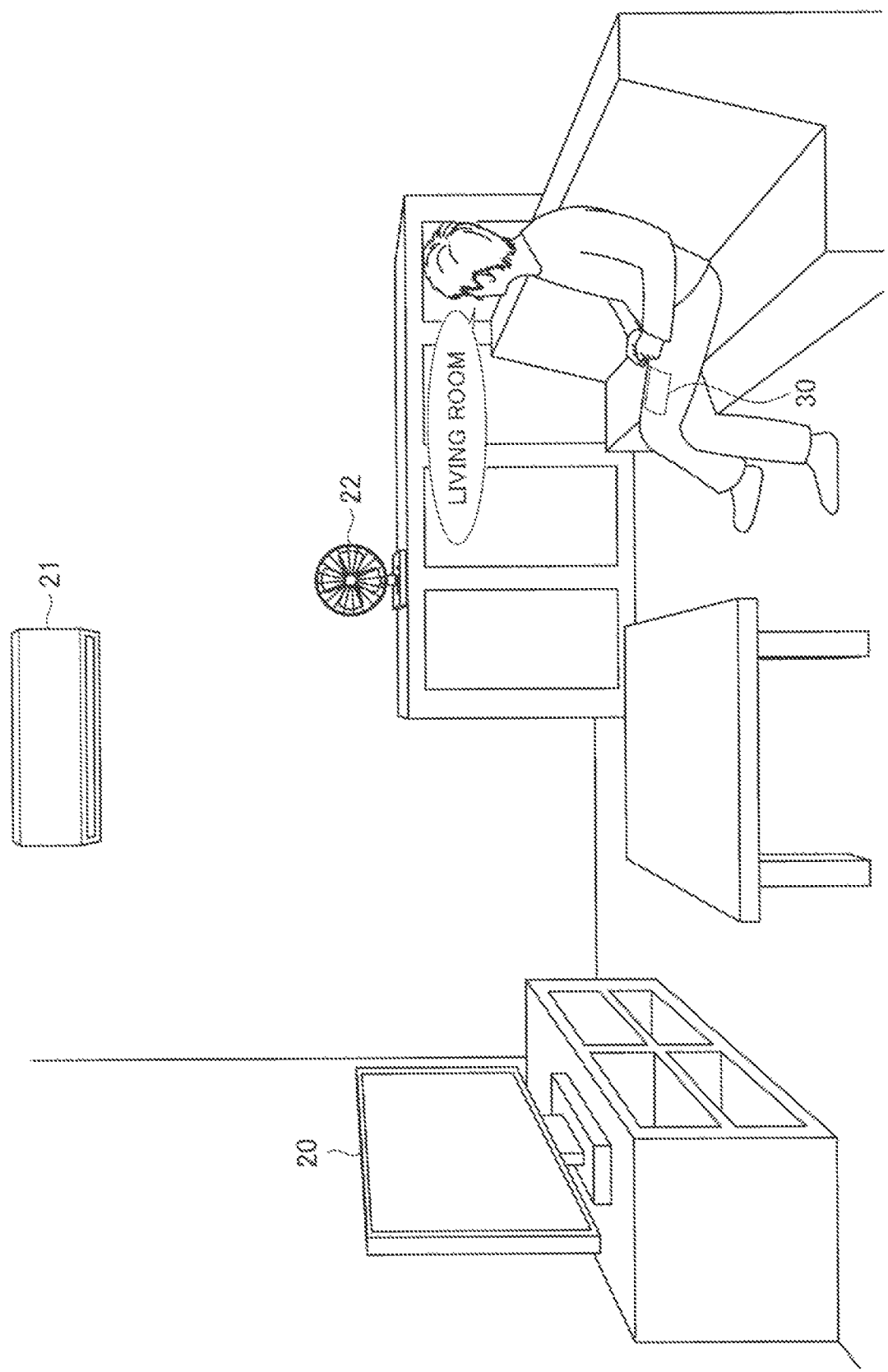
FIG. 13 is a diagram for describing yet another example of the first device selection in the information processing system according to the first modification example of the embodiment.

In addition, the information processing apparatus 100-1 may perform the first device selection on the basis of user's speech generation in yet another example. Specifically, the device selection unit 102 selects a device or devices to be operated that are determined to fall within a range decided from user's speech generation in the first device selection as an operation target device or candidate devices. Further, processing in this yet another example of the modification example will be described with reference to FIG. 13. FIG. 13 is a diagram for describing a yet another example of the first device selection in the information processing system 1 according to the first modification example of the embodiment.

The recognition unit 101 recognizes user's speech generation on the basis of sound information. For example, the recognition unit 101 recognizes presence of user's speech generation or content of speech generation on the basis of sound information received from a sound input device that the information processing system 1 separately includes.

Next, the device selection unit 102 decides a device selection range on the basis of user's speech generation. If content of user's speech generation of "living room" as illustrated in FIG. 13 is recognized, for example, the device selection unit 102 decides the living room as a device selection range.

Then, the device selection unit 102 selects a device or devices to be operated that fall within the decided device selection range as an operation target device or candidate devices. Specifically, the device selection unit 102 selects the display device 20, the air conditioner device 21, and the blower device 22 that are present in the decided device selection range, namely in the living room as candidate devices. Note that in a case in which only one device to be operated is present in the decided device selection range, the device to be operated is selected as an operation target device.

According to the first modification example of the embodiment, the body form of the operation subject includes a posture of the operation subject, and the devices to be operated that are determined to fall within a region decided from the posture of the operation subject are selected through the first device selection as described above. In a case in which the user operates a device to be operated, the user is generally in a posture in accordance with the device to be operated. Therefore, it is possible to select appropriate candidate devices in the first device selection by selecting the candidate devices in accordance with the user's posture. In addition, since there is a case in which processing with a higher burden is used in the line-of-sight detection than in the posture detection, it is possible to reduce the processing burden as compared with the first device selection based on the visual recognition form. Therefore, it is possible to improve responsiveness.

In addition, the body form of the operation subject includes motion of the operation subject, and devices to be operated that are determined to fall within a region decided from the motion of the operation subject are selected through the first device selection in another example of the modification example. Therefore, it is possible to realize the first device selection that further conforms to user's intention by selection from among the candidate devices in accordance with user's explicit motion with respect to the first device selection. Therefore, it is possible to further improve operability in the first device selection.

In addition, the body form of the operation subject includes speech generation from the operation subject, and devices to be operated that are determined to fall within a region decided from the speech generation from the operation subject are selected through the first device selection in yet another example of the modification example. Therefore, it is possible for the user to select a device to be operated without moving his/her body. Therefore, it is possible to select a device to be operated that the user desires to operate and to operate the device while separately performing a task and without directing the line of sight to the device.

Note that the first device selection may be performed on the basis of a form of an object that the user operates, instead of the user's body. Specifically, the information processing apparatus 100-1 decides a device selection range from a form of an object that the user operates and selects devices to be operated, which fall within the device selection range in accordance with a decision operation performed to the object in the first device selection.

For example, the object that the user operates may be a device such as a smartphone, and the recognition unit 101 recognizes an orientation or the like of the smartphone. The device selection unit 102 decides a device selection range in accordance with the recognized orientation or the like of the smartphone. Then, the recognition unit 101 recognizes an operation, such as a down-flicking operation, performed to the smart phone. If the down-flicking operation is recognized, the device selection unit 102 selects devices to be operated in the decided device selection range. Note that the recognition unit 101 may acquire information related to the form of the object from the object or another external device instead of recognizing the form of the aforementioned object from image information or the like.

In this case, it becomes easier to determine whether or not the user's form is a form for the first device selection as compared with the user's body form. Therefore, it is possible to suppress the concern of improper operating of the processing in the first device selection. In addition, in a case in which information related to the form of the object is obtained from the aforementioned object, it is possible to more accurately recognize the form of the object. Therefore, it is possible to improve accuracy of the processing in the first device selection.

Second Modification Example

In a second modification example of the embodiment, selection objects may be displayed without a decision operation in the first device selection. Specifically, the projection control unit 103 decides the body of the operation subject or the surroundings of the operation subject that has a region in which the selection objects can be displayed such that the selection objects are visually recognized by the operation subject (hereinafter, also referred to as a projection available region), and causes the projection imaging device 10 to project the selection objects at the decided location.

More specifically, the projection control unit 103 searches for the projection available region such that the selection objects are visually recognized by the user. The projection available region may be a region with the maximum broadness on the user's body or in the surroundings of the user. In addition, the projection available region may be determined in accordance with a degree of irregularity of the surface, a surface color, a texture, presence of a pattern, or the like. For example, the projection available region may be a flat surface or a surface with irregularity within an allowable range, a surface with color or texture uniformity within an allowable range, or a surface that does not include any pattern. In detail, a white flat surface may be selected as the projection available region with priority.

Figure 14:
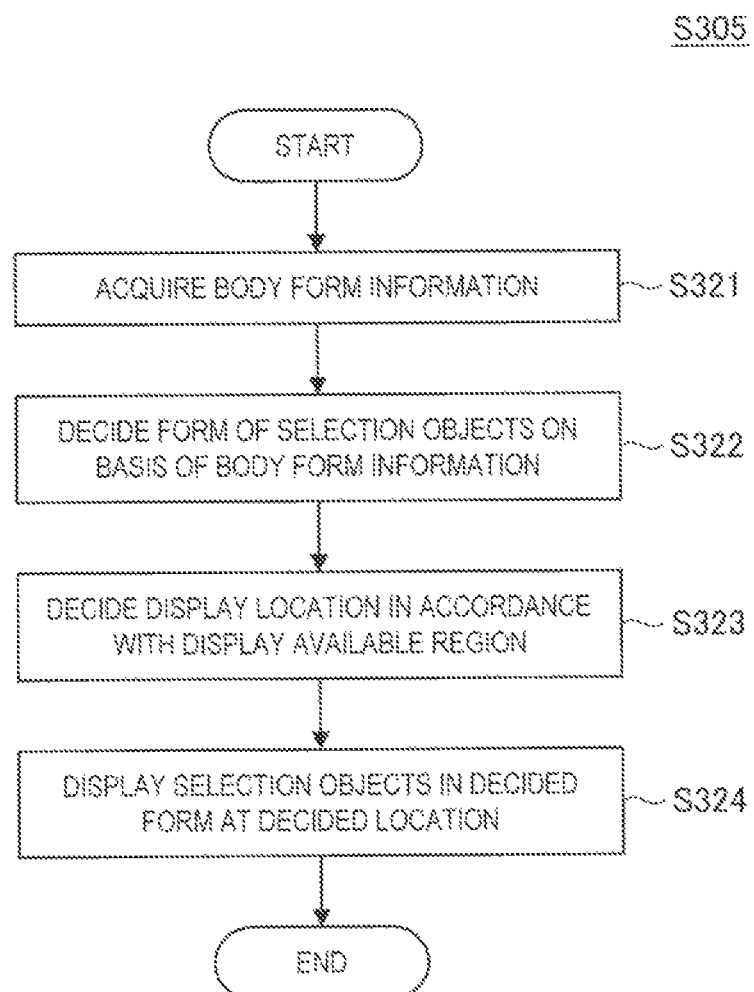
FIG. 14 is a flowchart conceptually illustrating an example of selection object display processing of an information processing system according to a second modification example of the embodiment.

Further, processing in the modification example will be described with reference to FIG. 14. FIG. 14 is a flowchart conceptually illustrating an example of selection object display processing of the information processing system 1 according to the second modification example of the embodiment. Note that description of processing that is substantially the same as the aforementioned processing will be omitted.

The information processing system 1 acquires body form information (Step S321) and decides a form of the selection object on the basis of the acquired body form information (Step S322).

Next, the information processing system 1 decides a display location in accordance with a display available region (Step S323). Specifically, the projection control unit 103 searches for a projection available region on the user's body or in the surroundings of the user. Then, if a region that satisfies conditions is found, the projection control unit 103 decides the region as the projection available region.

Then, the information processing system 1 displays selection objects in a decided form at the decided location (Step S324). Specifically, the projection control unit 103 causes the projection imaging device 10 to project the selection objects in the region on the user's body or in the surroundings of the user decided as the projection available region.

According to the second modification example of the embodiment, the selection objects are displayed on the body of the operation subject or in the surroundings of the operation subject that have a region in which the selection objects can be displayed such that the selection objects are visually recognized by the operation subject as described above. Therefore, it is possible to project the selection objects without the user's decision operation in the first device selection. Therefore, it is possible to perform the first device selection even in a situation in which the user cannot perform the decision operation, for example, when the user is performing a task.

Third Modification Example

Figure 15:
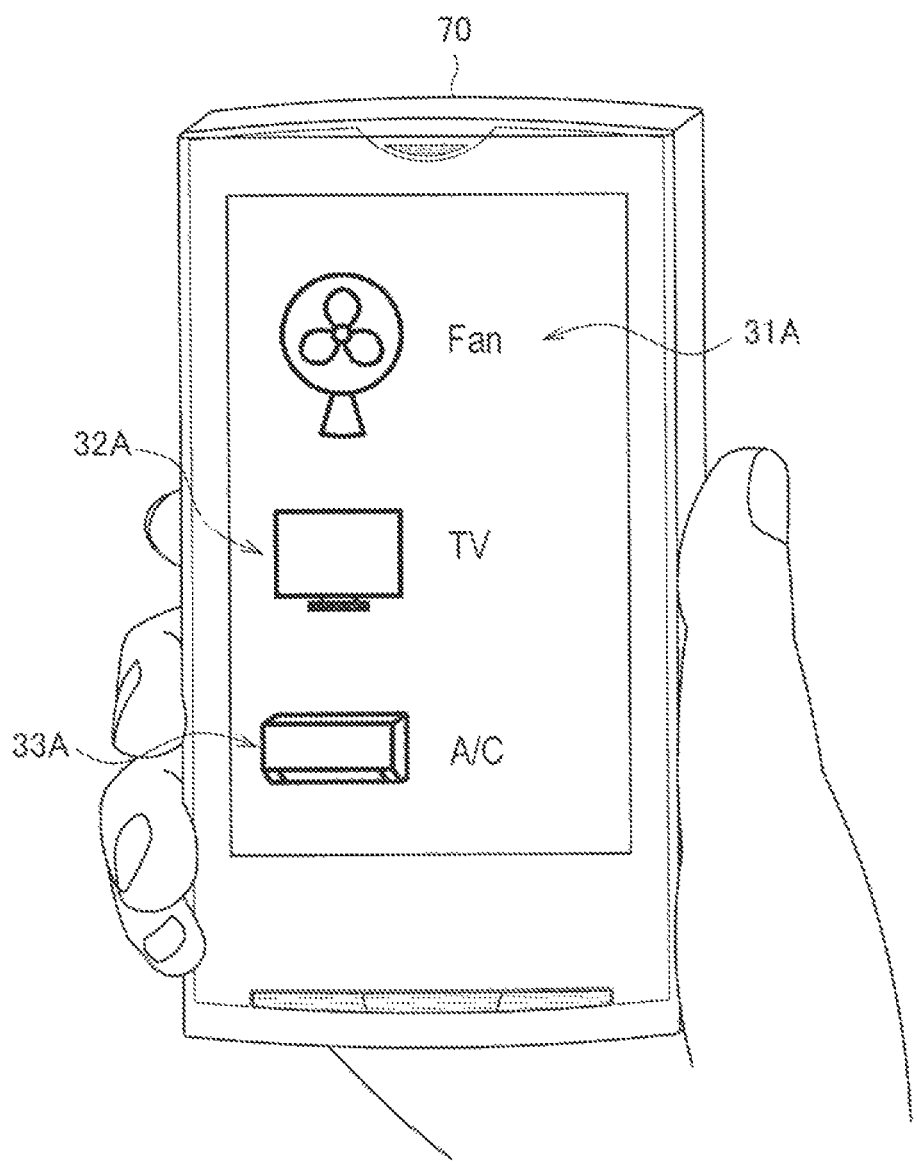
FIG. 15 is a diagram illustrating an example of display of selection objects in an information processing system according to a third modification example of the embodiment.

In a third modification example of the embodiment, the display form of the selection objects may be another form. Specifically, the display location of the selection objects may be another location. For example, the selection objects may be displayed on a display unit designated through a decision operation in the first device selection. In detail, in a case in which an operation destination of the decision operation in the first device selection is the display device, the projection control unit 103 causes the display device to display the selection objects. Further, processing in the modification example will be described with reference to FIG. 15. FIG. 15 is a diagram illustrating an example of display of the selection objects in the information processing system 1 according to the third modification example of the embodiment.

The recognition unit 101 recognizes an operation destination of the decision operation in the first device selection. If the decision operation in the first device selection is recognized, for example, the recognition unit 101 recognizes the operation destination of the decision operation.

In a case in which the recognized operation destination is the display device, the projection control unit 103 determines whether or not it is possible to control the display device. In a case in which the recognized operation destination is a smartphone 70 as illustrated in FIG. 15, for example, the projection control unit 103 determines whether or not it is possible to control at least a display function of the smartphone 70.

In a case in which it is determined to be possible to control the display device, the projection control unit 103 causes the display device to display the selection objects. If it is determined to be possible to control the display function of the smartphone 70, for example, the projection control unit 103 causes the communication unit 105 to transmit image information related to the selection objects to the smartphone 70. The smartphone 70 displays selection objects 31A to 33A on the display unit on the basis of the received image information.

Note that if a selecting operation on the selection objects displayed on the display unit of the smartphone 70 is performed, operation objects for the device to be operated corresponding to the selected selection object is displayed on the display unit of the smartphone 70. Then, the operation target device is controlled in accordance with an operation performed to the displayed operation objects.

Figure 16:
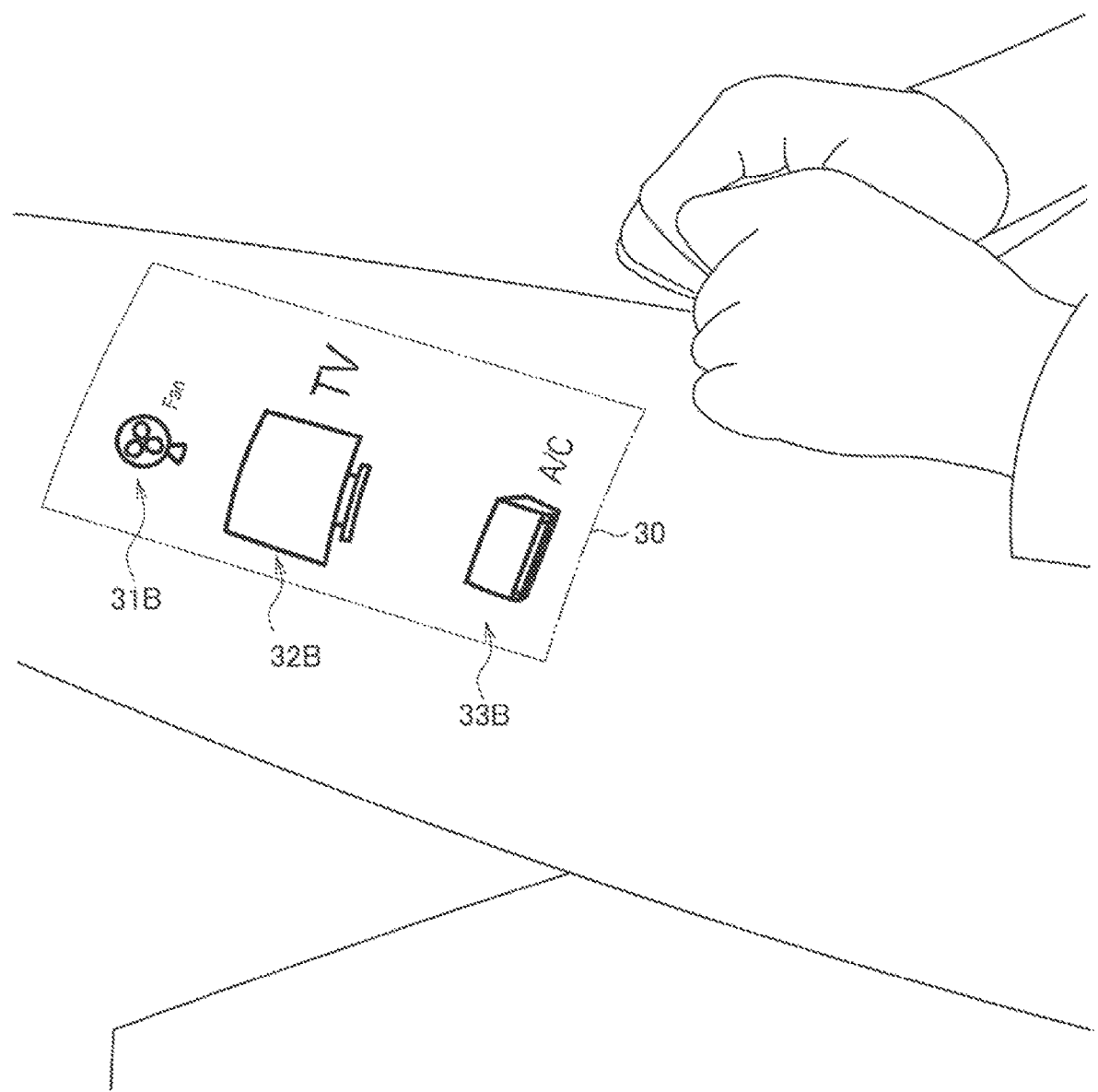
FIG. 16 is a diagram illustrating another example of display of the selection objects in the information processing system according to the third modification example of the embodiment.

In addition, the form of the selection objects in accordance with priority information may be another form. Specifically, the sizes of the selection objects may be decided in accordance with the priority information. For example, the projection control unit 103 decides the sizes of the selection objects on the basis of the body form in the first device selection. Further, other processing in the modification example will be described with reference to FIG. 16. FIG. 16 is a diagram illustrating another example of display of the selection objects in the information processing system 1 according to the third modification example of the embodiment.

The projection control unit 103 decides the sizes of the selection objects in accordance with distances from the user's line of sight to the candidate devices in the three-dimensional space in the first device selection. For example, the projection control unit 103 respectively calculates the distances from the distances from the user's line of sight to the display device 20, the air conditioner device 21, and the blower device 22. Then, the projection control unit 103 decides the sizes of the selection objects such that the sizes increase as the calculated distances are shorter. In detail, the projection control unit 103 decides the size of the selection object 32B for the display device 20 with the shortest distance calculated from among the candidate devices as the largest size from among the candidate devices as illustrated in FIG. 16. In addition, the projection control unit 103 decides the size of the selection object 31B for the blower device 22 with the longest distance calculated from among the candidate devices as the smallest size from among the candidate devices as illustrated in FIG. 16.

According to the third modification example of the embodiment, the location in accordance with the decision operation in the first device selection includes the display unit designated through the decision operation as described above. Therefore, it is possible to secure visibility of the selection objects by the selection objects being displayed on the display unit. In a case in which the selection objects are projected, in particular, the configuration according to the modification example is thus advantageous since it becomes difficult to project the selection objects when some object is present between the projection location and the projection device.

In addition, the form of the selection objects controlled on the basis of the priority information includes the sizes of the selection objects. Therefore, it is possible to make it easier to grasp the device to be operated that the user desires to operate. Accordingly, it is possible to improve operability of the selection objects.

Fourth Modification Example

In a fourth modification example of the embodiment, the priority information related to the display form of the selection objects may be other information. Specifically, the priority information may be information decided on the basis of biological information of the operation subject. More specifically, the biological information includes information related to user's pulse, body temperature, sweating, brain waves, and the like, and the projection control unit 103 estimates a device to be operated that the user desires to operate from the biological information. Then, the projection control unit 103 decides alignment or sizes of the selection objects such that the selection objects for the estimated device to be operated are easily selected. In a case in which the user's body temperature is lower than a normal temperature, that is, in a case in which it is estimated that the user is feeling cold, for example, selection objects are projected with such alignment or sizes that selection objects for a candidate device such as an air conditioner device or a heating device are easily selected.

In addition, the priority information may be information decided on the basis of information related to a surrounding environment of the operation subject (hereinafter, also referred to as surrounding environment information). For example, the surrounding environment information includes information related to a temperature, a humidity, luminance, noise, or the like, and the projection control unit 103 estimates a device to be operated that the user desires to operate from the surrounding environment information. In a case in which the volume of noise is higher than a threshold value, that is, in a case in which it is estimated that the user is feeling noisy, for example, selection objects are projected with such alignment or sizes that selection objects for a candidate device such as a video replay device or a sound output device are easily selected.

Figure 17:
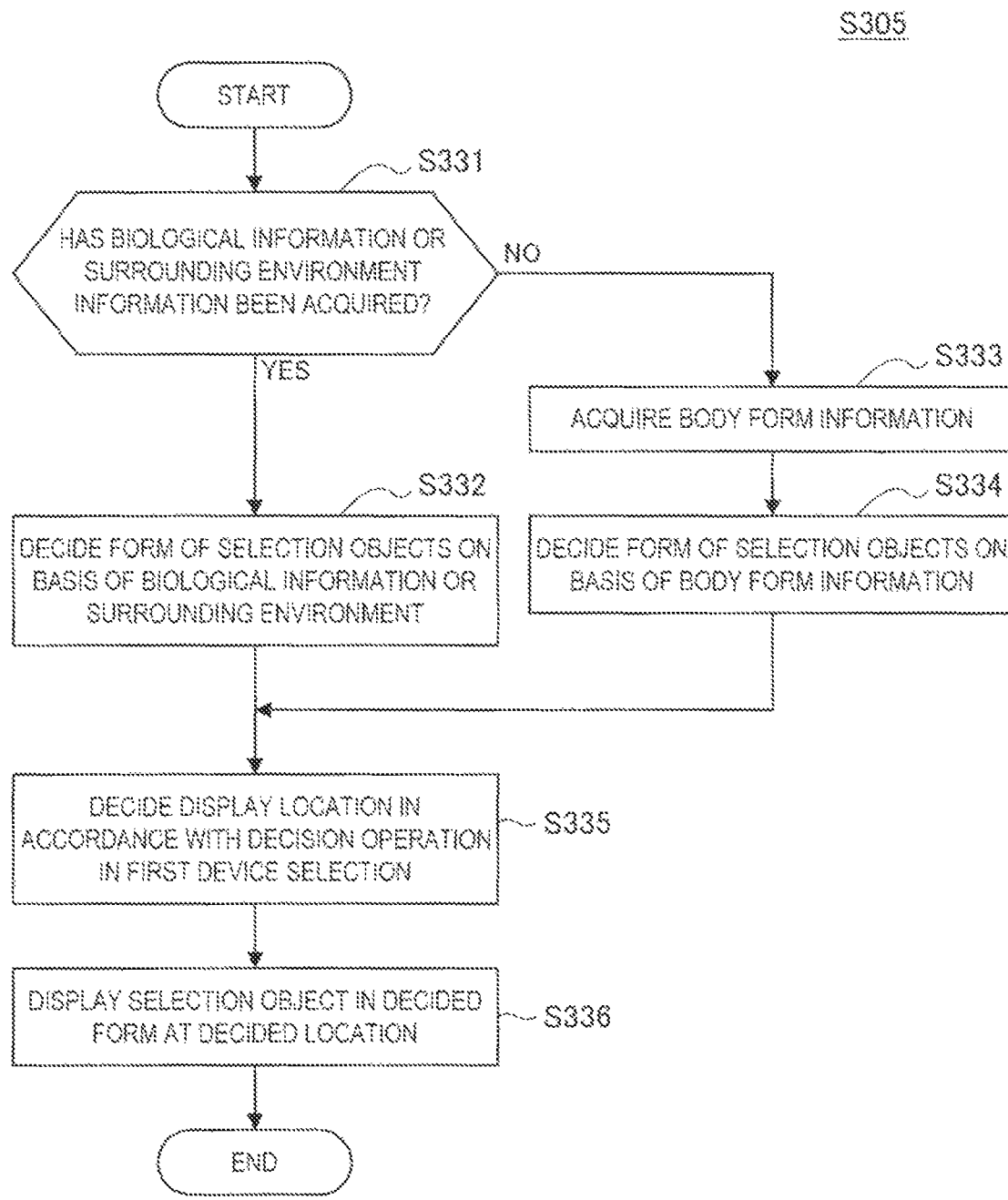
FIG. 17 is a flowchart conceptually illustrating an example of selection object display processing of an information processing system according to a fourth modification example of the embodiment.

Further, processing in the modification example will be described with reference to FIG. 17. FIG. 17 is a flowchart conceptually illustrating an example of selection object display processing of the information processing system 1 according to the fourth modification example of the embodiment. Note that description of processing that is substantially the same as the aforementioned processing will be omitted.

The information processing system 1 determines whether or not biological information or surrounding environment information has been acquired (Step S331). Specifically, the projection control unit 103 determines whether or not biological information or surrounding environment information has been acquired. Note that the biological information may be acquired via the communication unit 105 while the surrounding environment information may be acquired via the communication unit 105 or may be generated in recognition processing of the recognition unit 101.

If it is determined that the biological information or the surrounding environment information has bee acquired, the information processing system 1 decides a form of selection objects on the basis of the biological information or the surrounding environment information (Step S332). Specifically, the projection control unit 103 estimates a device to be operated that the user desires to operate from among candidate devices from the biological information or the surrounding environment information for the respective candidate devices. Then, the projection control unit 103 decides the form of the selection object for the candidate device that is estimated to be the device to be operated that the user desires to operate as easily selectable form.

In addition, if it is determined that neither the biological information nor the surrounding environment information has been acquired, the information processing system 1 acquires body form information (Step S333) and decides a form of the selection objects on the basis of the acquired body form information (Step S334).

Next, the information processing system 1 decides a display location in accordance with the decision operation in the first device selection (Step S335) and displays the selection objects in the decided form at the decided location (Step S336).

In addition, the priority information may be information decided on the basis of information related to operations of devices to be operated in the past. Specifically, the projection control unit 103 acquires, from the storage unit 106, a user's operation history of devices to be operated in the past, which has been recognized by the recognition unit 101, and estimates a device to be operated that the user desires to operate from the operation history. For example, a probability at which the user desires to operate a candidate device is estimated on the basis of time zones and locations of operations and operation orders of devices to be operated, which are grasped from the operation history, a time zone, a use's location, and a candidate device that is being selected at a current timing. Then, the selection objects are projected with such alignment or sizes that the selection objects with higher probability estimated are more easily selected.

Figure 18:
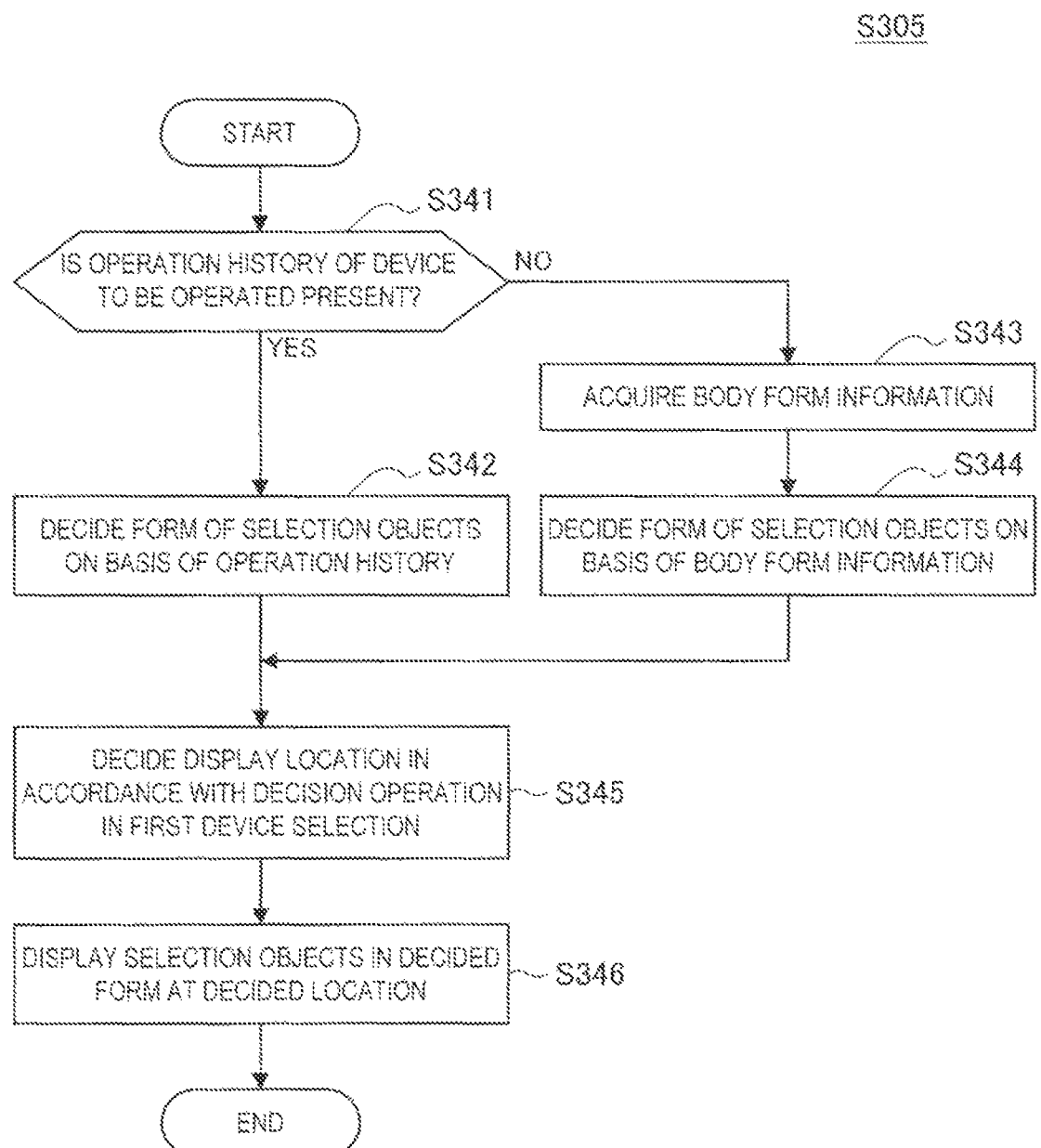
FIG. 18 is a flowchart conceptually illustrating another example of selection object display processing of the information processing system according to the fourth modification example of the embodiment.

Further, processing in the modification example will be described with reference to FIG. 18. FIG. 18 is a flowchart conceptually illustrating another example of selection object display processing of the information processing system 1 according to the fourth modification example of the embodiment. Note that description of processing that is substantially the same as the aforementioned processing will be omitted.

The information processing system 1 determines whether or not operation histories of devices to be operated are present (Step S341). Specifically, the projection control unit 103 determines whether or not operation histories of the devices to be operated are present in the storage unit 106. Note that presence of operation histories of the candidate devices from among operation histories of the devices to be operated may be determined.

If it is determined that operation histories are present, the information processing system 1 decides a form of selection objects on the basis of the operation histories (Step S342). Specifically, the projection control unit 103 estimates probabilities at which the candidate devices are the device to be operated that the user desires to operate on the basis of the operation histories for the respective candidate devices. Then, the projection control unit 103 decides the form of the selection objects for the candidate devices as such a form that the devices to be operated with higher probabilities at which the candidate devices are the device to be operated that the user desires to operate are more easily selected.

In addition, if it is determined that neither the biological information nor the surrounding environment information has been acquired, the information processing system 1 acquires body form information (Step S343) and decides a form of the selection objects on the basis of the acquired body form information (Step S344).

Next, the information processing system 1 decides a display location in accordance with the decision operation in the first device selection (Step S345) and displays the selection objects in the decided form at the decided location (Step S346).

According to the fourth modification example of the embodiment, the priority information includes information decided on the basis of the biological information of the operation subject or the information related to the surrounding environment of the operation subject as described above. Therefore, it is possible to decide the form of the selection objects in accordance with user's body conditions or body feeling. Accordingly, the selection objects for the desired device to be operated are more easily selected, and it is possible to further improve operability.

In addition, the priority information includes information decided on the basis of information related to operations of the devices to be operated in the past. Therefore, it is possible to decide a form of the selection objects in accordance with a tendency, a habit, or the like of user's operations. Therefore, the probability that the selection objects that are displayed in an easily selectable manner are the selection objects for the desired device to be operated increases, and it is possible to further improve operability.

Note that a plurality of sets of priority information pieces may be combined. For example, the projection control unit 103 may decide the form of the selection objects by using a combination of at least two of the user's body form information, the biological information, the surrounding environment information, and the operation histories. In addition, the priority information may be transformed into scores or the like, and the selection objects may be displayed in such a form that the candidate devices with higher scores are more easily selected.

Fifth Modification Example

Figure 19:
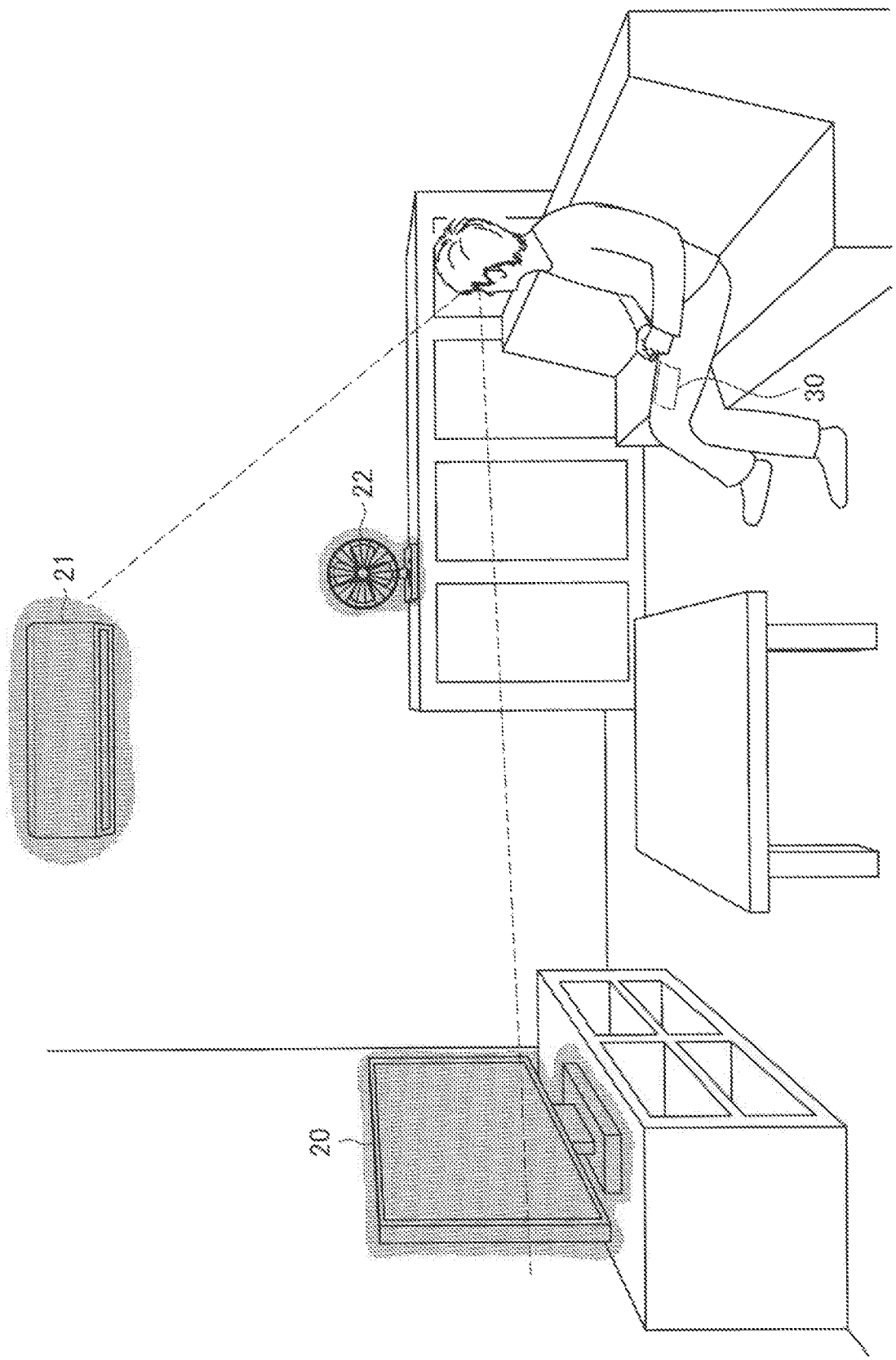
FIG. 19 is a diagram illustrating an example of a notification of devices to be operated, which have been selected through first device selection in an information processing system according to a fifth modification example of the embodiment.

In a fifth modification example of the embodiment, the notification of the candidate devices may be realized by another method. Specifically, the projection control unit 103 causes the projection imaging device 10 to perform such projection that the devices to be operated, which have been selected through the first device selection, that is, the candidate devices or the surroundings of the candidate devices appear distinctively when the selection objects are displayed. Further, an example of the notification of the candidate devices in the modification example will be described with reference to FIG. 19. FIG. 19 is a diagram illustrating an example of the notification of the devices to be operated, which have been selected through the first device selection, in the information processing system 1 according to the fifth modification example of the embodiment.

If a decision operation in the first device selection is recognized, the projection control unit 103 causes the projection imaging device 10 to perform projection that is visually recognized such that the plurality of respective candidate devices selected through the first device selection or the surroundings of the plurality of respective candidate devices are emitting light. If a decision operation in the first device selection is recognized as having been performed, for example, the projection control unit 103 causes the projection imaging device 10 to project a visual effect that is visually recognized by the user such that each of the display device 20, the air conditioner device 21, and the blower device 22 is emitting light as illustrated in FIG. 19. Note that an image or the like indicating the candidate devices, such as arrows, may be projected instead of the light emission.

Note that in a case in which the candidate devices have light emitting functions, the information processing apparatus 100-1 may cause the candidate devices to emit light. If a decision operation in the first device selection is recognized, for example the device control unit 104 causes the communication unit 105 to transmit light emitting requests directed to the candidate devices. The candidate devices that have received the light emitting requests causes light emitting substances that the devices themselves have to emit light for a predetermined period of time on the basis of the light emitting request. In this case, it is possible to reduce the burden of the projection processing by the candidate devices themselves emitting light as compared with the case in which projection is used.

Figure 20:
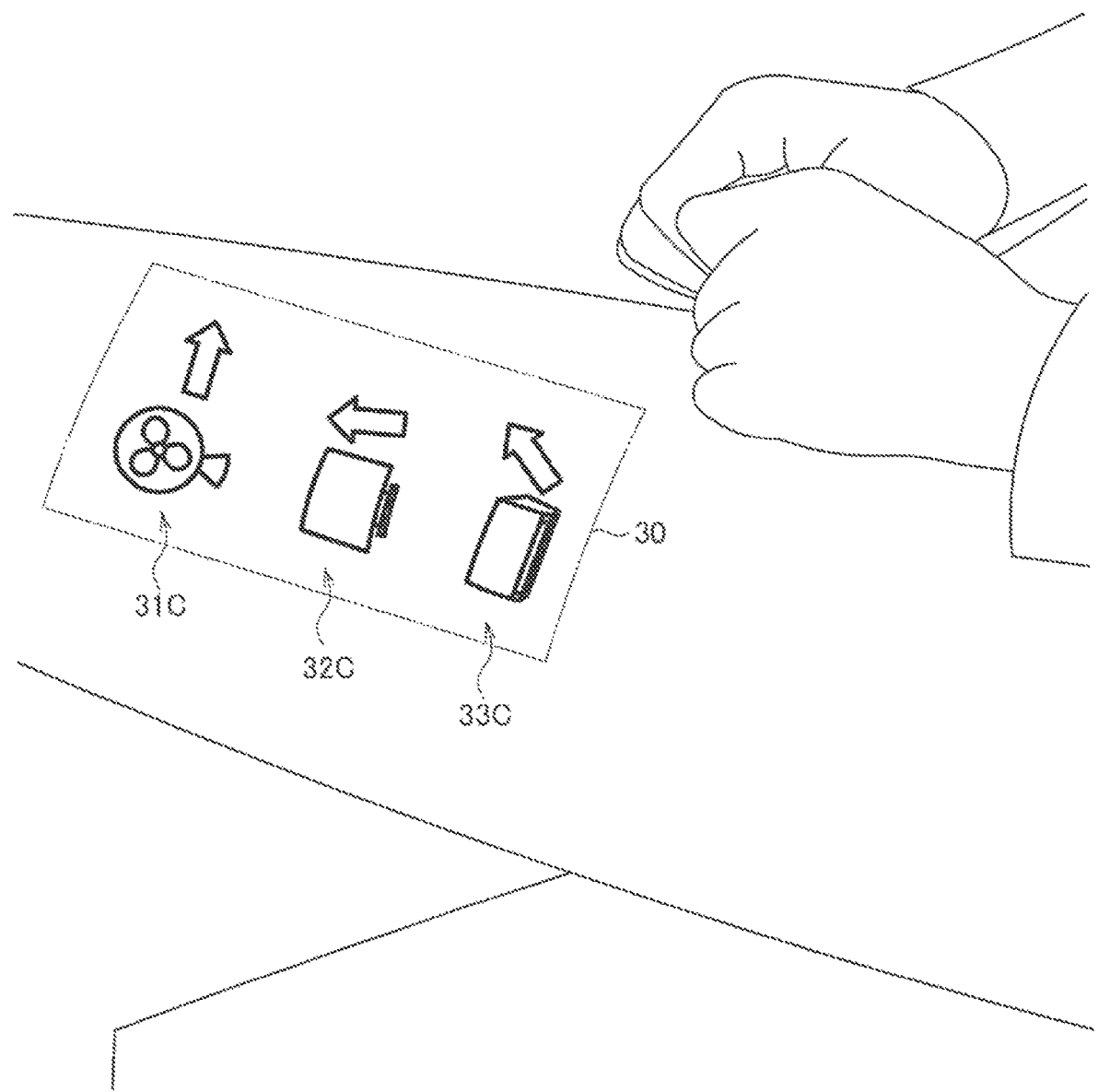
FIG. 20 is a diagram illustrating another example of a notification of devices to be operated, which have been selected through the first device selection in the information processing system according to the fifth modification example of the embodiment.

In addition, the projection control unit 103 may cause the projection imaging device 10 to perform projection indicating locations of the candidate devices of the selection objects when the selection objects are displayed. Specifically, an image indicating locations of the candidate devices may be displayed in a display region for the selection objects. Further, another example of the notification of the candidate devices according to the modification example will be described with reference to FIG. 20. FIG. 20 is a diagram illustrating another example of the notification of the devices to be operated, which have been selected through the first device selection, in the information processing system 1 according to the fifth modification example of the embodiment.

If a decision operation in the first device selection is recognized, the projection control unit 103 causes the projection imaging device 10 to project selection objects that have images indicating locations of the candidate devices. If a decision operation in the first device selection is recognized as having been performed, for example, the projection control unit 103 causes the projection imaging device 10 to project the selection objects 31C, 32C, and 33C that have images, such as arrows, indicating the respective locations of the blower device 22, the display device 20, and the air conditioner device 21, respectively, in the region 30 as illustrated in FIG. 20.

Figure 21:
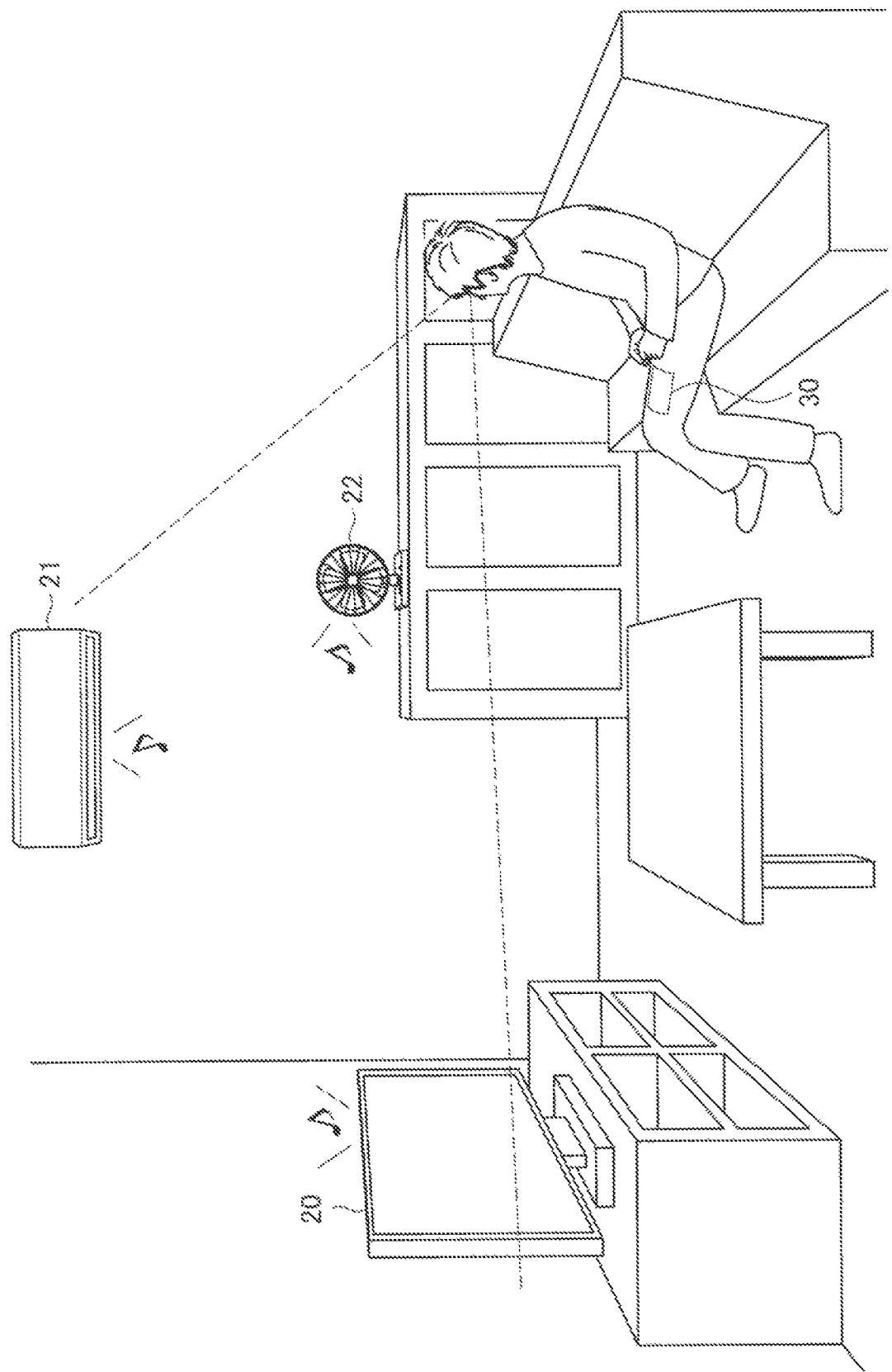
FIG. 21 a diagram illustrating yet another example of a notification of devices to be operated, which have been selected through the first device selection in the information processing system according to the fifth modification example of the embodiment.

In addition, the notification of the candidate devices may be an audible notification. Specifically, the device control unit 104 may control sound outputs from a region within which the selected devices to be operated fall. Further, another example of the notification of the candidate devices according to the modification example will be described with reference to FIG. 21. FIG. 21 is a diagram illustrating yet another example of the notification of the devices to be operated, which have been selected through the first device selection, in the information processing system 1 according to the fifth modification example of the embodiment.

If a decision operation in the first device selection is recognized, the device control unit 104 causes the communication unit 105 to transmit a sound output request directed to the candidate devices in a case in which the candidate devices have sound output functions. Each of the candidate devices that has received the sound output request outputs sound as illustrated in FIG. 21 on the basis of the sound output request. Note that the output sound may be simple sound, music, or voice. In addition, the output sound may differ or the same for each of the devices to be operated. In addition, the sound may be output toward the user in a case in which the devices to be operated have a function of adding directionality to the sound outputs.

Note that although the case in which the candidate devices have the sound output function has been described above, the information processing system 1 may utilize a phenomenon such as reflection of sound output from a separately provided sound output device to allow the user to perceive sound as if the candidate devices output the sound.

According to the fifth modification example of the embodiment, the notification of the candidate devices includes such a display output that the candidate devices or the surroundings of the candidate devices distinctively appear as described above. Therefore, it is possible for the user to grasp the devices to be operated, which have been selected as the candidate devices, at a glance. Accordingly, it is possible for the user to determine whether or not the devices to be operated have been selected as intended by the user at a glance and to quickly reselect the devices to be operated even if improper selection occurs in the first device selection.

In addition, the notification of the candidate devices includes a display output indicating locations of the candidate devices in the selection objects. Therefore, the user can check the devices to be operated, which have been selected as the candidate devices, from the operation objects. Therefore, the user can suppress occurrence of improper selection by checking whether selection objects are for the desired device to be operated before the selection. In a case in which a plurality of devices to be operated of the same kind are selected as candidate devices, for example, it may be difficult for the user to make the determination only from the selection objects. However, it is possible for the user to select the desired device to be operated even in this case by the locations of the candidate devices being presented to the user.

In addition, the notification of the candidate devices includes a sound output from a region within which the candidate devices fall. Therefore, it is possible for the user to audibly check the devices to be operated, which have been selected as the candidate devices. Accordingly, it is possible to grasp the candidate devices and to improve usability even in a case in which it is not possible to direct the line of sight to the candidate devices or the selection objects.

4. Second Embodiment of the Present Disclosure (Display of Operation Objects)

The first embodiment of the present disclosure has been described above. Next, a second embodiment of the present disclosure will be described. In the second embodiment of the present disclosure, an embodiment of the aforementioned operation object form control function of the information processing system 1 will be mainly described.

4-1. Configuration of System

First, a functional configuration of the information processing system 1 according to the embodiment will be described. Note that since the projection imaging device 10 is substantially the same as that in the first embodiment, only an information processing apparatus 100-2 will be described. In addition, description of functions that are substantially the same as the functions in the first embodiment from among functions of the information processing apparatus 100-2 will also be omitted.
(Recognition Unit)

The recognition unit 101 serves as an acquisition unit and recognizes a body form of the operation subject of devices to be operated. Specifically, the recognition unit 101 recognizes a user's posture as a body form and generates body form information related to the recognized user's posture. Note that since functions are substantially the same as those of the recognition unit 101 in the first embodiment, detailed description will be omitted.

In addition, the recognition unit 101 recognizes a predetermined operation of the operation subject. Specifically, the recognition unit 101 recognizes a user's display instructing operation for operation objects. For example, the display instructing operation for the operation objects may be a touching operation, a tapping operation, a pointing operation, or the like.
(Projection Control Unit)

Figure 22:
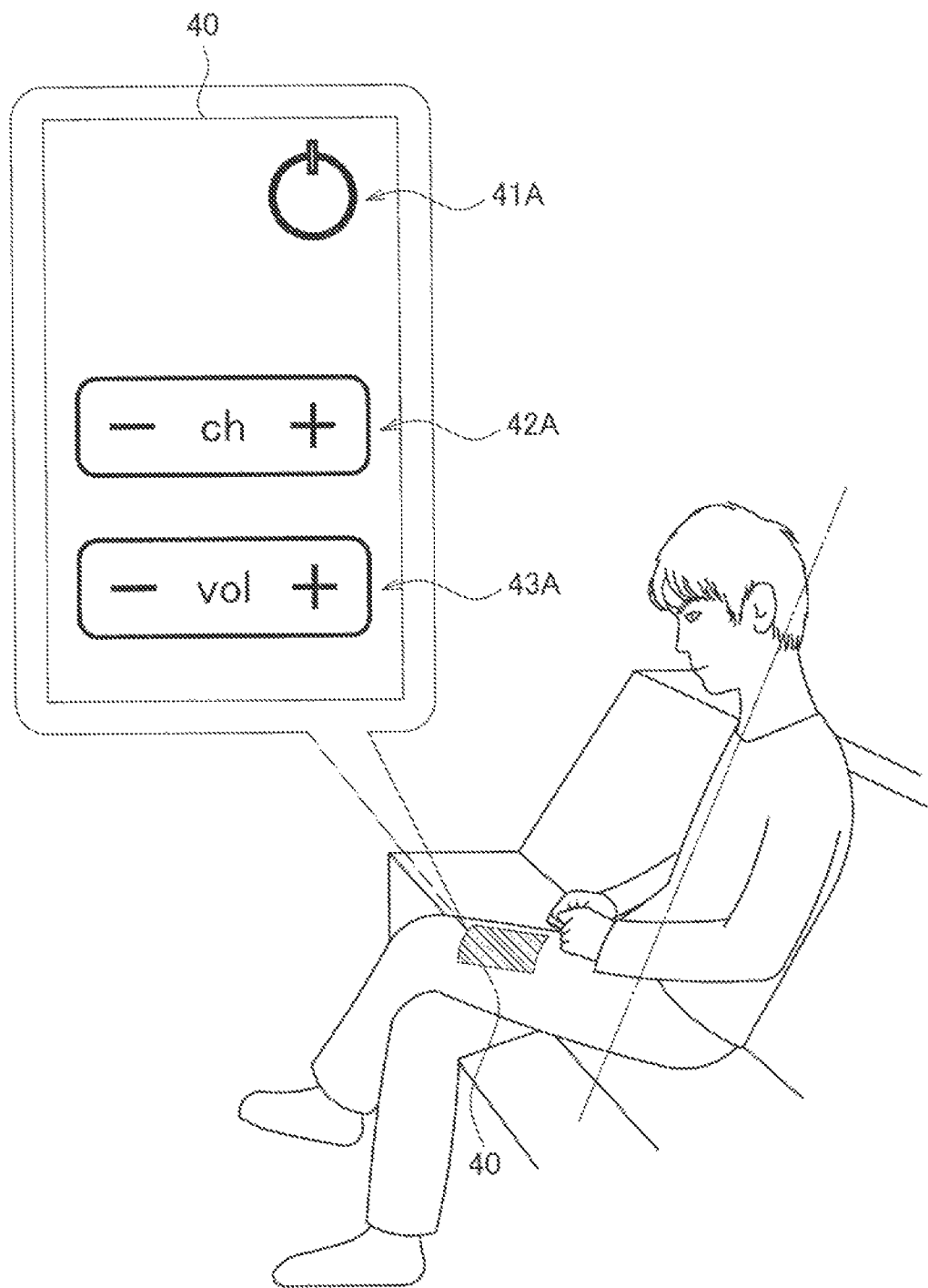
FIG. 22 is a diagram illustrating an example of display control for operation objects in an information processing system according to a second embodiment of the present disclosure.
Figure 23:
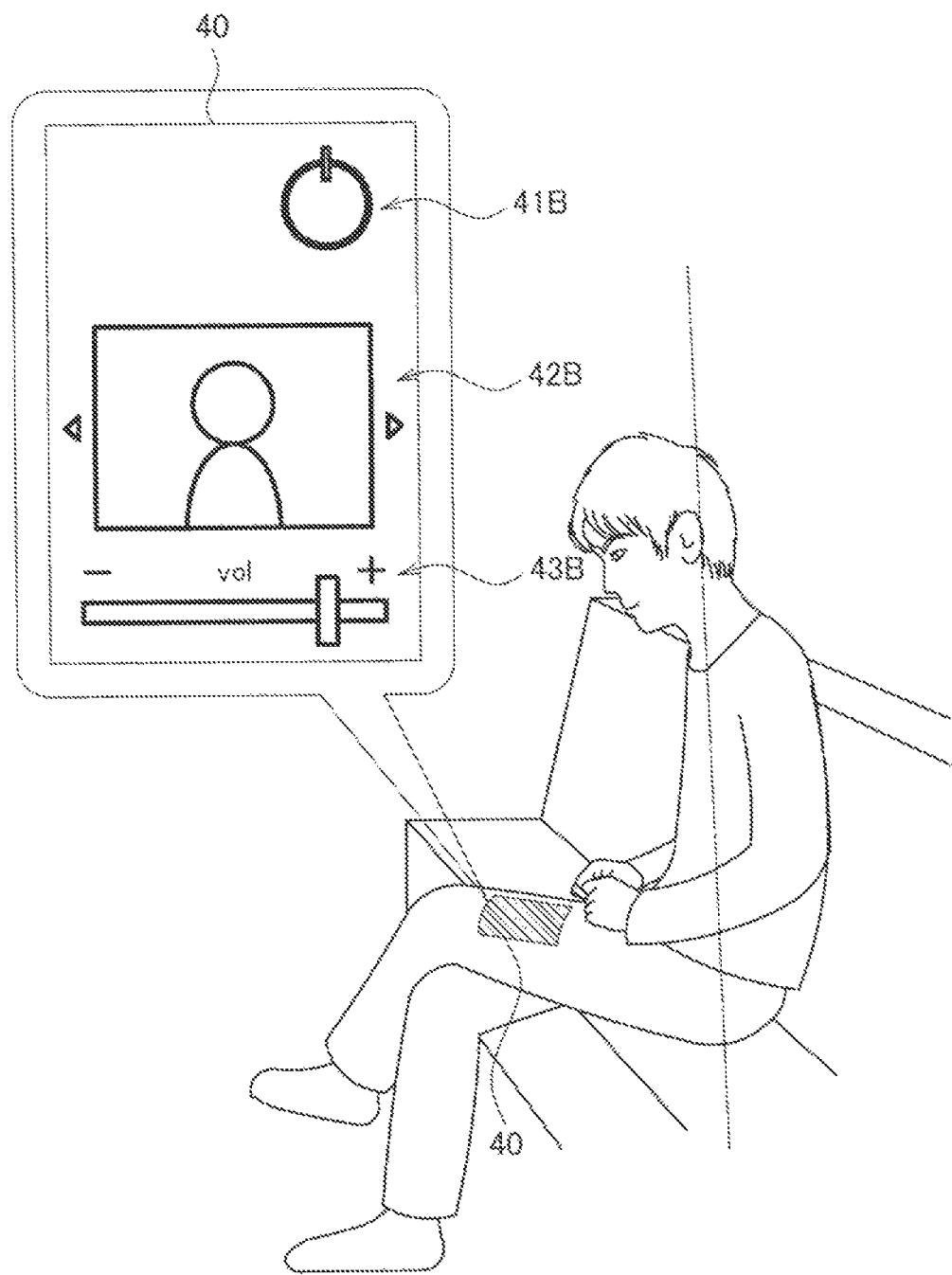
FIG. 23 is a diagram illustrating another example of the display control for the operation objects in the information processing system according to the embodiment.

The projection control unit 103 serves as a display control unit and controls display of operation objects for the devices to be operated. Specifically, the projection control unit 103 controls complication of the operation objects for the devices to be operated that are visually recognized as if the devices to be operated were present in a real space, on the basis of the recognized body form of the operation subject. For example, the projection control unit 103 causes the projection imaging device 10 to project operation objects that are visually recognized with complication in accordance with a user's posture recognized by the recognition unit 101. Further, display control for the operation objects will be described with reference to FIGS. 22 and 23. FIG. 22 is a diagram illustrating an example of display control for the operation objects in the information processing system 1 according to the embodiment. FIG. 23 is a diagram illustrating another example of display control for the operation objects in the information processing system 1 according to the embodiment.

First, if a predetermined motion is performed by the user, the user's posture is recognized by the recognition unit 101. If a user's display instructing operation for selection objects is recognized, for example, the recognition unit 101 recognizes the user's posture. Note that the aforementioned predetermined motion may be the selecting operation in the second device selection in the first embodiment.

The projection control unit 103 decides operation objects linked to a target of the predetermined motion as a display target. Specifically, the projection control unit 103 decides operation objects linked to an operation destination of the recognized display instructing operation for selection objects as display targets. If a tapping operation as the display instruction operation for selection objects is recognized as having been performed to the user's thigh, for example, the projection control unit 103 decides operation objects corresponding to the user's thigh as display targets. Note that in a case in which the aforementioned predetermined operation is the selecting operation in the second device selection in the first embodiment, the operation objects that are decided as the display targets may be operation objects for the operation target device.

In addition, the projection control unit 103 decides complication of the operation objects in accordance with the recognized user's posture. The complication of the operation objects includes complication of display or complications of operations. In a case in which the upper body of the user seated as illustrated in the right diagram in FIG. 22 is inclined backward to a predetermined extent (in a so-called leaning-backward state), for example, the projection control unit 103 reduces the amount of display of the operation objects or selects an operation object that can be easily operated as compared with a case in which the user is seated while the upper body is inclined forward as illustrated in the right diagram in FIG. 23 (in a so-called leaning-forward state). In this manner, it is possible to control the complication of the operation objects in accordance with whether or not the user is in a relaxed state. In other words, it is possible to control the complication of the operation objects in accordance with a degree of user's concentration on operations of a device to be operated. This is because the user is in a relaxed state in a case in which the user is in the leaning-backward state, for example, and it is considered that the user does not desire any detailed operation of a device to be operated.

In addition, the projection control unit 103 decides a location in accordance with the user's form as a display location of the operation objects. Specifically, the projection control unit 103 decides a location in accordance with a predetermined motion performed by the user as the display location of the operation objects. More specifically, the display location of the selection object may be the user's body. If a tapping operation on the user's thigh is recognized, for example, the projection control unit 103 decides the region on the user's thigh as illustrated in the left diagrams in FIGS. 22 and 23 as the display region of the operation objects.

Then, the projection control unit 103 causes the projection imaging device 10 to project the operation objects with the decided complication at the decided location. In a case in which the user is in the leaning-backward state, for example, the projection control unit 103 causes the projection imaging device 10 to project operation objects 41A, 42A, and 43A as illustrated in the right diagram in FIG. 22 in the region 40 on the user's thigh. The operation object 41A is an object for providing operations of activating and ending the display device. The operation object 42A is an object for providing operations of changing channels. The operation object 43A is an object for providing operations of changing volume.

Meanwhile, in a case in which the user is in the leaning-forward state, the projection control unit 103 causes the projection imaging device 10 to project operation objects 41B, 42B, and 43B as illustrated in the right diagram in FIG. 23 in the region 40 on the user's thigh. The operation objects 41B, 42B, and 43B provide operations that are substantially the same as those of the operation objects 41A, 42A, and 43A, respectively. However, the operation object 42B is accompanied with a thumbnail image related to a channel at a destination after changing, for example, unlike the operation object 42A. In addition, the operation object 43B can arbitrarily change the volume by moving a sliding bard rather than changing the volume one by one in a stepwise manner unlike the operation object 43A.

4-2. Processing of System

Figure 24:
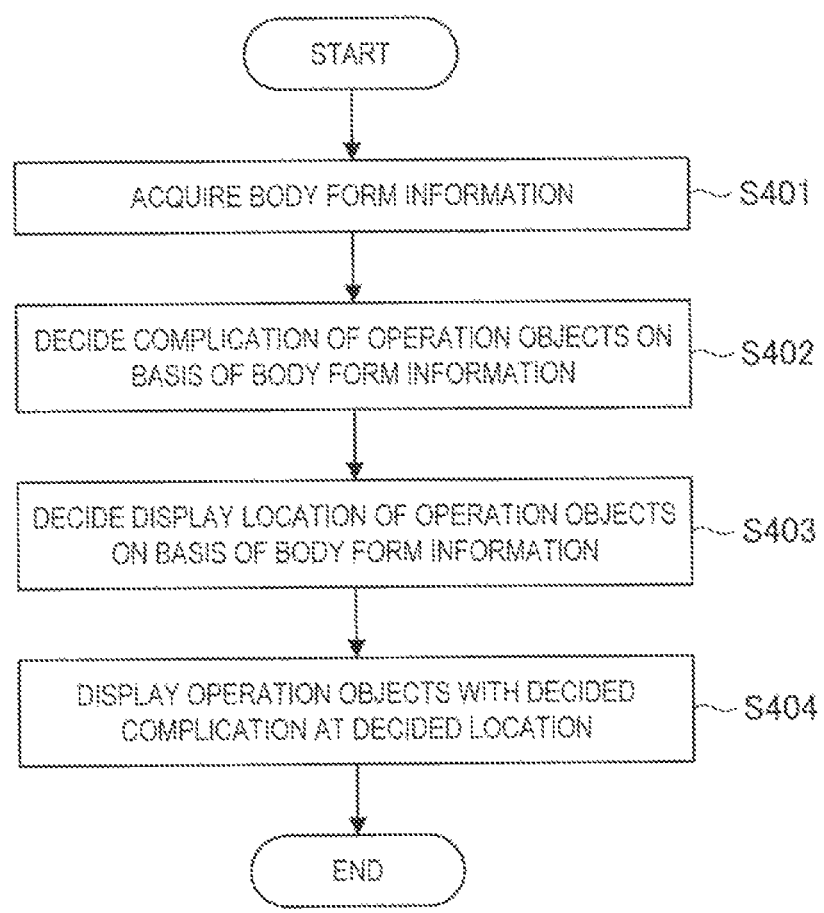
FIG. 24 is a flowchart conceptually illustrating an example of processing of the information processing system according to the embodiment.

Next, processing of the information processing system 1 will be described with reference to FIG. 24. FIG. 24 is a flowchart conceptually illustrating an example of processing of the information processing system 1 according to the embodiment. Note that description of processing that is substantially the same as the processing in the first embodiment will be omitted.

The information processing system 1 acquires body form information (Step S401) and decides complication of operation objects on the basis of the body form information (Step S402). Specifically, if a user's predetermined motion is recognized by the recognition unit 101, the projection control unit 103 decides operation objects projected from a target of the predetermined motion. Then, the projection control unit 103 decides complication of display or operations of the decided operation objects on the basis of the body form at the timing at which the predetermined motion is recognized.

In addition, the information processing system 1 decides a display location of the operation objects on the basis of the body form information (Step S403). Specifically, the projection control unit 103 decides a location in accordance with the user's predetermined motion recognized by the recognition unit 101 as the display location of the operation objects.

Next, the information processing system 1 displays the operation objects with the decided complication at the decided location (Step S404). Specifically, the projection control unit 103 causes the projection imaging device 10 to project the selection objects with the decided complication at the decided location.

4-3 Summary of Second Embodiment

According to the second embodiment of the present disclosure, the information processing system 1, that is, the information processing apparatus 100-2 obtains information related to the body form of the operation subject of the devices to be operated and controls complication of the operation objects for the devices to be operated that are visually recognized as if the devices to be operated were present in the real space, on the basis of the information related to the body form as described above.

Conventionally, virtual objects fixed irrespective of user's conditions are displayed. Therefore, there is a concern that displayed virtual objects differ from virtual objects that the user desires. If the same virtual objects are displayed both in a case in which the user desires detailed operations and in a case in which the user desires rough operations, for example, operability may be degraded, or an operation burden may increase.

Meanwhile, according to the embodiment, it is possible to display the operation object with complication in accordance with user's conditions that are estimated from the user's body form. Therefore, it is possible to enhance possibilities that operation objects suitable for an operation that the user desires are respectively displayed in each user's condition. Accordingly, it is possible to suppress variations in accordance with user's conditions in relation to user's satisfaction about the operation objects.

In addition, the aforementioned body form includes a posture of the aforementioned operation subject, and the aforementioned operation objects are displayed such that the operation objects are visually recognized with complication in accordance with information related to the posture of the operation subject. A degree of user's concentration on an operation is generally reflected to the user's posture. Therefore, it is possible to improve operability of the operation objects by the complication of the operation objects being controlled in accordance with the degree of concentration on the operation estimated from the user's posture.

In addition, the aforementioned operation objects are displayed such that the operation objects are visually recognized on the body of the aforementioned operation subject. Therefore, it is possible to project the operation objects at a location at which the user can easily operate the operation objects even in a case in which a projection space for the operation objects is not secured in the surroundings of the user, by the operation objects being projected on the user's body. In addition, in a case in which the projection location is tracked, it is possible to continuously operate the projected operation objects since the operation objects move even if the user moves.

In addition, the aforementioned operation objects are displayed at a location in accordance with the body form of the aforementioned operation subject. Therefore, it is possible to improve operability of the operation objects as compared with a case in which the operation objects are fixedly displayed at a predetermined location, by the display location of the operation objects being controlled in accordance with the user's form.

In addition, the body form of the aforementioned operation subject includes a predetermined motion of the aforementioned operation subject, and the aforementioned operation objects are displayed at a location in accordance with the predetermined motion. Therefore, it is possible to display the operation objects at a location as the user intends. Accordingly, it is possible to improve usability for the display of the operation objects.

In addition, the aforementioned operation objects include operation objects linked to a target of the aforementioned predetermined motion. Therefore, the user can select an operation object for the device to be operated that the user desires to operate, by selecting the target of the predetermined motion. Accordingly, it is possible to omit processes related to the display of the operation objects as compared with a case in which a device to be operated is selected on the basis of an additional operation.

4-4. Modification Examples

The second embodiment of the present disclosure has been described above. Note that the embodiment is not limited to the aforementioned example. Hereinafter, first to ninth modification examples of the embodiment will be described.

First Modification Example

Figure 25:
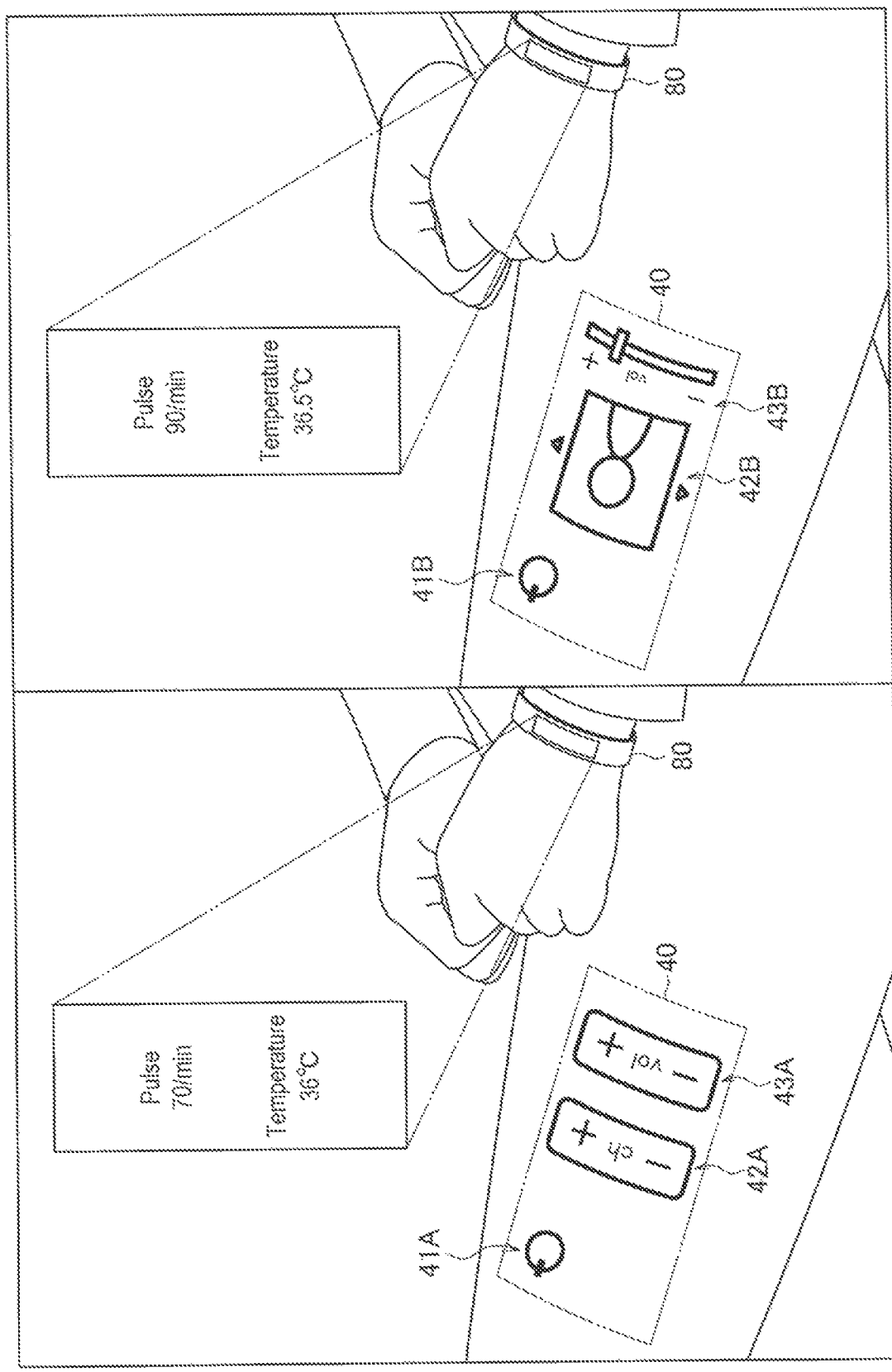
FIG. 25 is a diagram illustrating an example of display control for operation objects in an information processing system according to a first modification example of the embodiment.

In a first modification example of the embodiment, the information processing system 1 may control complication of the operation objects on the basis of information related to another body form. Specifically, the information processing apparatus 100-2 causes the projection imaging device 10 to project the operation objects with complication in accordance with biological information of the operation subject. For example, the biological information includes information related to user's pulse, body temperature, sweating, bran waves, and the like. Further, the modification example will be described in detail with reference to FIG. 25. FIG. 25 is a diagram illustrating an example of display control for operation objects in the information processing system 1 according to the first modification example of the embodiment.

If an operation object display instructing operation is performed, the projection control unit 103 acquires biological information. If user's operation object display instructing operation is recognized by the recognition unit 101, for example, the projection control unit 103 acquires information related to a pulse and a body temperature as the user's biological information. The biological information is acquired from an external device 80 that is worn by the user as illustrated in FIG. 25 and generates biological information via the communication unit 105. Note that the biological information may be acquired at predetermined time intervals.

Next, the projection control unit 103 causes the projection imaging device 10 to project operation objects with complication decided on the basis of the biological information. For example, the projection control unit 103 causes the projection imaging device 10 to display the operation objects with complication based on whether or not the acquired information related to the pulse and the body temperature is equal to or greater than threshold values. In detail, the user is regarded as being in a relaxed state in a case in which both the pulse and the body temperature are less than the threshold values, operation objects 41A to 43A with simple display content and operation functions as illustrated in the left diagram in FIG. 25 are projected. On the other hand, in a case in which at least one of the pulse or the body temperature is equal to or greater than the threshold value, the user is regarded as being in a nervous state, operation objects 41B to 43B with complicated display content and operation functions are projected as illustrated in the right diagram in FIG. 25.

Figure 26:
FIG. 26 is a diagram illustrating another example of the display control for the operation objects in the information processing system according to the first modification example of the embodiment.

In addition, the information processing apparatus 100-2 causes the projection imaging device 10 to project the operation objects with complication in accordance with information related to an action of the operation subject (hereinafter, also referred to as action information). For example, the user's action includes an action that is not accompanied by displacement, such as walking, cooking or reading, and an action that is accompanied by displacement, such as cycling or transporting. Further, another example of the modification example will be described in detail with reference to FIG. 26. FIG. 26 is a diagram illustrating another example of display control for the operation objects in the information processing system 1 according to the first modification example of the embodiment.

If an operation object display instructing operation is performed, the projection control unit 103 acquires action information. If user's operation object display instructing operation is recognized by the recognition unit 101, the projection control unit 103 acquires action information related to user's transporting as illustrated in FIG. 26 that has been recognized by the recognition unit 101, for example.

Next, the projection control unit 103 causes the projection imaging device 10 to project the operation objects with complication based on the action information. If action information related to the transporting is acquired, for example, the projection control unit 103 causes the projection imaging device 10 to project an operation object 44 indicating that an operation means as illustrated in FIG. 26 is voice. In this case, the complication of the operation becomes simpler than a manual input, and the user can operate the devices to be operated even when the user is transporting something and his/her hands are full.

According to the first modification example of the embodiment, the information related to the body form of the operation subject includes biological information of the operation subject, and the operation objects are displayed such that the operation objects are visually recognized with complication in accordance with the biological information of the operation subject as described above. Therefore, it is possible to decide the complication of the operation objects in accordance with whether the user is in the relaxed state or in the nervous state, in other words, in accordance with a degree of concentration on operations. Therefore, it is possible to reduce a feeling of strangeness, stress, or the like of the user against the operation objects by the complication of the operation object being adjusted in accordance with the user's state.

In addition, the body form of the operation subject includes an action of the operation subject, and the operation objects are displayed such that the operation objects are visually recognized with complication in accordance with information related to the action of the operation subject. Therefore, it is possible for the user to smoothly operate the operation objects without any interruption of the action by the operation objects being displayed with the complication suitable for the user's action.

Second Modification Example

Figure 27:
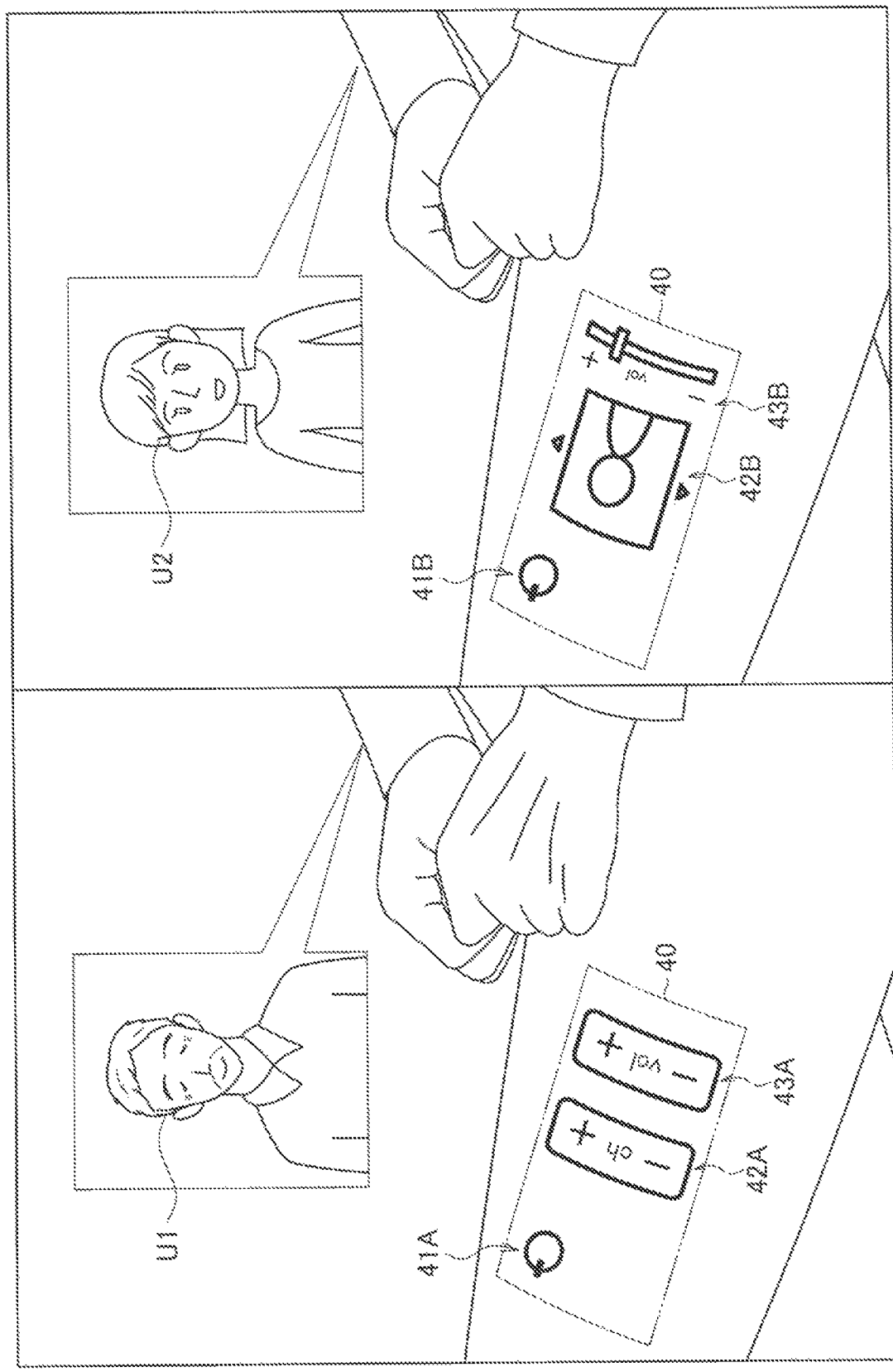
FIG. 27 is a diagram illustrating another example of the display control for the operation objects in the information processing system according to a second modification example of the embodiment.

In a second modification example of the embodiment, the information processing system 1 may control complication of the operation objects on the basis of information that is different from the body form information. Specifically, the information processing apparatus 100-2 controls complication of the operation objects on the basis of information from which the operation subject is specified. For example, the projection control unit 103 controls the complication of the operation objects on the basis of the information from which the user is specified (hereinafter, also referred to as user specification information). Further, the modification example will be described in detail with reference to FIG. 27. FIG. 27 is a diagram illustrating an example of display control for operation objects in the information processing system 1 according to the second modification example of the embodiment.

If an operation object display instructing operation is performed, the projection control unit 103 acquires user specification information. If a user's operation object display instructing operation is recognized by the recognition unit 101, for example, the projection control unit 103 acquires face recognition information as the user specification information of the user. The face recognition information is obtained through face recognition processing of the recognition unit 101 based on image information related to an image in which the user appears. For example, users U1 and U2 as illustrated in FIG. 27 are recognized, and face recognition information related to the users U1 and U2 is acquired. Note that the user specification information may be information such as an ID (Identifier) or a name instead of the face recognition information.

Next, the projection control unit 103 causes the projection imaging device 10 to project operation objects with complication decided on the basis of the user specification information. For example, the projection control unit 103 causes the projection imaging device 10 to display the operation objects with complication corresponding to the acquired user specification information. In detail, for the user U1, operation objects 41A to 43A with complication associated with the user with the face that coincides with the face in the face recognition information of the user U1, for example, with simple display content and operation functions as illustrated in the left diagram in FIG. 27 are projected. Meanwhile, for the user U2, operation objects 41B to 43b with complication associated with the user with the face that coincides with the face in the face recognition information of the user U2, for example, with complicated display content and operation functions as illustrated in the right diagram in FIG. 27 are projected.

Figure 28:
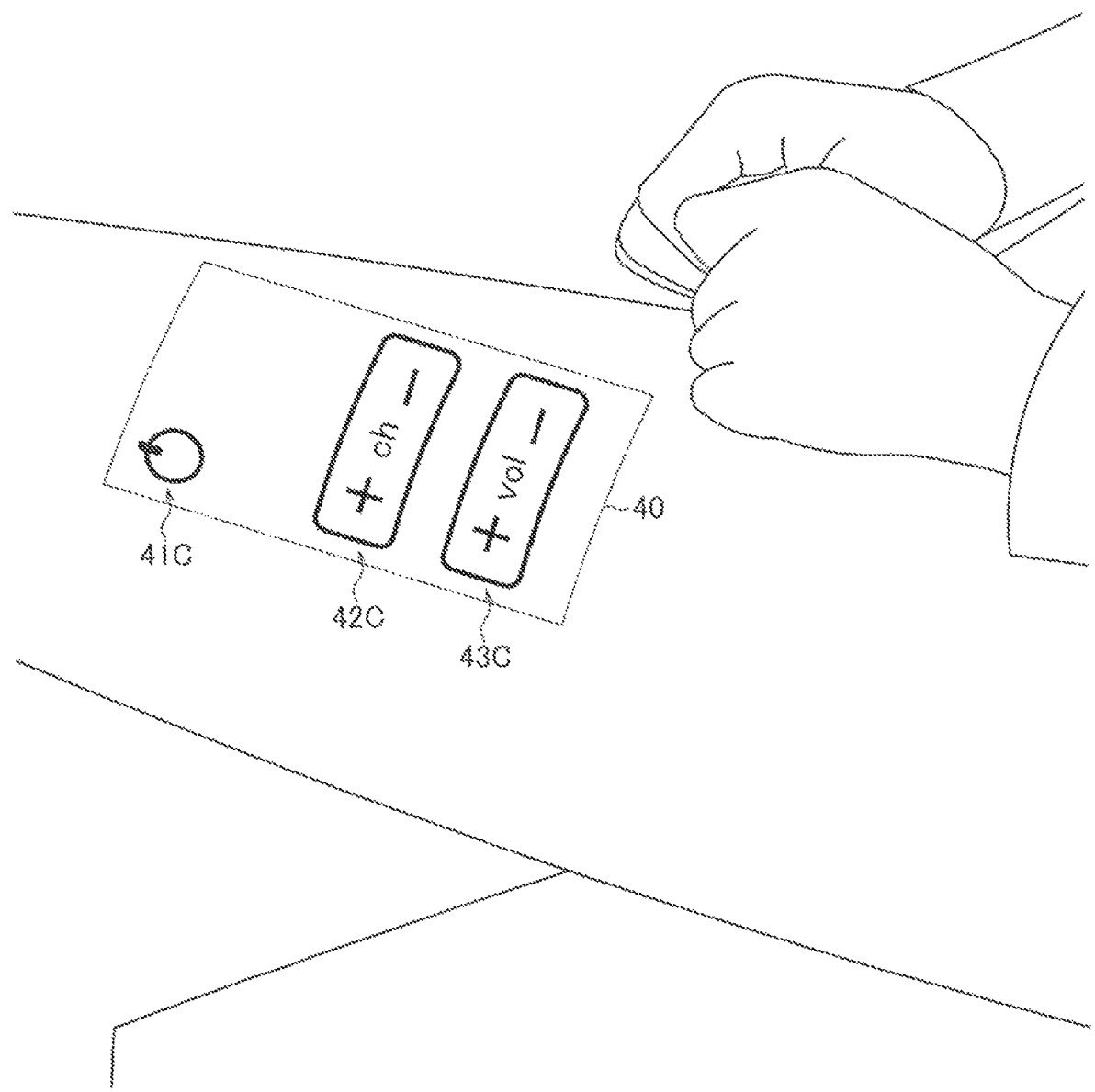
FIG. 28 is a diagram illustrating another example of the display control for the operation objects in the information processing system according to the second modification example of the embodiment.

In addition, the information processing apparatus 100-2 may control complication of the operation objects on the basis of information from which an attribute of the operation subject is specified. Specifically, the projection control unit 103 controls the complication of the operation objects on the basis of information from which an attribute of the user is specified (hereinafter, also referred to as user attribute information). Further, the modification example will be described in detail with reference to FIG. 28. FIG. 28 is a diagram illustrating another example of display control for the operation objects in the information processing system 1 according to the second modification example of the embodiment.

When an operation object display instructing operation is performed, the projection control unit 103 acquires user attribute information. If the user's operation object display instructing operation is recognized by the recognition unit 101, for example, the projection control unit 103 acquires the user attribute information of the user. The user attribute information is obtained through attribute recognition processing of the recognition unit 101 based on image information related to an image in which the user appears. The user attribute includes an age, a sex, a nationality, a race, a dominant hand, or the like.

Next, the projection control unit 103 causes the projection imaging device 10 to project the operation objects with complication decided on the basis of the user attribute information. For example, the projection control unit 103 causes the projection imaging device 10 to display the operation objects with complication corresponding to the acquired user attribute information. In detail, in a case in which a dominant hand indicated by the user attribute information is the left hand, operation objects 41C to 43C, which are arranged in a laterally inverted manner with respect to the operation objects 41A to 43A as illustrated in the left diagram in FIG. 27, are projected as illustrated in FIG. 28.

Note that display or operations of at least a part of the operation objects may be inactivated on the basis of the user specification information or the user attribute information. In a case in which the age of the user indicated by the user specification information belongs to infancy, for example, the projection control unit 103 may not display at least a part of operation functions targeted to adults or may inactivate operations of the part in the operation objects for the display device.

According to the second modification example of the embodiment, the information processing apparatus 100-2 controls complication of the operation objects on the basis of the information from which the operation subject is specified as described above. Therefore, it is possible to set the complication of the displayed operation objects to complication suitable for individual users. Accordingly, it is possible to further improve operability or usability for the individual users.

In addition, the information processing apparatus 100-2 controls complication of the operation objects on the basis of information from which attribute of the operation subject is specified. Therefore, it is possible to improve operability or usability as compared with a case in which the complication is uniformly decided, by the complication of the operation objects being controlled in accordance with user's characteristics. In addition, it is possible to suppress a concern that safety of information deteriorates due to control of the complication of the operation objects without any information from which the individual users are specified.

Third Modification Example

Figure 29:
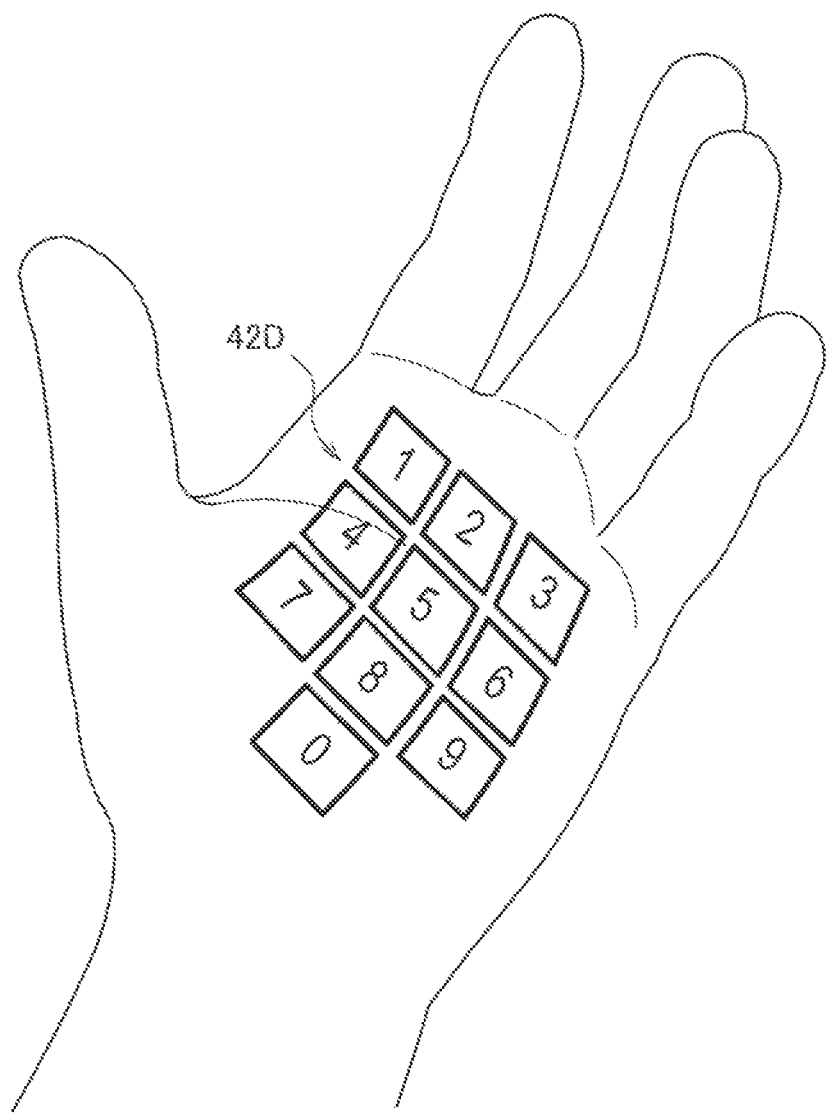
FIG. 29 is a diagram illustrating another example of the display control for the operation objects in the information processing system according to a third modification example of the embodiment.
Figure 30:
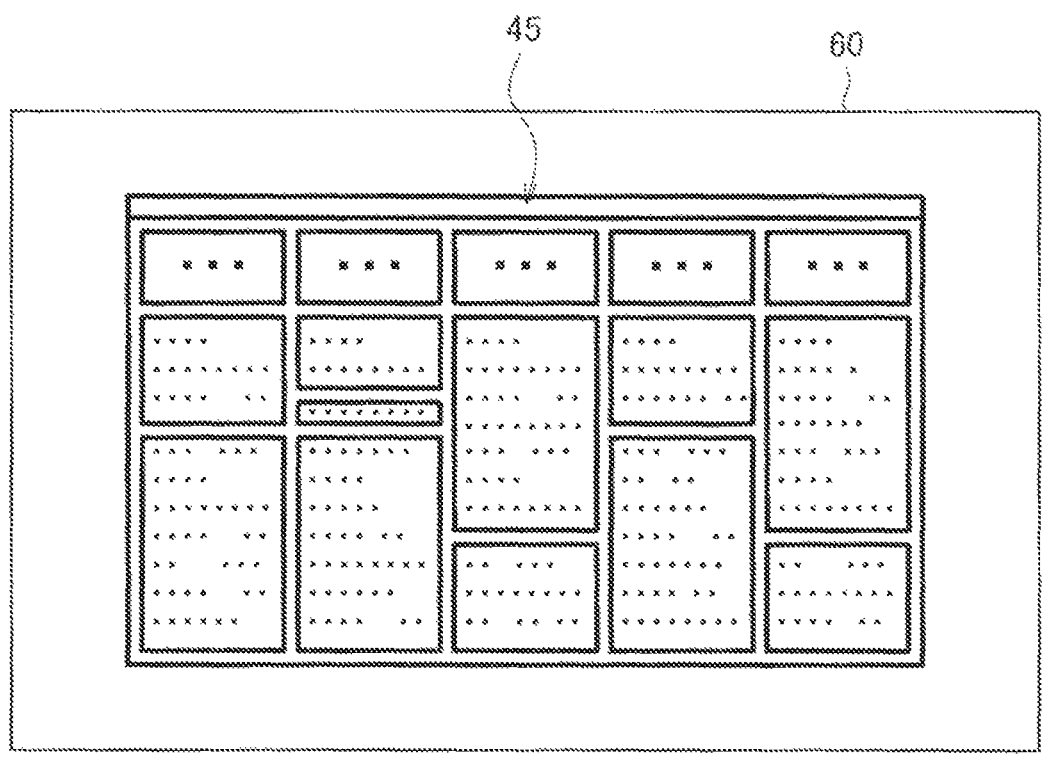
FIG. 30 is a diagram illustrating another example of the display control for the operation objects in the information processing system according to the third modification example of the embodiment.

In a third modification example of the embodiment, the information processing system 1 may control complication of the operation objects on the basis of information other than information related to the operation subject. Specifically, the information processing apparatus 100-2 controls the complication of the operation objects on the basis of information related to locations at which the operation objects are visually recognized. For example, the projection control unit 103 controls the complication of the operation objects on the basis of information related to the locations at which the operation objects are displayed (hereinafter, also referred to as display location information). Further, the modification example will be described in detail with reference to FIGS. 29 and 30. FIG. 29 is a diagram illustrating an example of display control for the operation objects in the information processing system 1 according to the third modification example of the embodiment. FIG. 30 is a diagram illustrating another example of display control for the operation objects in the information processing system 1 according to the third modification example of the embodiment.

If an operation object display instructing operation is performed, the projection control unit 103 acquires display location information. If a user's operation object display instructing operation is recognized by the recognition unit 101, for example, the projection control unit 103 decides a location at which the display instructing operation has been performed as a display location of the operation objects.

Next, the projection control unit 103 causes the projection imaging device 10 to project the operation objects with complication decided on the basis of the display location information. Specifically, the projection control unit 103 causes the projection imaging device 10 to project the operation objects with the complication decided from a decided display location form of the operation objects. The display location form includes wideness of the display location, a degree of irregularity, a color, texture, presence of a pattern, and the like. In a case in which the display location of the operation objects is a user's palm, and an area of a projection available region is less than a threshold value, for example, a simple operation object 42D with complication corresponding to the area that is less than the threshold value, for example, the simple operation object 42D just for inputting a channel number as illustrated in FIG. 29 is projected. Meanwhile, in a case in which the display location of the operation objects is a table, and the area of the projection available region is equal to or greater than the threshold value, a complicated operation object 45 with complication corresponding to the area that is equal to or greater than the threshold value, for example, the operation object 45 with which channels can be selected from a program table as illustrated in FIG. 30 is projected on a table 60.

According to the third modification example of the embodiment, the information processing apparatus 100-2 controls the complication of the operation objects on the basis of the information related to the location at which the operation objects are visually recognized. Therefore, it is possible to suppress a concern that visibility of the operation objects is degraded, by the operation objects being displayed with complication in accordance with the display location of the operation objects. Accordingly, it is possible to improve operability while maintaining the visibility of the operation objects.

Fourth Modification Example

Figure 31:
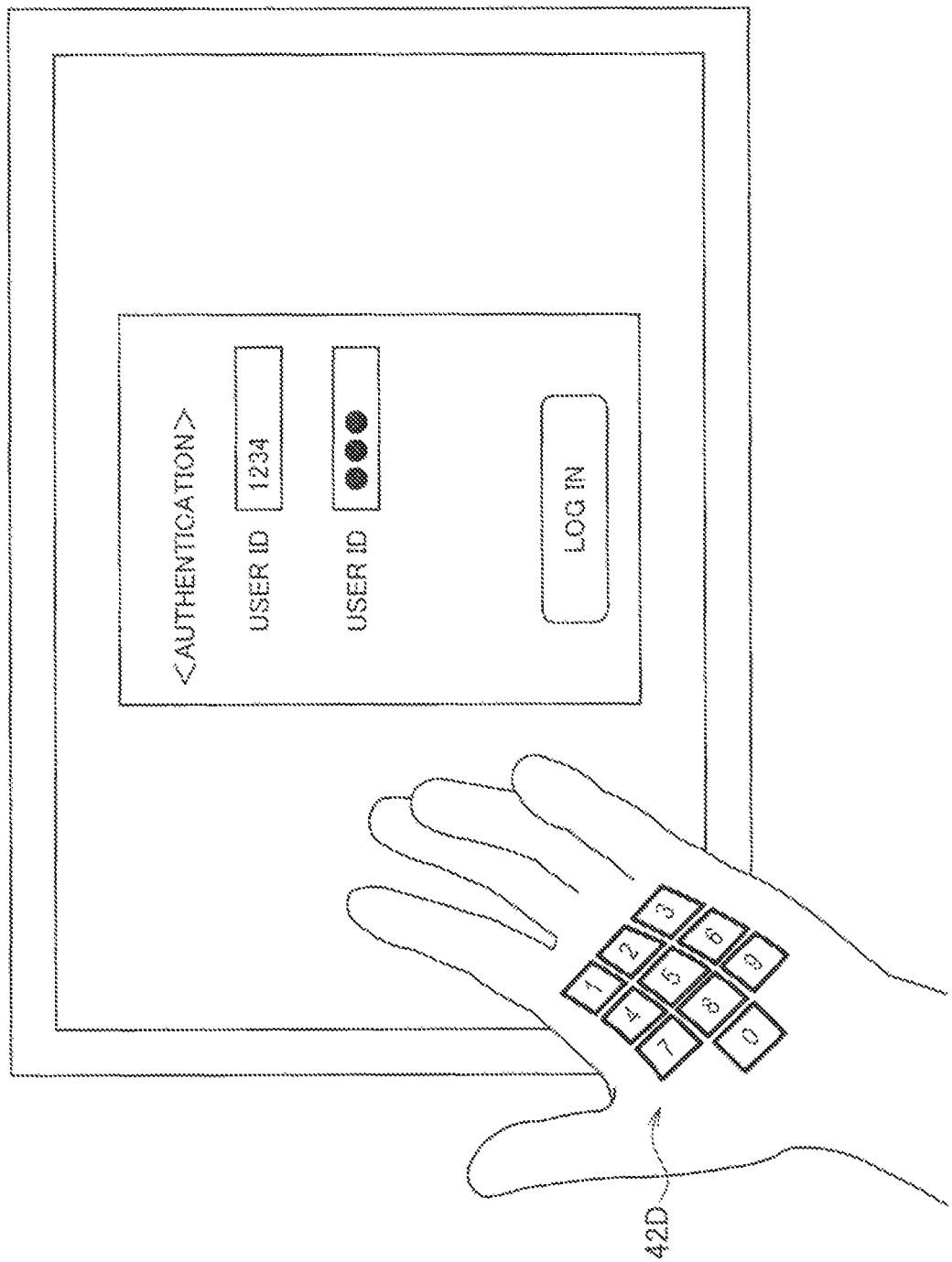
FIG. 31 is a diagram illustrating another example of the display control for the operation objects in the information processing system according to a fourth modification example of the embodiment.

In a fourth modification example of the embodiment, the display location of the operation objects may be controlled on the basis of information safety. Specifically, the information processing apparatus 100-2 causes the projection imaging device 10 to project the operation objects at a location in accordance with a degree of information safety related to operations of the devices to be operated. For example, the projection control unit 103 decides a location in accordance with an information security level of content of operations by the operation objects as the display location of the operation objects. Further, the modification example will be described in detail with reference to FIG. 31. FIG. 31 is a diagram illustrating an example of display control for the operation objects in the information processing system 1 according to the fourth modification example of the embodiment.

If an operation object display instructing operation is performed, the projection control unit 103 acquires information from which an information security level of content of operations by the operation objects is specified (hereinafter, also referred to as security information). If a user's operation object display instructing operation is recognized by the recognition unit 101, for example, the projection control unit 103 acquires security information for log-in information as illustrated in FIG. 31, which is input by the operation objects.

Next, the projection control unit 103 decides a display location of the operation objects on the basis of the security information and causes the projection imaging device 10 to project the operation objects at the decided display location. In a case in which the security level indicated by the acquired security information is equal to or greater than a predetermined level, for example, the projection control unit 103 decides the user's palm as the display location of the operation objects. Then, the projection control unit 103 causes the projection imaging device 10 to project an operation object 42D to the user's palm as illustrated in FIG. 31.

According to the fourth modification example of the embodiment, the operation objects are displayed such that the operation objects are visually recognized at the location in accordance with a degree of information safety related to operations of the devices to be operated as described above. Therefore, it is possible to prevent others from knowing the content of the operations using the operation objects. Accordingly, it is possible to protect user's privacy or to secure information safety.

Fifth Modification Example

In a fifth modification example of the embodiment, the aforementioned predetermined motion as the operation object display instructing operation may be another motion. Specifically, the information processing apparatus 100-2 causes the projection imaging device 10 to project the operation objects at a location in accordance with a predetermined motion targeted to the devices to be operated on the basis of the predetermined motion. If a first motion directed to devices to be operated is recognized by the recognition unit 101, for example, the projection control unit 103 decides operation objects for the devices to be operated as projection targets. Then, if a second motion is recognized by the recognition unit 101, the projection control unit 103 causes the projection imaging device 10 to project the operation objects at a location in accordance with the second motion. Further, the modification example will be described in detail with reference to FIG. 32. FIG. 32 is a diagram illustrating an example of display control for the operation objects in the information processing system 1 according to the fifth modification example of the embodiment.

If the first motion is recognized, the projection control unit 103 decides the operation objects for the devices to be operated, which have been specified from the first motion, as projection targets. If a hand gripping motion as illustrated in the upper diagram in FIG. 32 is recognized by the recognition unit 101, for example, the device selection unit 102 specifies the display device 20 that is present in a direction in which the hand is directed. Then, the projection control unit 103 decides the operation objects for the specified display device 20 as projection targets.

Next, if the second motion is recognized, the projection control unit 103 decides the location in accordance with the second motion as the projection location of the operation objects and causes the projection imaging device 10 to project the operation objects at the decided projection location. If a motion of opening the gripped hand as illustrated in the lower diagram in FIG. 32 is recognized by the recognition unit 101, for example, the projection control unit 103 decides the palm as the projection location of the operation objects. Then, an operation object 42D is projected to the palm as illustrated in FIG. 32.

According to the fifth modification example of the embodiment, the operation objects linked to a target of a predetermined motion related to the display of the operation objects as described above include operation object for a device to be operated as a target of the predetermined motion as described above. Therefore, it is possible to select the device to be operated that the user desires to operate in the operation object display instructing operation. Accordingly, it is possible for the user to intuitively select the device to be operated and to improve operability.

Sixth Modification Example

Figure 33:
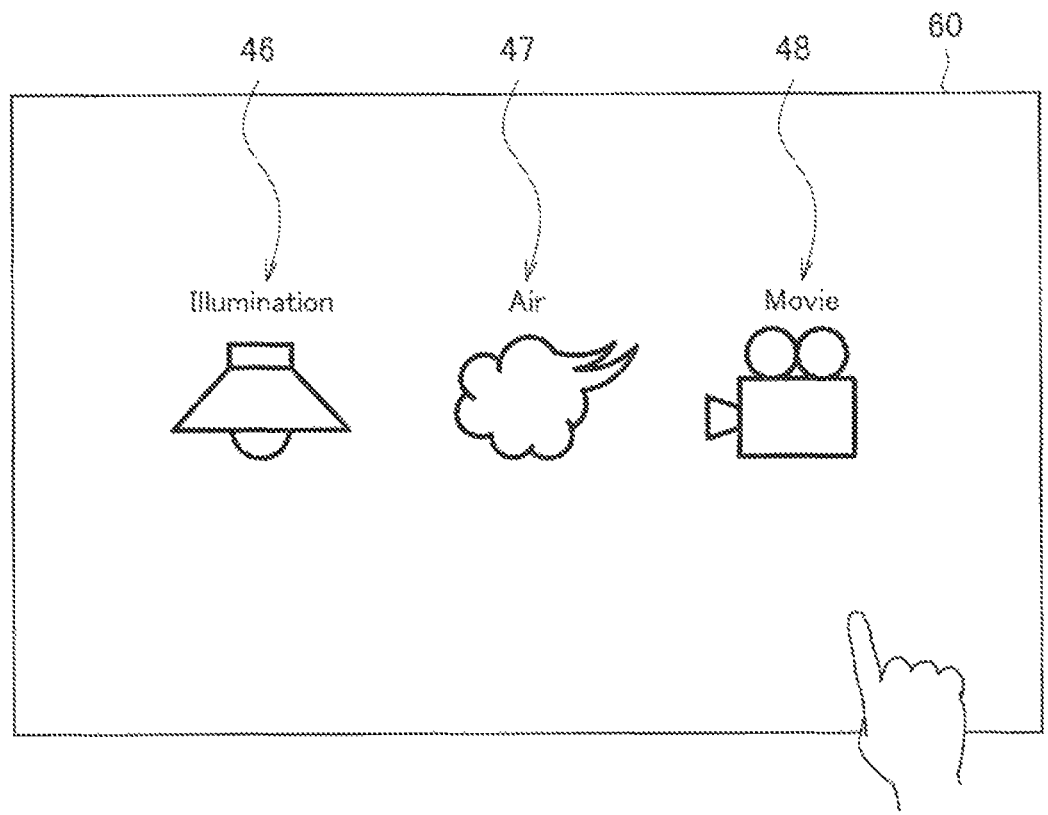
FIG. 33 is a diagram illustrating another example of the display control for the operation objects in the information processing system according to a sixth modification example of the embodiment.
Figure 34:
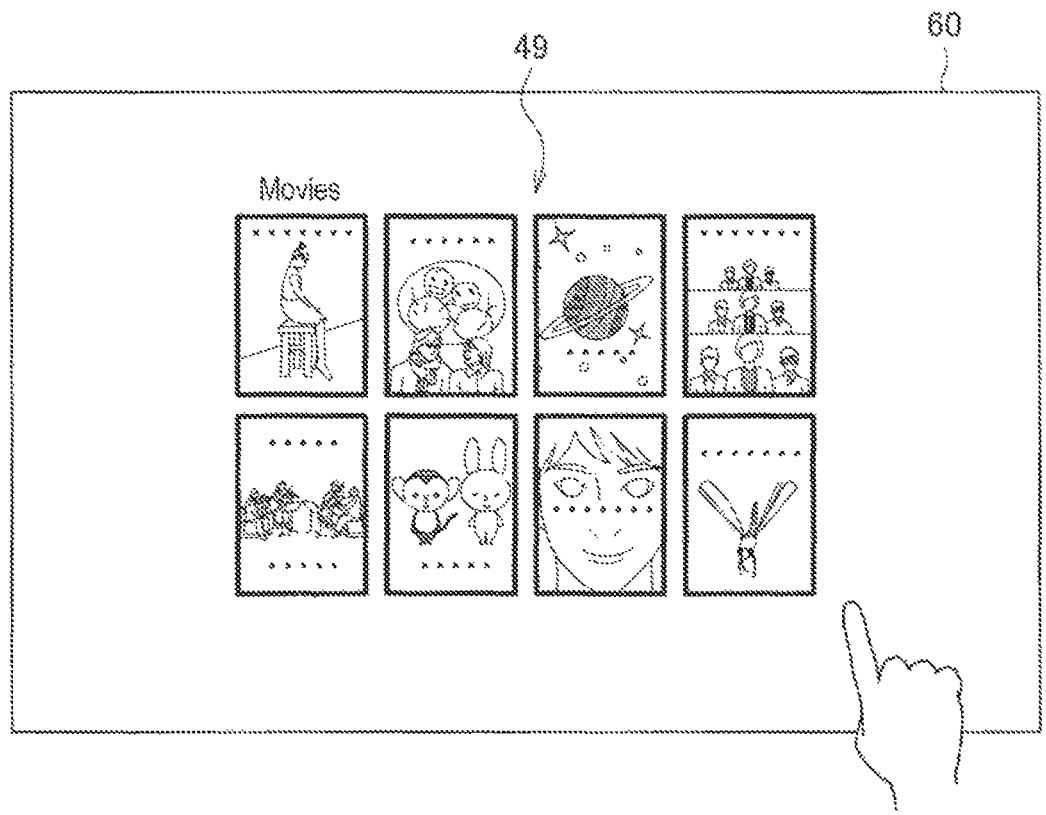
FIG. 34 is a diagram illustrating another example of the display control for the operation objects in the information processing system according to the sixth modification example of the embodiment.
Figure 35:
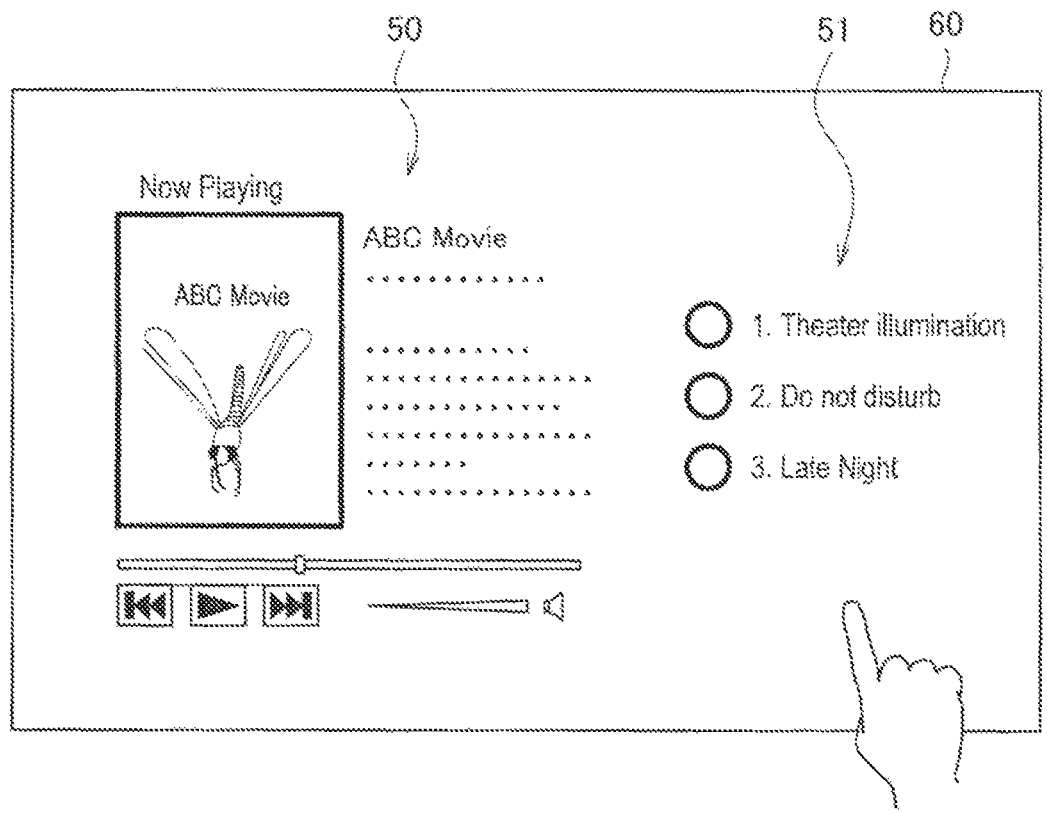
FIG. 35 is a diagram illustrating another example of the display control for the operation objects in the information processing system according to the sixth modification example of the embodiment.

In a sixth modification example of the embodiment, the operation objects displayed in accordance with the aforementioned predetermined motion as the operation object display instructing operation may be operation objects for devices to be operated that are present in the same real space as the real space in which a target of the predetermined motion is present. Specifically, if the operation object display instructing operation is recognized, the device selection unit 102 selects devices to be operated that are present in the real space in which an object that is the target of the display instructing operation is present. The projection control unit 103 decides operation objects of the selected devices to be operated as projection targets. Then, the operation objects decided as the projection targets are projected at a location in accordance with the projection instructing operation. Further, the modification example will be described in detail with reference to FIGS. 33 to 35. FIGS. 33 to 35 are diagrams illustrating examples of display control for the operation objects in the information processing system 1 according to the sixth modification example of the embodiment.

If the operation object display instructing operation is recognized, the recognition unit 101 recognizes an object as a target of the display instructing operation. If a tapping operation is recognized as the operation object display instructing operation, for example, the recognition unit 101 recognizes the table 60 situated in a living room as illustrated in FIG. 33, in which the tapping operation has been performed, as a tapping destination.

Next, if an object as a target of the display instructing operation is recognized, the device selection unit 102 selects devices to be operated that are present in the real space as that of the object. If a tapping operation and a tapping destination are recognized by the recognition unit 101, for example, the device selection unit 102 specifies the living room, in which the table 60 recognized as the tapping destination is present, as a device selection range. Then, the device selection unit 102 selects an illumination device, an air conditioner device, and a display device that are present in the living room.

Next, the projection control unit 103 decides operation objects for the selected devices to be operated as projection targets and decides the object as a target of the display instructing operation as the projection location of the operation objects. Then, the decided operation objects are projected at the decided projection location. For example, the projection control unit 103 causes respective operation objects 46 to 48 for the illumination device, the air conditioner device, and the display device selected by the device selection unit 102 to be respectively projected to the table 60 to which the tapping operation has been performed, as illustrated in FIG. 33.

Next, if an operation performed to the projected operation objects is recognized, the projection control unit 103 changes display of the operation objects in accordance with the recognized operation. If a touching operation performed to the operation object 48 is recognized by the recognition unit 101, for example, the projection control unit 103 changes the projected operation objects to operation objects 49 related to the operation object 48 as illustrated in FIG. 34. The operation object 49 may be an operation object for performing more detailed operation to the devices to be operated for the operation object 48. In the example in FIG. 34, the operation object 49 is a list of reproducible contents.

Similarly, if an operation performed to operation objects after a change is recognized, the projection control unit 103 changes display of the operation objects in accordance with the recognized operation. If a touching operation performed to a part of the operation object 49 is recognized by the recognition unit 101, for example, the projection control unit 103 changes the projected operation objects to an operation object 50 related to the part of the operation object 49 as illustrated in FIG. 35. The operation object 50 may be an operation object for performing more detailed operations to the part of the operation object 49. In the example in FIG. 35, the operation object 50 is a group of operation objects with which it is possible to reproduce, stop, rewind, and send forwarding of content and adjust volume. In addition, the operation object 50 may include information related to the content.

Further, the projection control unit 103 causes the projection imaging device 10 to project a proposal of an operation of the devices to be operated in relation to an operation related to a projected first operation object to the user as a second operation object. Specifically, the device control unit 104 selects a device to be operated capable of operating in relation to the device to be operated for the first operation object projected through a user's operation. Then, the projection control unit 103 causes the projection imaging device 10 to project a second operation object that proposes, to the user, an operation of a device to be operated, which has been selected by the device selection unit 102, along with the first operation object.

If a content selecting operation by the operation object 49 as illustrated in FIG. 34 is recognized, for example, the device control unit 104 selects an illumination device and a sound output device capable of operating in conjunction with a display device that displays a movie of the selected content. The projection control unit 103 causes the selected illumination device and sound output device to operate in conjunction with the display device or generates an operation object 51 for proposing how the illumination device and the sound output device are to be caused to operate to the user. In detail, (1) controlling brightness and coloration of illumination in accordance with display, (2) stopping sound outputs other than sound related to the display, (3) controlling sound in accordance with time zones (for example, suppressing heavy bass sound in midnight), and the like are listed. Then, the projection control unit 103 causes the projection imaging device 10 to project the operation object 51 along with the operation object 50.

In this case, it is possible to provide an operation result beyond expectation to the user by operations in relation to an operation that the user intends being additionally proposed. Therefore, it is possible to further improve usability.

In addition, operation objects for a device to be operated, which has been selected on the basis of information related to an environment in the same real space as that of the target of the display instructing operation (hereinafter, also referred to as spatial environment information), may be displayed. The environment in the real space includes a temperature, a humidity, luminance, smell, noise volume, and the like in the real space. If an operation object display instructing operation is performed to a table, for example, the device selection unit 102 selects at least an air conditioner device in a case in which a display device, the air conditioner device, and an illumination device are present in the same room as the table and when the room temperature is equal to or greater than a threshold value. Then, the projection control unit 103 causes the projection imaging device 10 to project operation objects for the selected air conditioner device.

In addition, operation objects for a device to be operated, which has been selected on the basis of information related to a form of a person who is present in the same real space as that of the target of the display instructing operation (hereinafter, also referred to as person form information), may be displayed instead of or in addition to the aforementioned spatial environment information. The form of the person includes states in the body, such as a pulse or a body temperature, and states, actions, and the like outside the body, such as a posture. If an operation object display instructing operation is performed to a table by the user, and in a case in which there is a person other than the user in the same room as that of the table, for example, the recognition unit 101 acquires body temperature information of the person. Then, when the body temperature indicated by the acquired body temperature information of the person is less than a threshold value, the device selection unit 102 selects at least an air conditioner device. Then, the projection control unit 103 causes the projection imaging device 10 to project operation objects for the selected air conditioner device.

In addition, operation objects for a device to be operated, which has been selected on the basis of time information related to a time in which the display instructing operation has been performed, may be displayed instead of or in addition to the aforementioned spatial environment information or person form information. The time information includes information indicating a clock time, a time zone, a date, a day, a season or schedule information, or the like. If an operation object display instructing operation is performed to a table by the user, for example, the recognition unit 101 acquires time information. Next, when a time zone indicated by the acquired time information is an evening time zone, the device selection unit 102 selects at least an illumination device. Then, the projection control unit 103 causes the projection imaging device 10 to project operation objects for the selected illumination device.

Figure 36:
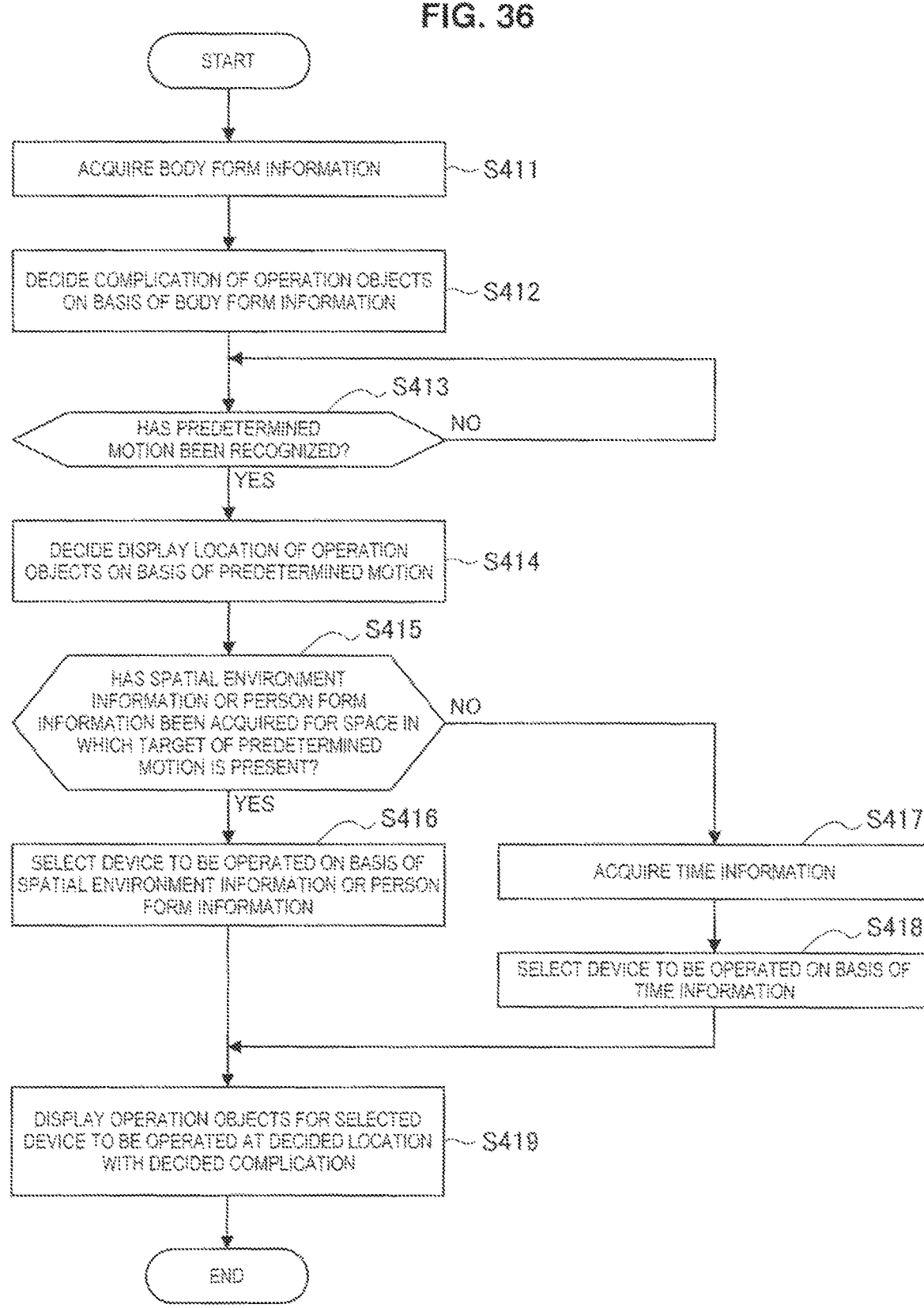
FIG. 36 is a flowchart conceptually illustrating an example of processing of an information processing system according to a sixth modification example of the embodiment.

Further, processing in the modification example will be described with reference to FIG. 36. FIG. 36 is a flowchart conceptually illustrating an example of processing of the information processing system 1 according to the sixth modification example of the embodiment. Note that description of processing that is substantially the same as the aforementioned processing will be omitted.

The information processing system 1 acquires body form information (Step S411) and decides complication of operation objects on the basis of the acquired body form information (Step S412).

Next, the information processing system 1 determines whether or not a predetermined motion has been recognized (Step S413). Specifically, the projection control unit 103 determines whether or not an operation object display instructing operation has been recognized by the recognition unit 101.

If it is determined that the predetermined motion has been recognized, the information processing system 1 decides a display location of operation objects on the basis of the predetermined motion (Step S414). Specifically, if it is determined that the operation object display instructing operation has been recognized, the projection control unit 103 decides a location in accordance with the display instructing operation as a projection location of the operation objects.

Next, the information processing system 1 determines whether or not spatial environment information or person form information for a space in which a target of the predetermined motion is present has been acquired (Step S415). Specifically, the device selection unit 102 determines whether or not information related to an environment in the space in which the target of the operation object display instructing operation is present or information related to a form of a person who is present in the space has been acquired. Note that the spatial environment information may be acquired from a measurement device such as a sensor that is separately provided in the information processing system 1, or the person form information may be acquired from the recognition unit 101.

If it is determined that the spatial environment information or the person form information for the space in which the target of the predetermined operation is present has been acquired, the information processing system 1 selects devices to be operated on the basis of the spatial environment information or the person form information (Step S416). Specifically, the device selection unit 102 selects a device to be operated from among the devices to be operated that are present in the space in which the target of the aforementioned display instructing operation is present on the basis of the acquired spatial environment information or person form information.

In addition, if it is determined that both the spatial environment information and the person form information for the space in which the target of the predetermined motion is present have not been acquired, the information processing system 1 acquires time information (Step S417). Specifically, if it is determined that both the spatial environment information and the person form information have not been acquired, the device selection unit 102 acquires time information related to a time at which the aforementioned display instructing operation has been performed.

Next, the information processing system 1 selects a device to be operated on the basis of the time information (Step S418). Specifically, the device selection unit 102 selects a device to be operated from among the devices to be operated that are present in the space in which the target of the aforementioned display instructing operation is present on the basis of the acquired time information.

Then, the information processing system 1 displays operation objects for the selected device to be operated at the decided location in the decided form (Step S419). Specifically, the projection control unit 103 causes the projection imaging device 10 to project the operation objects for the selected device to be operated in the decided form at the decided projection location.

Note that although the example in which a single device to be operated is selected has been described above, a set of devices to be operated may be selected. For example, a set of devices to be operated related to air conditioning (for example, a set of an air conditioner device and a blower device), a set of devices to be operated related to reproduction of movies (for example, a set of a display device and a sound output device), or the like may be selected.

In addition, operation objects for a set of devices to be operated may be displayed. For example, one operation object may be projected for each set of devices to be operated related to air conditioning or each set of devices to be operated related to reproduction of movies. Note that if an operation object for the set of the devices to be operated is operated, at least a part of the devices to be operated in the set is controlled in accordance with the operation.

According to the sixth modification example of the embodiment, the operation objects linked to the target of the predetermined motion related to the display of the operation objects as described above include operation objects for the devices to be operated that are present in the same real space as that of the target of the predetermined motion as described above. Therefore, the user can cause the information processing system 1 to display operation objects for the device to be operated that the user desires to operate without individually selecting the device to be operated. Accordingly, it is possible to reduce efforts and time required until the device to be operated is operated, by the operation procedure being reduced.

In addition, the device to be operated that is present in the same real space as that of the target of the aforementioned predetermined motion on the displayed operation object is selected on the basis of information related to the environment in the same real space as that of the target of the predetermined motion. Therefore, it is possible to display operation objects for a device to be operated for maintaining or improving the environment of the space, for example, by the device to be operated being selected in accordance with the environment of the space in which the user is present. Accordingly, it is possible to improve usability by appropriate operation objects being displayed in accordance with the state of the space.

In addition, the device to be operated is selected on the basis of information related to the form of the person who is present in the same real space as that of the target of the predetermined motion. Therefore, it is possible to display operation objects for a device to be operated for maintaining or improving a pleasant feeling that the person who is present in the space feels, for example, by the device to be operated being selected in accordance with the form of the user or another person who is present in the space in which the user is present. Therefore, it is possible to improve usability by appropriate operation objects being displayed in accordance with the state of the person.

In addition, the device to be operated is selected on the basis of time information. A state of a space in which persons feel pleasant generally differs depending on a time. Therefore, it is possible to appropriately display operation objects that the user desires to operate in a state of a space that transitions with time, by the device to be operated related to the operation objects being selected on the basis of the time information. Accordingly, it is possible to improve usability by appropriate operation objects being displayed in accordance with a time.

Seventh Modification Example

In a seventh modification example of the embodiment, operation objects may be automatically displayed. Specifically, the information processing apparatus 100-2 causes the projection imaging device 10 to project an operation object for a notification to the operation subject (hereinafter, also referred to as a notification operation object) in response to reception of the notification. If the notification to the user is received, for example, the projection control unit 103 decides a projection location of the notification operation object for the device to be operated related to the notification. Then, the projection control unit 103 causes the projection imaging device 10 to project the notification operation object at the decided projection location. Further, the modification example will be described in detail with reference to FIG. 37. FIG. 37 is a diagram illustrating an example of display control for the notification operation object in the information processing system 1 according to the seventh modification example of the embodiment.

The device control unit 104 determines whether not the notification from the device to be operated to the user has been received. For example, the device control unit 104 determines whether or not calling information from a phone call application such as an interphone, a telephone, or a smartphone or information such as a mail or a message has been acquired via the communication unit 105.

If it is determined that the notification from the device to be operated to the user has been received, the projection control unit 103 decides the projection location of the notification operation object on the basis of the location of the user as the notification destination. If it is determined that calling information has been acquired, for example, the projection control unit 103 decides the projection location of the notification operation object for the device to be operated related to the calling information (hereinafter, also simply referred to as a notification operation object related to the calling information) on the basis of the location of the user who is estimated as a destination of the calling information.

Next, the projection control unit 103 causes the projection imaging device 10 to project the notification operation object at the decided projection location. In a case in which operation objects 46 to 48 are projected in the vicinity of the user as illustrated in the upper diagram in FIG. 37, for example, the projection control unit 103 causes the projection imaging device 10 to project a notification operation object 52 such that the notification operation object 52 is adjacent to the operation objects 46 to 48. Note that the projection location of the notification operation object may be decided in accordance with the user or a user's attribute. For example, the notification operation object may be projected on the side of a dominant hand of the user within a range that is adjacent to the operation objects.

Further, if an operation on the projected notification operation object is recognized, the projection control unit 103 changes the form of the notification operation object. If a touching operation on the notification operation object 52 is recognized by the recognition unit 101, for example, the projection control unit 103 switches the notification operation object 52 to a notification operation object 53. The notification operation object 53 after the switching may be a notification operation object for operating the device to be operated related to the notification operation object 52 in detail. In detail, the notification operation object 53 has three sub objects and a display screen as illustrated in the lower diagram in FIG. 37. The sub objects may be operation objects for selecting whether or not to answer calling from an interphone or a telephone or the like. In addition, an image in which a person who is the origin of the calling appears or the like appears may be displayed on the display screen. Note that the image in which the person who is the origin of the calling or the like appears may also be displayed as illustrated in the upper diagram in FIG. 37 on the notification operation object 52 before the switching.

Figure 38:
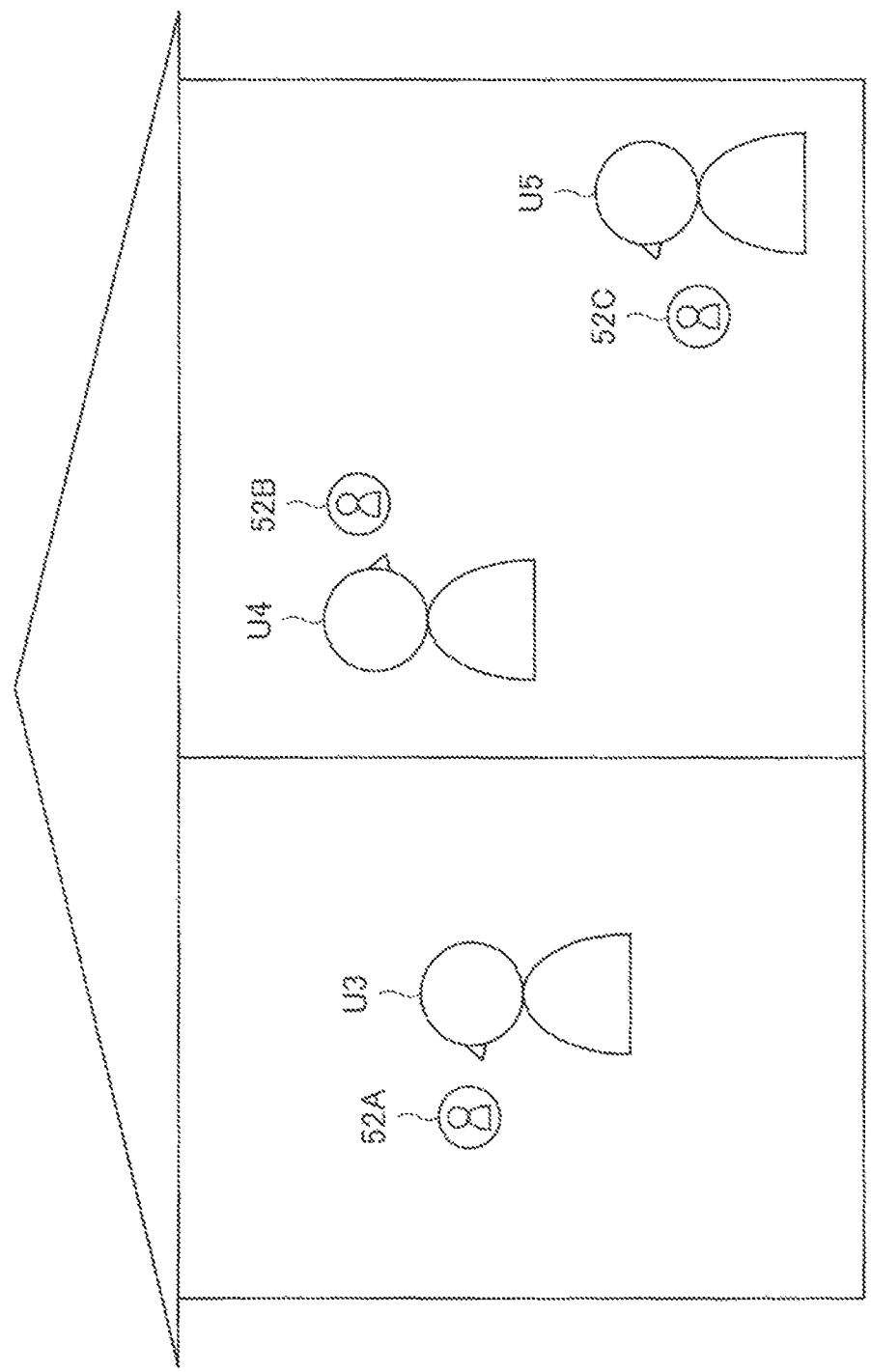
FIG. 38 is a diagram illustrating an example of display control for notification operation objects for a plurality of users in the information processing system according to the seventh modification example of the embodiment.

An example of the processing according to the seventh modification example has been described above. Next, an example in which a plurality of users are estimated to be destinations of the calling information will be described. Specifically, the notification operation object is displayed at a location at which the notification operation object is visually recognized by each of the plurality of users. If the calling information is received, for example, the projection control unit 103 specifies users who are estimated as destinations of the calling information. In the case in which the plurality of users are specified, the projection control unit 103 causes the projection imaging device 10 to project the notification operation object related to the calling information at a location at which the notification operation object is visually recognized by each of the plurality of specified users. Further, an example of display control for the notification operation object for a plurality of users will be described with reference to FIG. 38. FIG. 38 is a diagram illustrating an example of display control for the notification operation object for the plurality of users in the information processing system 1 according to the seventh modification example of the embodiment.

If the notification from the device to be operated to the user is received, the projection control unit 103 specifies the user as the notification destination. If calling information is received from an interphone or the like for example, the projection control unit 103 specifies users U3 to U5 as illustrated in FIG. 38 on the basis of a result of recognizing the user by the recognition unit 101. Note that any users in any individual spaces are specified as long as the users are located in a space within a predetermined range (for example, in a building). For example, a user U3 who is located in a space (for example, in a room) that is different from that of users U4 and U5 while being located in the same building, as illustrated in FIG. 38, is also specified.

Next, in a case in which the plurality of users are specified, the projection control unit 103 decides the respective projection locations of the notification operation objects on the basis of the plurality of respective specified users' positions. For example, the projection control unit 103 respectively decides locations that are adjacent to the respective positions of the specified users U3 to U5 as projection locations of the notification operation objects.

Then, the projection control unit 103 causes the projection imaging device 10 to respectively project the notification operation objects at the decided projection locations. For example, the respective notification operation objects 52A to 52C are projected at locations that are adjacent to the respective users U3 to U5 as illustrated in FIG. 38.

Note that although the example in which the notification operation objects are respectively displayed for each of the plurality of users has been described above, a common notification object for the plurality of users may be displayed. Specifically, in a case in which a plurality of users are located in the same space, one common notification operation object for the plurality of users may be displayed. For example, one notification operation object may be projected for the users U4 and U5 who are located in the same space as illustrated In FIG. 38. In that case, the notification operation object may be projected at a location at which the notification operation object is visually recognized by both the users U4 and U5, that is, a location in eyesight of both the users U4 and U5.

Figure 39:
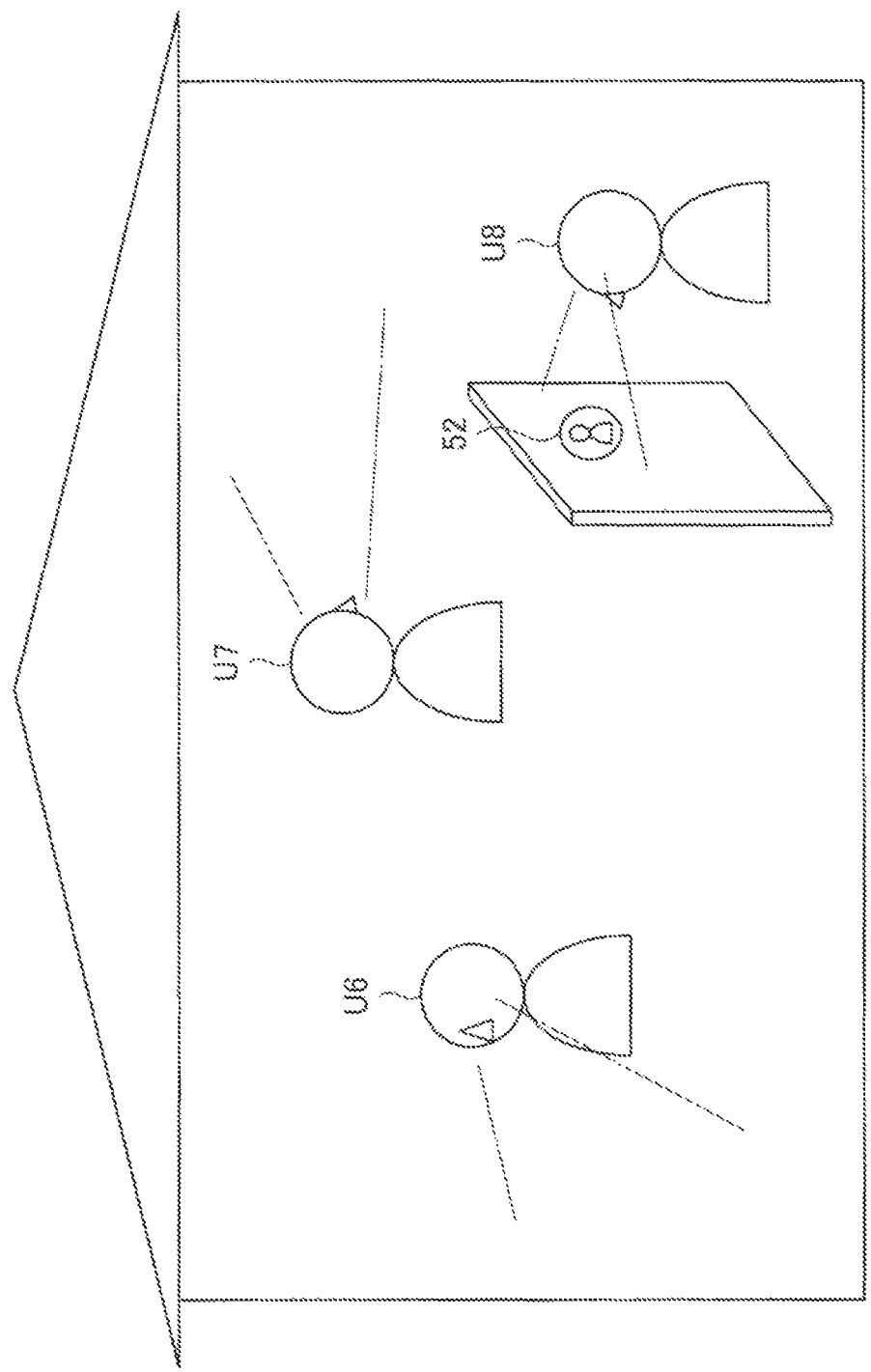
FIG. 39 is a diagram illustrating an example of display control for notification operation objects, which are visually recognized only by a specific user, in the information processing system according to the seventh modification example of the embodiment.

The example in which the notification operation object is displayed for the plurality of users has been described above. Next, an example in which a notification operation object is projected such that the notification operation object is visually recognized only by a part of a plurality of users will be described. Specifically, the notification operation object is displayed at a location at which the notification operation object is visually recognized only by specific operation subjects. If calling information is received, for example, the projection control unit 103 specifies users who are estimated to be destinations of the calling information. In a case in which a single user is specified, the projection control unit 103 causes the projection imaging device 10 to project the notification operation object related to the calling information at the specified location at which the notification operation object is visually recognized only by the specified users. Further, an example of display control for the notification operation object, in which the notification operation object is visually recognized only by a specific user, will be described with reference to FIG. 39. FIG. 39 is a diagram illustrating an example of display control for the notification operation object, in which the notification operation object is visually recognized only by a specific user, in the information processing system 1 according to the seventh modification example of the embodiment.

If a notification from the device to be operated to the user is received, the projection control unit 103 specifies a user as a notification destination. If calling information is received from a phone calling application or the like, for example, the projection control unit 103 acquires destination information (for example, a phone number) from the calling information. Then, the projection control unit 103 specifies a user linked to the acquired phone number. In detail, a user U8 as illustrated in FIG. 39 is specified on the basis of a result of face recognition processing using face information acquired through recognition performed by the recognition unit 101 and face information specified from a phone number.

Next, in a case in which a single user is specified (hereinafter, also referred to as a specific user) and other persons are located in the space in which the specific user is located, the projection control unit 103 decides a projection location of the notification operation object on the basis of each of the positions of the specific user and other persons. For example, the projection control unit 103 acquires information related to eye sight of the specific user U8 obtained through recognition performed by the recognition unit 101 and of other persons U6 and U7 other than the specific user U8. Then, the projection control unit 103 decides a location that is in the eyesight of the specific user U8 and is not in the eyesight of other persons U6 and U7 as a projection location of the notification operation object on the basis of information related to the eyesight. Note that the projection location of the notification operation object may be body parts such as on the backs of other persons.

Then, the projection control unit 103 causes the projection imaging device 10 to project the notification operation object at the decided projection location. For example, the notification operation object 52 is projected at a location, which is at dead angles from other persons U6 and U7 as illustrated in FIG. 39, at which the notification operation object 52 is visually recognized by the specific user U8.

Note that the example in which the single user is specified has been described above, specific users may be a plurality of users whose destination information is specified. In that case, notification operation objects may be individually displayed for each of the plurality of specific users, or a common notification operation object may be displayed for the plurality of specific users.

Figure 40:
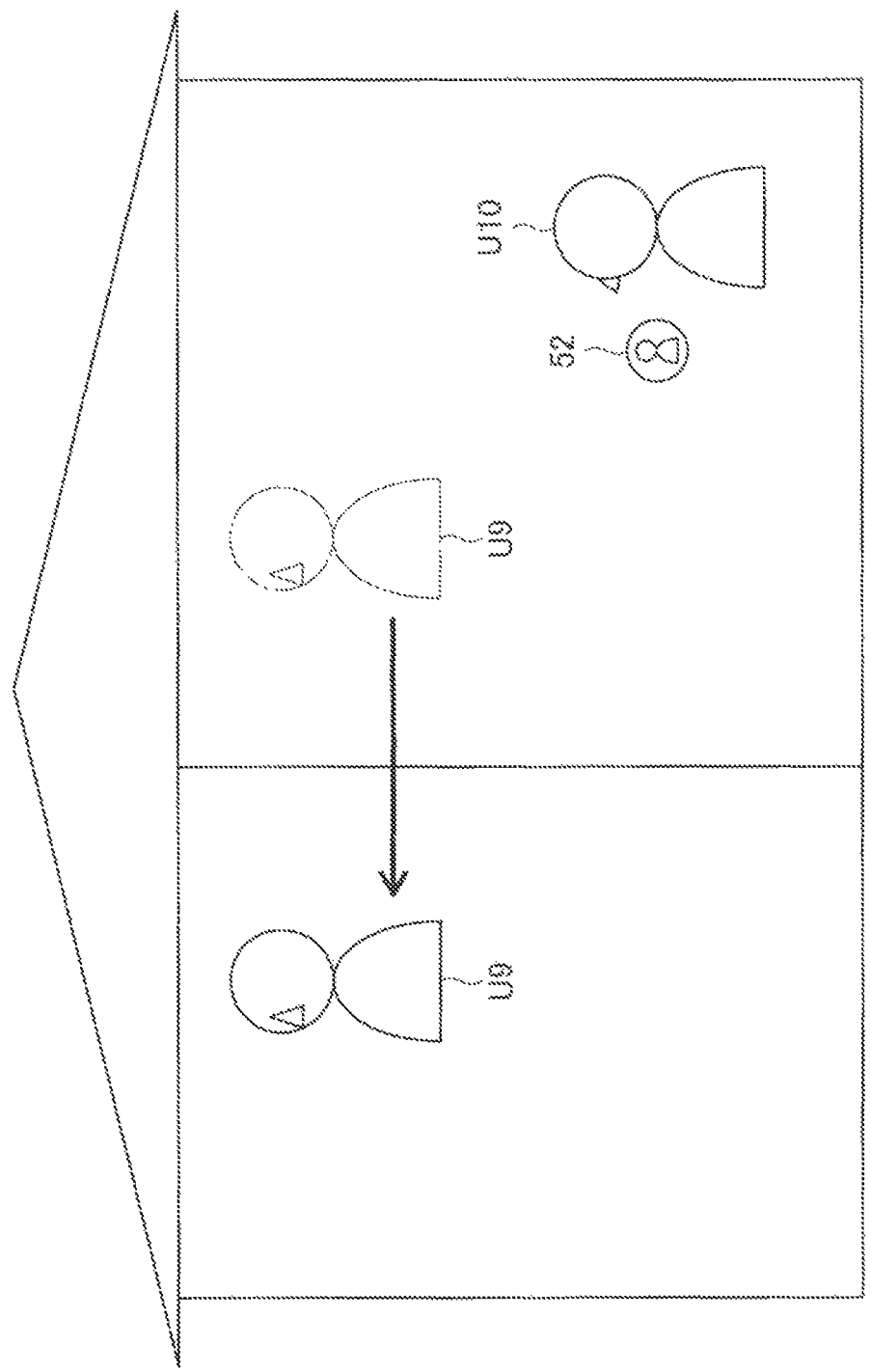
FIG. 40 is a diagram illustrating another example of the display control of the notification operation objects, which are visually recognized only by the specific user, in the information processing system according to the seventh modification example of the embodiment.

The case in which the notification operation objects are projected such that the notification operation objects are visually recognized only by a part of the plurality of users has been described above. Next, an example in which the notification operation objects are displayed only in a case in which there are no other persons present except for specific users will be described. Specifically, the notification operation objects are displayed in a case in which there are no persons other than specific operation subjects in a space in which the specific operation subjects are present. If calling information is received, for example, the projection control unit 103 specifies users who are estimated to be destinations of the calling information. In a case in which there are persons other than the specific users in the space in which the specific users are present, the projection control unit 103 causes the projection imaging device 10 to wait for display of the notification operation objects until other persons move to the outside of the space. Then, if other persons move to the outside of the space, the projection control unit 103 causes the projection imaging device 10 to project the notification operation objects related to the calling information at locations that are adjacent to the specific users. Further, another example of display control for the notification operation objects, in which the notification operation objects are visually recognized only by specific users, in the information processing system 1 according to the seventh modification example of the embodiment will be described with reference to FIG. 40. FIG. 40 is a diagram illustrating another example of display control for a notification operation object that is visually recognized only the a specific user in the information processing system 1 according to the seventh modification example of the embodiment.

If a notification from a device to be operated to a user is received, the projection control unit 103 specifies the user as a notification destination. For example, a user U10 as illustrated in FIG. 40 is specified on the basis of a result of face recognition processing using face information obtained through recognition performed by the recognition unit 101 and face information specified from destination information related to the notification.

Next, in a case in which other persons are located in the space in which the specific user is located, the projection control unit 103 waits for other persons moving to the outside of the space. For example, the projection control unit 103 grasps presence of the person U9 other than the specific user U10 from information obtained through the recognition performed by the recognition unit 101. Then, the projection control unit 103 determines whether or not this another person U9 has moved to the outside of the room in which the specific user U10 is located.

In addition, if this another person moves to the outside of the space, then the projection control unit 103 causes the projection imaging device 10 to project the notification operation object at a location that is adjacent to the specific user. If this another person U9 moves to the outside of the room in which the specific user U10 is located as illustrated in FIG. 40, for example, the projection control unit 103 causes the projection imaging device 10 to project the notification operation object 52 related to the calling information at a location at which the notification operation object 52 is visually recognized by the specific user U10.

According to the seventh modification example of the embodiment, the operation objects includes the notification operation object in relation to the notification to the operation subject, and the notification operation object is displayed in accordance with reception of the notification as described above. Therefore, it is possible to let the user know about the notification by the operation objects for the devices to be operated related to the notification being automatically displayed in response to the reception. Accordingly, it is possible to reduce the time required for checking or responding to the notification.

In addition, the aforementioned notification to the operation subject includes a notification to a plurality of operation subjects, and the aforementioned notification operation object is displayed at a location at which the notification operation object is visually recognized by each of the plurality of operation subjects. Therefore, it is possible to let each of a plurality of users notice the notification, and it is possible for each of the plurality of users to respectively perform operations of the devices to be operated in response to the notification. Accordingly, it is possible for another user to address the notification even in a case in which in which a certain user who has noticed the notification cannot operate the notification operation object.

In addition, the aforementioned notification to the operation subject includes a notification to a specific operation subject, and the aforementioned notification operation object is displayed at a location at which the notification operation object is visually recognized only by the specific operation subject. Therefore, it is possible to prevent persons other than the specific user from knowing private information in a case in which content of the notification has the private information of the specific user. Accordingly, it is possible to balance between protection of privacy for the specific user and responsiveness to the notification.

In addition, the aforementioned notification operation object is displayed in a case in which persons other than the specific operation subject are not present in a space in which the aforementioned specific operation subject is present. Therefore, it is possible to reliably prevent private information of the specific user from being known by other persons.

Eighth Modification Example

Figure 41:
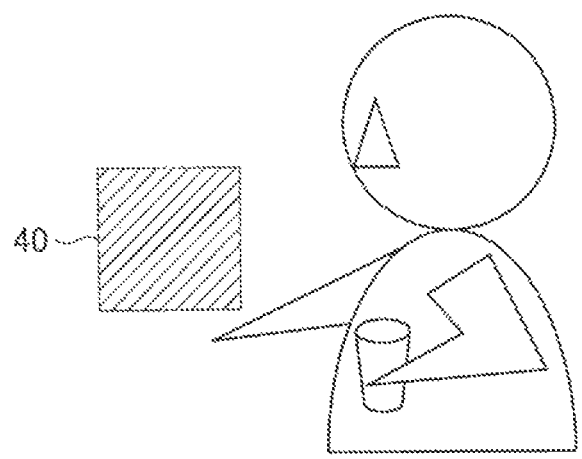
FIG. 41 is a diagram illustrating an example of display control for operation objects in an information processing system according to an eighth modification example of the embodiment.

In an eighth modification example of the embodiment, operation objects may be displayed at a location in accordance with a body state of the operation subject instead of the location in accordance with the predetermined motion. Specifically, if a user's body state is recognized by the recognition unit 101, the projection control unit 103 decides a projection location in accordance with the user-s body state from the user's body or the surroundings of the user. Further, the modification example will be described in detail with reference to FIG. 41. FIG. 41 is a diagram illustrating an example of display control for operation objects in the information processing system 1 according to the eighth modification example of the embodiment.

If a predetermined motion, that is, an operation object display instructing operation is recognized, the recognition unit 101 recognizes the user's body form. In a case in which the aforementioned user's display instructing operation is recognized, for example, the recognition unit 101 recognizes a state of a body part that is used in the user's s operation (hereinafter, also referred to as an operating part). The operating part includes a finger, a hand, an arm, a leg, and the like.

Next, the projection control unit 103 decides a location in accordance with the recognized user's body state as a projection location. Specifically, the projection control unit 103 decides the projection location of the operation objects on the basis of the state of the user-s operating part recognized by the recognition unit 101. In a case in which the user holds an object with his/her left hand as illustrated in FIG. 41, for example, the projection control unit 103 determines that the left hand is in an operation unavailable state while the right hand is in an operation available state. Then, the projection control unit 103 decides the projection location of the operation objects with reference to the right hand that is in the operation available state. In the example in FIG. 41, a range that the right hand can reach has been decided as a projection region 40. Then, the operation objects are projected in the projection region 40.

In addition, the operation objects may be displayed at a location in accordance with a posture of the operation subject. Specifically, if the user's posture is recognized by the recognition unit 101, the projection control unit 103 decides the projection location in accordance with the user's posture from the user's body or the surroundings of the user. In a case in which the user is on his/her side with the left side of his/her own body positioned above, for example, a predetermined region on the right side of the user, in other words, on the side to which the user's face is directed is decided as the projection location of the operation objects.

According to the eighth modification example of the embodiment, the operation objects are displayed at the location in accordance with the body state of the operation subject as described above. Therefore, it is possible to display the operation objects at a location at which the user can easily operate the operation objects in accordance with the user's body state. Accordingly, it is possible to improve operability in more use cases.

In addition, the operation objects are displayed at the location in accordance with the posture of the operation subject. Therefore, it is possible to display the operation objects at a location at which the operation objects are easily recognized by the user. Accordingly, it is possible to improve visibility of the operation objects and thus to improve operability.

Ninth Modification Example

Figure 42:
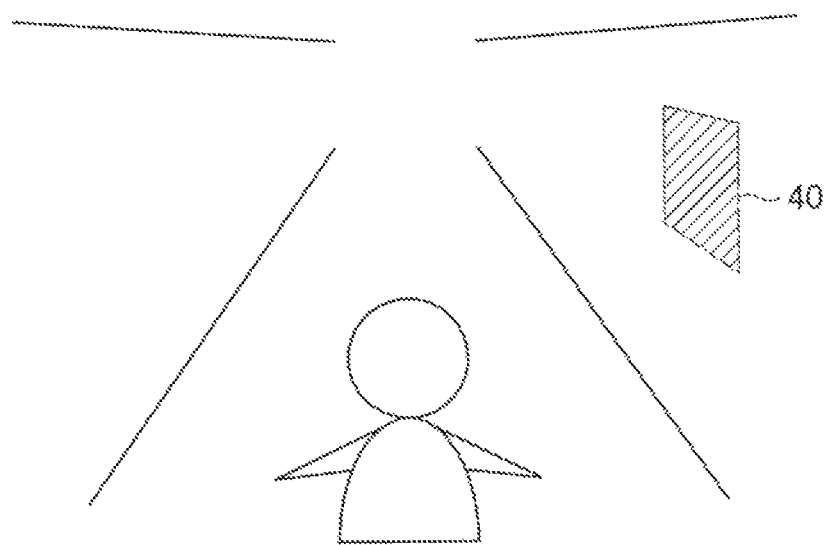
FIG. 42 is a diagram illustrating an example of display control for operation objects in an information processing system according to a ninth modification example of the embodiment.

In a ninth modification example of the embodiment, the operation objects may be displayed at a location in accordance with information with which the operation subject is specified. Specifically, if an operation object display instructing operation is recognized, the projection control unit 103 decides the display location of the operation objects on the basis of user specification information. Further, the modification example will be described in detail with reference to FIG. 42. FIG. 42 is a diagram illustrating an example of display control for operation objects in the information processing system 1 according to the ninth modification example of the embodiment. Note that description of processing that is substantially the same as the aforementioned processing will be omitted.

If the operation object display instructing operation is recognized, the projection control unit 103 acquires the user specification information.

Then, the projection control unit 103 causes the projection imaging device 10 to project the operation objects at a projection location decided on the basis of the user specification information. Specifically, the projection control unit 103 acquires projection location information for the operation objects set for the user related to the acquired user specification information and causes the projection imaging device 10 to project the operation objects at the projection location that the acquired projection location information indicates. In a case in which the right side of the user is set as the projection location for the user as illustrated in FIG. 42, for example, a predetermined region on a wall on the right side of the user is decided as the projection region 40 of the operation objects as illustrated in FIG. 42. Then, the operation objects are projected in the decided projection region 40.

In addition, the operation objects may be displayed at a location in accordance with information with which attributes of the operation subject is specified. Specifically, if an operation object display instructing operation is recognized, the projection control unit 103 decides the display location of the operation objects on the basis of user's attribute information. More specifically, the projection control unit 103 acquires dominant hand information from among attributes related to the user attribute information acquired when the operation object display instructing operation is recognized and causes the projection imaging device 10 to project the operation objects on the side of the dominant hand that the acquired dominant hand information indicates. In a case in which the dominant hand of the user as illustrated in FIG. 42 is the right hand, for example, a predetermined region on a wall on the right side of the user is decided as the projection region 40 of the operation objects as illustrated in FIG. 42. Then, the operation objects are projected in the decided projection region 40.

According to the ninth modification example of the embodiment, the operation objects are displayed at the location in accordance with the information with which the operation subject is specified as described above. Therefore, it is possible to display the operation objects at a location suitable for the individual users. Accordingly, it is possible to further improve operability or usability of the individual users.

In addition, the operation objects are displayed at the location in accordance with the information with which the attributes of the operation subject are specified. Therefore, it is possible to improve operability or usability as compared with a case in which the display location is uniformly decided, by displaying the operation objects at the location in accordance with user's characteristics. In addition, it is possible to suppress a concern that information safety deteriorates by the display location of the operation objects being controlled without information with which the individual users are specified.

Tenth Modification Example

Figure 43:
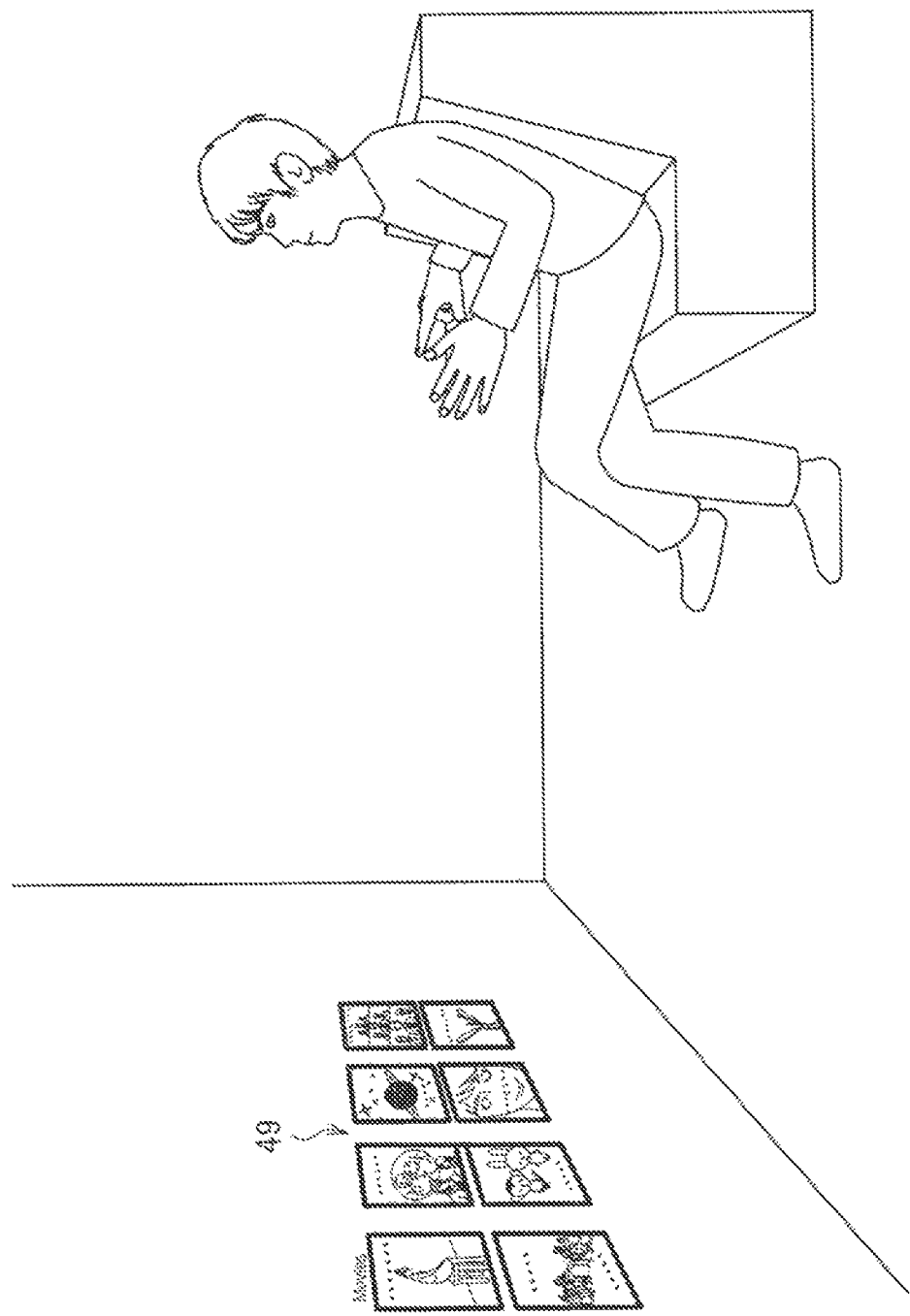
FIG. 43 is a diagram illustrating an example of an operation performed to an operation object in an information processing system according to a tenth modification example of the embodiment.

In a tenth modification example of the embodiment, an operation object may be indirectly operated. Specifically, the operation object may be operated on the basis of an operation performed to a user's body part. More specifically, the recognition unit 101 recognizes the operation performed to the user's body part when the operation object is displayed. Then, the projection control unit 103 grasps an operation performed to the operation object in accordance with the recognized operation performed to the body part and updates display of the operation object in accordance with the grasped operation. In addition, the device control unit 104 controls the devices to be operated in accordance with the grasped operation. Further, the modification example will be described in detail with reference to FIG. 43. FIG. 43 is a diagram illustrating an example of an operation of an operation object in the information processing system 1 according to the tenth modification example of the embodiment.

The recognition unit 101 attempts to recognize an operation performed to a user's body part when the operation objects are displayed. When the operation object 49 is projected as illustrated in FIG. 43, for example, the recognition unit 101 attempts to recognize an operation of the operation object 49 performed by the user to the user's own body part. The operation performed to the body part includes an operation of touching fingers of one hand with fingers of the other hand and the like.

If the operation performed to the user's body part is recognized, the projection control unit 103 controls display of the operation object in accordance with the recognized operation. If an operation of touching the thumb of the left hand with fingers of the right hand is recognized, for example, selected content is changed with the operation object 49.

In addition, if an operation performed to the user's body part is recognized, the device control unit 104 controls the device to be operated in relation to the displayed operation object in accordance with the recognized operation. If an operation of touching a middle finger of the left hand with fingers of the right hand is recognized, for example, a movie of content selected with the operation object 49 is reproduced by the display device.

Note that, operation functions may be respectively associated with each of the fingers. For example, a power operation may be associated with the thumb, channel-up may be associated with an index finger, and channel-down may be associated with the middle finger.

According to the tenth modification example of the embodiment, the operation object is operated on the basis of the operation performed to the user's body part as described above. Therefore, the user can operate the operation object without touching the operation object. Accordingly, the user can operate the operation object without moving or changing the body posture, and it is possible to improve usability. In addition, the user can intuitively operate the operation object. In a case in which the operation is performed with a somatic sensation without visually recognizing the operation destination, in particular, the line of sight becomes free. In this case, the user can operate the operation object, in other words, the device to be operated while continuously viewing a movie, for example.

Note that although the example in which the operation performed to the displayed operation object is an operation using a user's body part has been described above, the device to be operated may be directly operated through an operation using the user's body part without the operation object being displayed.

5. Third Embodiment of the Present Disclosure (Displacement of Operation Objects)

The second embodiment of the present disclosure has been described above. Next, a third embodiment of the present disclosure will be described. In the third embodiment of the present disclosure, an embodiment of the aforementioned operation object displacement function in the information processing system 1 will be mainly described.

5-1. Configuration of System

First, a functional configuration of the information processing system 1 according to the embodiment will be described. Note that only the information processing apparatus 100-3 will be described similarly to the second embodiment. Also, description of functions that are substantially the same as those in the first or second embodiment from among the functions of the information processing apparatus 100-3 will also be omitted.

(Recognition Unit)

The recognition unit 101 recognizes a predetermined operation performed to an operation object by an operation subject. Specifically, the recognition unit 101 recognizes an operation of gripping the operation object and an operation of releasing the operation object. For example, the recognition unit 101 attempts to recognize an operation of gripping an operation object that is displayed on the hand and a subsequent operation of opening the gripped hand.

(Projection Control Unit)

Figure 44:
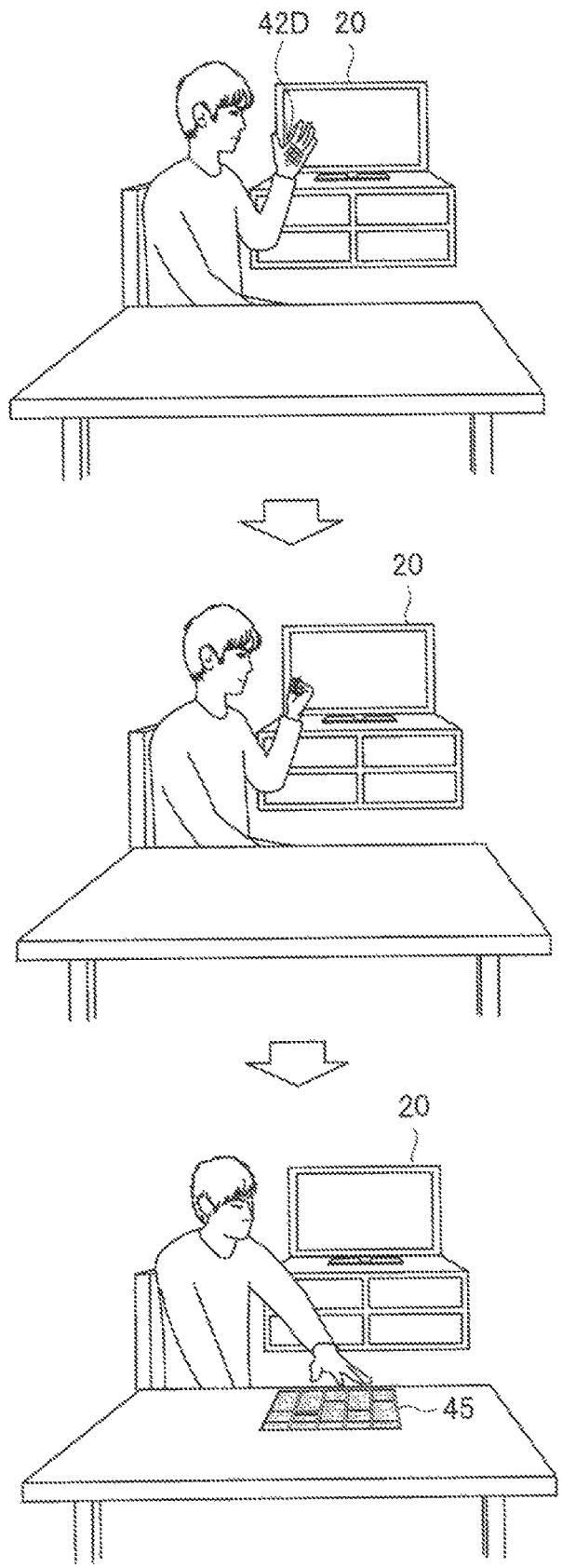
FIG. 44 is a diagram illustrating an example of displacement control of operation objects in an information processing system according to a third embodiment of the present disclosure.

The projection control unit 103 serves a reference control unit and controls a reference of a location at which the operation objects are displayed such that the operation objects are visually recognized (hereinafter, also referred to as a reference of the display location) on the basis of the predetermined operation performed to the operation objects. Specifically, if there is an object in a real space as a reference of the display location, and a predetermined operation performed to the displayed operation objects is recognized, the projection control unit 103 changes the object as the reference of the display location. Then, the operation object is displayed on the basis of the changed reference of the display location. In this manner, displacement of the operation objects is realized. Further, displacement of the operation objects will be described in detail with reference to FIG. 44. FIG. 44 is a diagram illustrating an example of displacement control of the operation objects in the information processing system 1 according to the third embodiment of the present disclosure.

First, a first operation from among predetermined operations for the operation objects is recognized. If the user performs the first operation of gripping an operation object 42D as illustrated in the center diagram in FIG. 44 in a case in which the operation object 42D is projected on a user's palm as illustrated in the upper diagram in FIG. 44, for example, the first operation is recognized by the recognition unit 101.

If the first operation is recognized, the projection control unit 103 causes the projection imaging device 10 to change the form of the operation object. If the aforementioned first operation is recognized, for example, the projection control unit 103 causes the projection imaging device 10 to temporarily stop the projection of the operation object 42D. When the state in which the hand is gripped continues as illustrated in the center diagram in FIG. 44, for example, the projection of the operation object 42D is stopped. Note that the display of the operation object 42D may be reduced in size instead of the display of the operation object 42D being stopped. In this case, the user can perform a subsequent second operation without losing sight of the operation object 42D.

Next, the second operation from among the predetermined operations for the operation object is recognized. If the user performs the second operation of opening the gripped hand as illustrated in the lower diagram in FIG. 44, in other words, the second operation of releasing the gripped operation object 42D toward a table, for example, the second operation is recognized by the recognition unit 101.

If the second operation is recognized, the projection control unit 103 changes the reference of the display location for the operation object selected through the aforementioned first operation on the basis of the location in accordance with the second operation. Specifically, the projection control unit 103 changes the reference of the display location for the operation object selected through the first operation that is gripping to an object as a target of the second operation that is releasing. If the second operation of releasing is recognized, for example, the projection control unit 103 changes the reference of the display location of the operation object 42D, to which the first operation of gripping has been performed, from the user's palm to the table that is a target of the second operation.

If the reference of the display location is changed, the projection control unit 103 causes the projection imaging device 10 to project the operation object on the basis of the reference of the display location after the changing. Specifically, the projection control unit 103 controls the form of the operation object when the reference of the display location is changed. More specifically, the projection control unit 103 decides the form of the operation object after the changing on the basis of information related to the reference of the display location after the changing. The information related to the reference of the display location after the changing includes information with which the form of the reference of the display location after the changing is specified. If the reference of the display location is changed to the table, for example, the projection control unit 103 decides the form of the operation object 42D in accordance with a projection available region on the table. In detail, the projection control unit 103 decides complication of the operation object 42D in accordance with how broad the projection available region is. In the example of the lower diagram in FIG. 44, an operation object 45 with expanded display content and operation functions as compared with those of the operation object 42D is projected since the projection available region on the table is broader than the projection available region on the palm that is the reference of the display location before the changing.

In addition, the information related to the reference of the display location after the changing includes information with which attributes of the reference of the display location after the changing are specified. If the reference of the display location is changed to the table, for example, the projection control unit 103 decides the form of the operation object 42D in accordance with the attributes of the table. In detail, in a case in which the type of the table is a dining table, the display content and the operation functions of the operation object 42D are expanded.

In addition, the form of the operation object after the changing may be decided on the basis of the information related to the reference of the display location before the changing in a similar manner.

Figure 45:
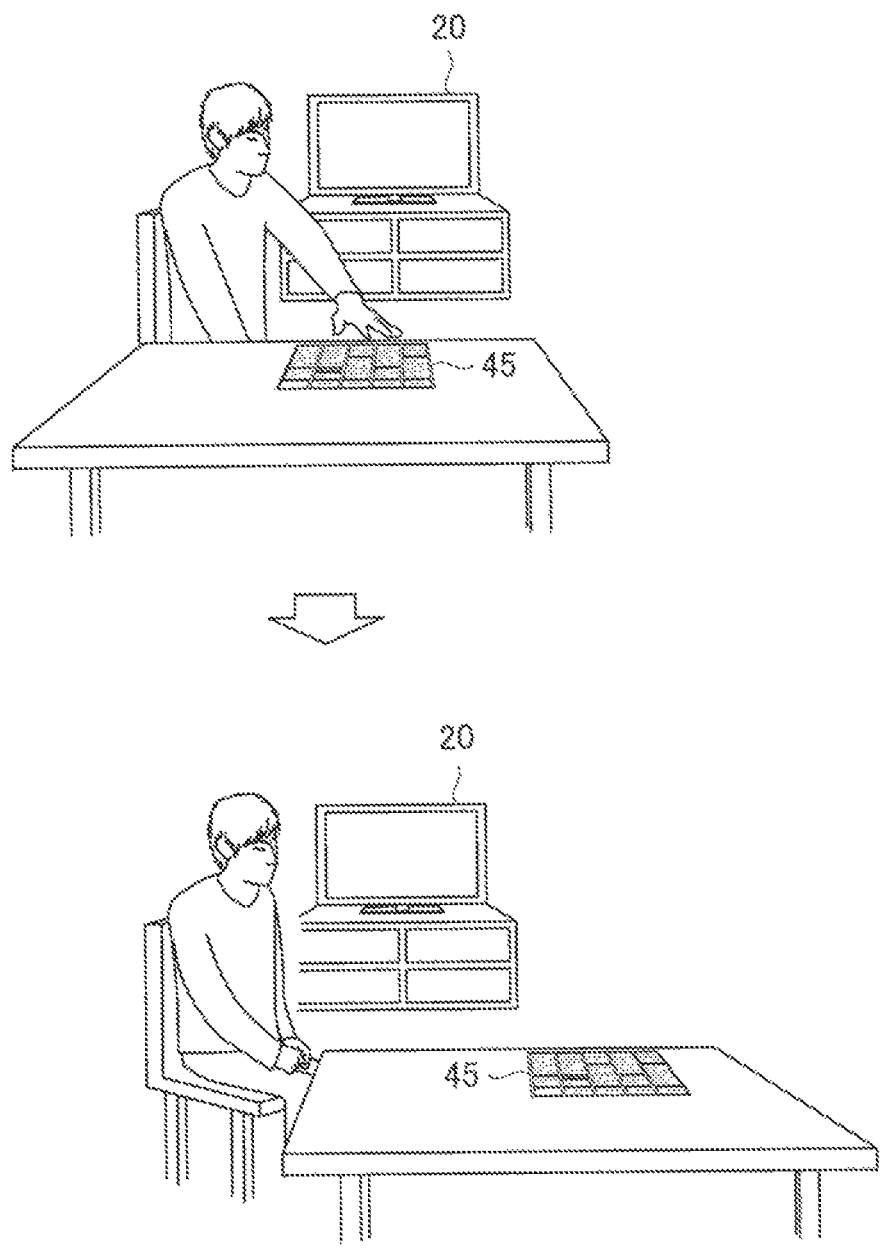
FIG. 45 is a diagram illustrating an example of followability of the operation objects relative to a reference of a display location in the information processing system according to the embodiment.

The displacement control for the operation objects has been described above. Further, the projection control unit 103 may cause the operation object to follow the reference of the display location. Specifically, the projection control unit 103 changes the display location of the operation objects in accordance with the displacement of the reference of the display location. Followability of the operation objects relative to the reference of the display location will be described in detail with reference to FIG. 45. FIG. 45 is a diagram illustrating an example of followability of the operation objects relative to the reference of the display location in the information processing system 1 according to the embodiment.

If the aforementioned second operation is recognized, the projection control unit 103 changes the reference of the display location to the object that is the target of the second operation. If the second operation is recognized as having been performed in a direction toward the table as illustrated in the upper diagram in FIG. 45, for example, the projection control unit 103 changes the reference of the display location to the table. As a result, the operation object 45 is projected to the table.

Then, the projection control unit 103 changes the display location of the operation object in accordance with the displacement of the object that is the reference of the display location. If the table is displaced as illustrated in the lower drawing in FIG. 45, for example, the projection control unit 103 changes the projection location of the operation object 45 in accordance with the displacement of the table. As a result, it is possible to prompt the user to visually recognize that the operation object 45 is displaced along with the displacement of the table as illustrated in the lower drawing in FIG. 45, that is, as if the operation object 45 followed the displacement of the table.

Note that the object as the reference of the display location may be a person. Specifically, the projection control unit 103 changes the display location of the operation object in accordance with displacement of the person who is the reference of the display location. The case in which the reference of the display location is a person will be described in detail with reference to FIG. 46. FIG. 46 is a diagram illustrating an example of followability of the operation object in a case in which the reference of the display location is a person in the information processing system 1 according to the embodiment.

First, the projection control unit 103 causes the projection imaging device 10 to project the operation object at a location in accordance with attributes or a form of the person who is the reference of the display location. In a case in which the dominant hand of the person who is the reference of the display location is the left hand, for example, the operation object 45 is projected at the location at which the operation object 45 can be easily operated with the dominant hand of the person as illustrated in the upper diagram in FIG. 46. In addition, in a case in which the body of the person who is the reference of the display location faces the table, the operation object 45 is projected to the table that is estimated to fall within the eyesight of the person as illustrated in the upper diagram in FIG. 46.

Then, the projection control unit 103 changes the display location of the operation object in accordance with the displacement of the person who is the reference of the display location. If the person is displaced as illustrated in the lower diagram in FIG. 46, for example, the projection control unit 103 changes the projection location of the operation object 45 in accordance with the displacement of the person. As a result, it is possible to prompt the user to visually recognize that the operation object 45 is displaced along with the displacement of the person as illustrated in the lower diagram in FIG. 46, that is, as if the operation object 45 followed the displacement of the person.

5-2. Processing of System

Next, processing of the information processing system 1 according to the embodiment will be described.
(Overall Processing)

Figure 47:
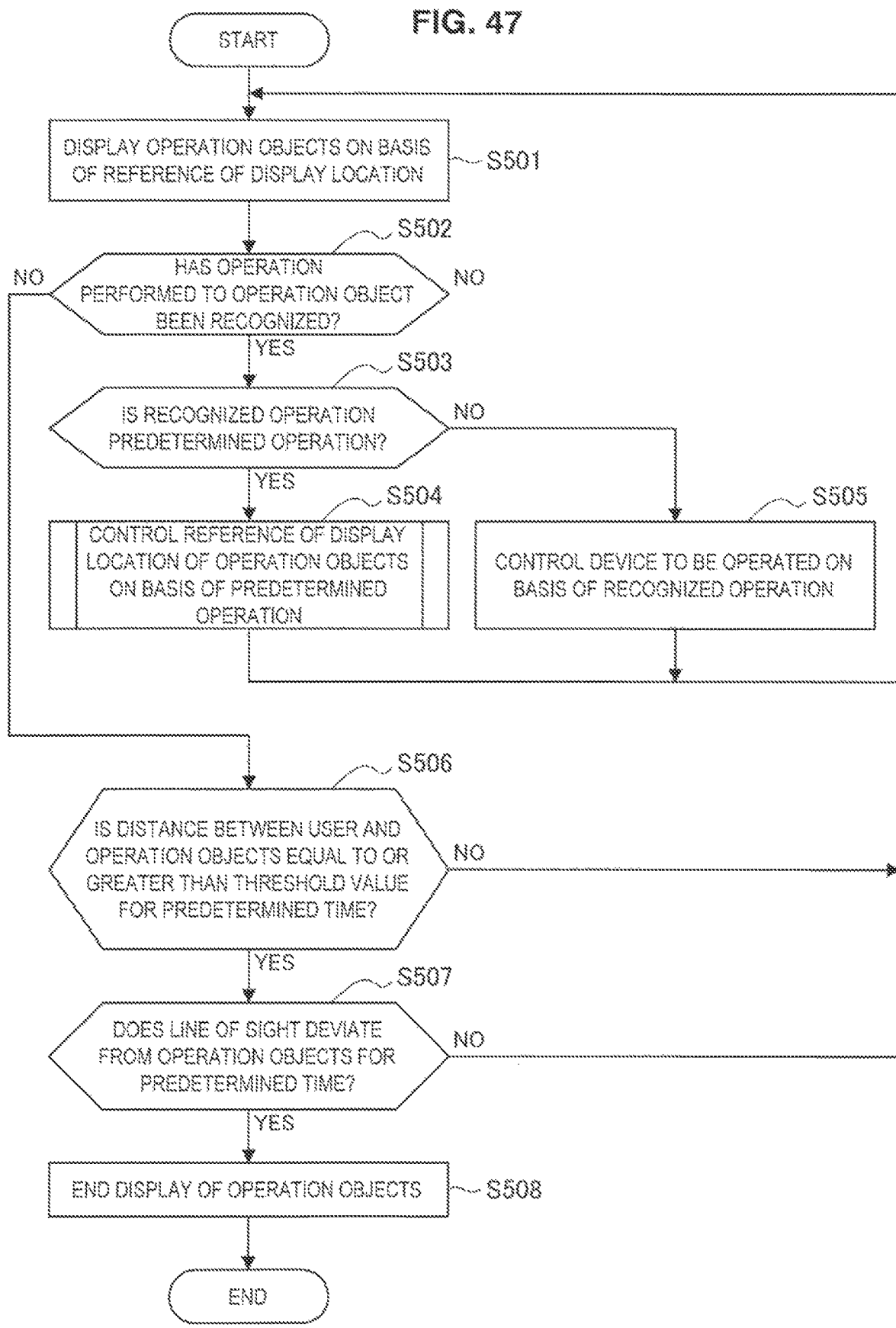
FIG. 47 is a flowchart conceptually illustrating an example of overall processing of the information processing system according to the embodiment.

First, overall processing of the information processing system 1 according to the embodiment will be described with reference to FIG. 47. FIG. 47 is a flowchart conceptually illustrating an example of overall processing of the information processing system 1 according to the embodiment.

The information processing system 1 displays an operation object on the basis of a reference of a display location (Step S501). Specifically, if an operation object display instructing operation is performed, the projection control unit 103 causes the projection imaging device 10 to project the operation object on the basis of an initial reference of the display location.

Next, the information processing system 1 determines whether or not the operation performed to the operation object has been recognized (Step S502). Specifically, the projection control unit 103 determines whether or not the operation performed to the operation object has been recognized by the recognition unit 101.

If it is determined that the operation performed to the operation object is recognized, the information processing system 1 determines whether or not the recognized operation is a predetermined operation (Step S503). Specifically, the projection control unit 103 determines whether or not the operation recognized by the recognition unit 101 is the predetermined operation. Note that in a case in which the predetermined operation is a set of a plurality of operations (for example, the aforementioned set of the first operation and the second operation), the projection control unit 103 determines whether or not the recognized operation is an operation (for example, the first operation) that is performed first from among predetermined operations.

If it is determined that the recognized operation is a predetermined operation, the information processing system 1 controls the reference of the display location of the operation object on the basis of the predetermined operation (Step S504). Specifically, the projection control unit 103 changes the reference of the display location of the operation object on the basis of the recognized predetermined operation. Note that details thereof will be described later.

If it is determined that the recognized operation is not a predetermined operation, the information processing system 1 controls the device to be operated on the basis of the recognized operation (Step S505). Specifically, if an operation other than the predetermined operation is recognized, the device control unit 104 controls the device to be operated for the operation object on the basis of the recognized operation.

In addition, the information processing system 1 determines whether or not the distance between the user and the operation object is equal to or greater than a threshold value for a predetermined time while no operation performed to the operation object is recognized in Step S502 (Step S506). Specifically, the projection control unit 103 determines whether or not the period during which the distance between the user and the operation object recognized by the recognition unit 101 is equal to or greater than the threshold value continues for a time that is equal to or greater than the predetermined time.

If it is determined that the distance between the user and the operation object is equal to or greater than the threshold value for the predetermined time, the information processing system 1 determines whether or not the line of sight has deviated from the operation object for a predetermined time (Step S507). Specifically, if it is determined that the period during which the distance between the user and the operation object is equal to or greater than the threshold value continues for the time that is equal to or greater than the predetermined time, the projection control unit 103 further determines whether or not a period during which the user's line of sight deviates from the operation object deviates from the operation object is equal to or greater than the predetermined time.

It is determined that the line of sight has deviated from the operation object for the predetermined time, the information processing system 1 ends the display of the operation object (Step S508). Specifically, if it is determined that the period during which the user's line of sight deviates from the operation object is equal to or greater than the predetermined time, the projection control unit 103 causes the projection imaging device 10 to end the projection of the operation object. Note that a notification such as an alert may be provided to the user before the projection of the operation object is ended. The notification may be projection of an image related to the alert, an output of sound, or the like.

(Processing of Controlling Reference of Display Location)

Figure 48:
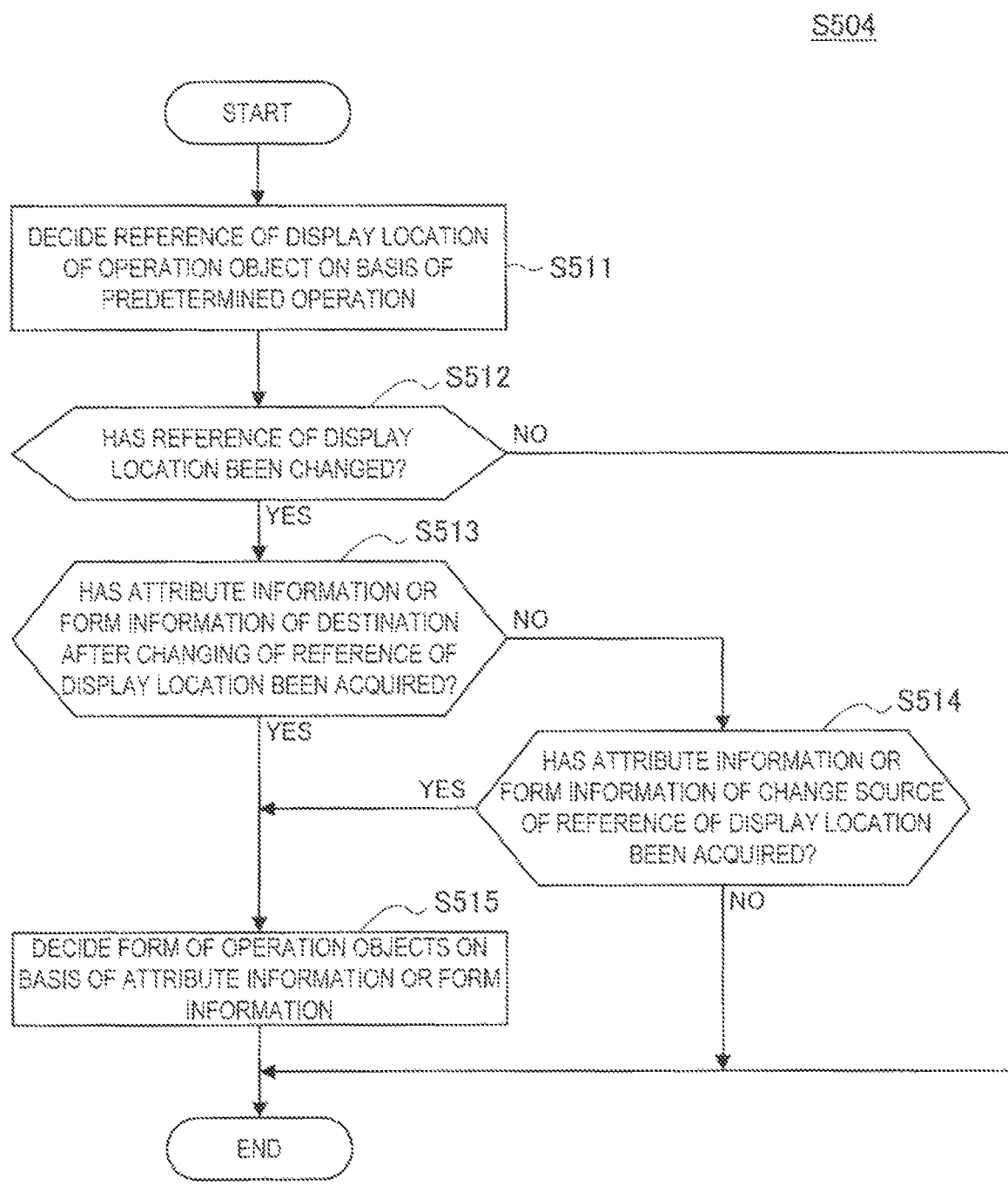
FIG. 48 is a flowchart conceptually illustrating an example of processing of controlling a reference of the display location in the information processing system according to the embodiment.

Next, processing of controlling a reference of a display location in the information processing system 1 will be described with reference to FIG. 48. FIG. 48 is a flowchart conceptually illustrating an example of the processing of controlling the reference of the display location in the information processing system 1 according to the embodiment.

The information processing system 1 decides a reference of a display location of operation objects on the basis of the predetermined operation (Step S511). Specifically, the projection control unit 103 decides a target of a recognized predetermined operation as the reference of the display location. For example, a target to which the aforementioned second operation has been performed is decided as the reference of the display location.

Next, the information processing system 1 determines whether or not the reference of the display location has been changed (Step S512). Specifically, the projection control unit 103 determines whether or not the reference of the display location after the decision is different from the reference of the display location before the decision.

If it is determined that the reference of the display location has been changed, the information processing system 1 determines whether or not attribute information or form information of a destination after changing of the reference of the display location has been acquired (Step S513). Specifically, in a case in which the references of the display locations before and after the decision differ from each other, the projection control unit 103 determines whether or not the attribute information or the form information of the destination after changing of the reference of the display destination has been acquired. Note that it may be determined whether or not such information can be acquired.

In addition, the information processing system 1 determines whether or not attribute information or form information of a change source of the reference of the display location has been acquired (Step S514). Specifically, the projection control unit 103 determines whether or not attribute information or form information of the change source of the reference of the display destination has been acquired. Note that it may be determined whether such information can be acquired.

If it is determined that the attribute information or the form information of the destination after changing or the change source of the reference of the display location has been acquired, the information processing system 1 decides the form of the operation objects on the basis of the acquired attribute information or form information (Step S515). Specifically, the projection control unit 103 decides complication of the operation objects on the basis of the acquired attribute information or form information of the destination after changing or the change source of the reference of the display location.

Note that the form of the operation objects may be decided on the basis of both the information of the destination after changing and the information of the change source of the reference of the display location.

5-4 Summary of Third Embodiment

According to the third modification example of the present disclosure, the information processing system 1, that is, the information processing apparatus 100-3 controls the display of the operation objects for the device to be operated and controls the reference of the location at which the operation objects are displayed such that the operation objects are visually recognized on the basis of predetermined operation performed by the operation subject of the device to be operated to the operation objects as described above.

Conventionally, a projection location itself of a virtual object is displaced in accordance with the user's predetermined motion. Therefore, if the user's predetermined motion is stopped, for example, the displacement of the virtual object is also stopped, and the projection location of the virtual object is not affected by displacement or the like of any object that is present at the projection location. However, real objects are displaced along with the displacement of the object on which the real object is placed. Since behaviors of the conventional virtual object differ from those of the actual object in this manner, there is a concern that the user's operation performed to the virtual object becomes unsmooth.

Meanwhile, according to the embodiment, it is possible to control the display location of the operation object not only in accordance with a user's direct operation on the operation object but also in accordance with an indirect operation, conditions of the reference of the display location irrelevant to user's actions, and the like by the reference of the display location of the operation object being controlled. Therefore, the user can arrange or displace the operation object as if the user handled a real object. Accordingly, it is possible to operate the displacement location of the operation object with a sense of moving an actual object.

In addition, the aforementioned reference includes objects in a real space, and the location at which the aforementioned operation object is displayed is changed in accordance with displacement of the objects. Therefore, it is possible to prompt the user to visually recognize as if the operation object is displaced between objects in the real space. Further, it is possible for the user to intuitively understand which of objects is a reference of the display location of the operation object, in other words, which of the objects is associated with the operation object by the display location of the operation object following the displacement of the objects. Therefore, the user can easily check whether or not the operation object has been displaced to an intended object.

In addition, the aforementioned object includes the aforementioned operation subject, and the aforementioned operation object is displayed such that the operation object is visually recognized at a location in accordance with the attributes or the form of the operation subject. Therefore, the user can handle the operation object as if the operation object was his/her belonging. Therefore, it is possible to improve usability. Further, it is possible to display the operation object such that the operation object follows the location suitable for the user's operation. Accordingly, it is possible to maintain operability while displacing the operation object.

In addition, the information processing apparatus 100-3 controls the form of the aforementioned operation object when the aforementioned reference is controlled. There is a probability that a display environment or display conditions of the operation object change before and after the changing of the reference of the display location, that is, before and after the displacement of the operation object. Thus, it is possible to display the operation object in the form suitable for the reference of the display location after the changing by controlling the form of the operation object when the reference of the display location is controlled.

In addition, the form of the aforementioned operation object is controlled on the basis of the aforementioned information related to the reference after the control. Therefore, it is possible to increase a probability at which the form after the change is suitable for the displacement destination by the form being changed in accordance with the displacement destination of the operation object.

In addition, the aforementioned information related to the reference after the control includes information with which attributes or a form of the aforementioned reference after the control is specified. Therefore, it is possible to more reliably increase the probability at which the form after the changing is suitable for the displacement destination by the operation object being displayed in the form in accordance with characteristics of the displacement destination. In addition, it is possible to more reliably increase the probability at which the form after the changing is suitable for the displacement destination irrespective of a change in conditions of the displacement destination by the operation object being displayed in the form in accordance with conditions of the displacement destination that can vary.

In addition, the form of the aforementioned operation object includes complication of the operation object. Therefore, it is possible to maintain or improve visibility or operability of the operation object by complication of display or operations being controlled in accordance with the displacement of the operation object.

In addition, the aforementioned predetermined operation includes the set of the first operation and the second operation on the aforementioned operation object, and the information processing apparatus 100-3 changes the reference of the operation object selected through the first operation on the basis of a location in accordance with the second operation. Therefore, the user can displace only the desired operation object by the operation object as the target of the displacement being explicitly selected. Accordingly, it is not necessary for any operation object that the user does not intend to be displaced, and it is possible to improve operability of an operation object displacement operation. In addition, the user can smoothly perform the operation object displacement operation by the operation object being displaced by a series of first and second operations. Accordingly, it is possible to suppress complexity in the operation object displacement operation.

5-4. Modification Examples

The third embodiment of the present disclosure has been described above. Note that the embodiment is not limited to the aforementioned example. Hereinafter, first to sixth modification examples of the embodiment will be described.

First Modification Example

Figure 49:
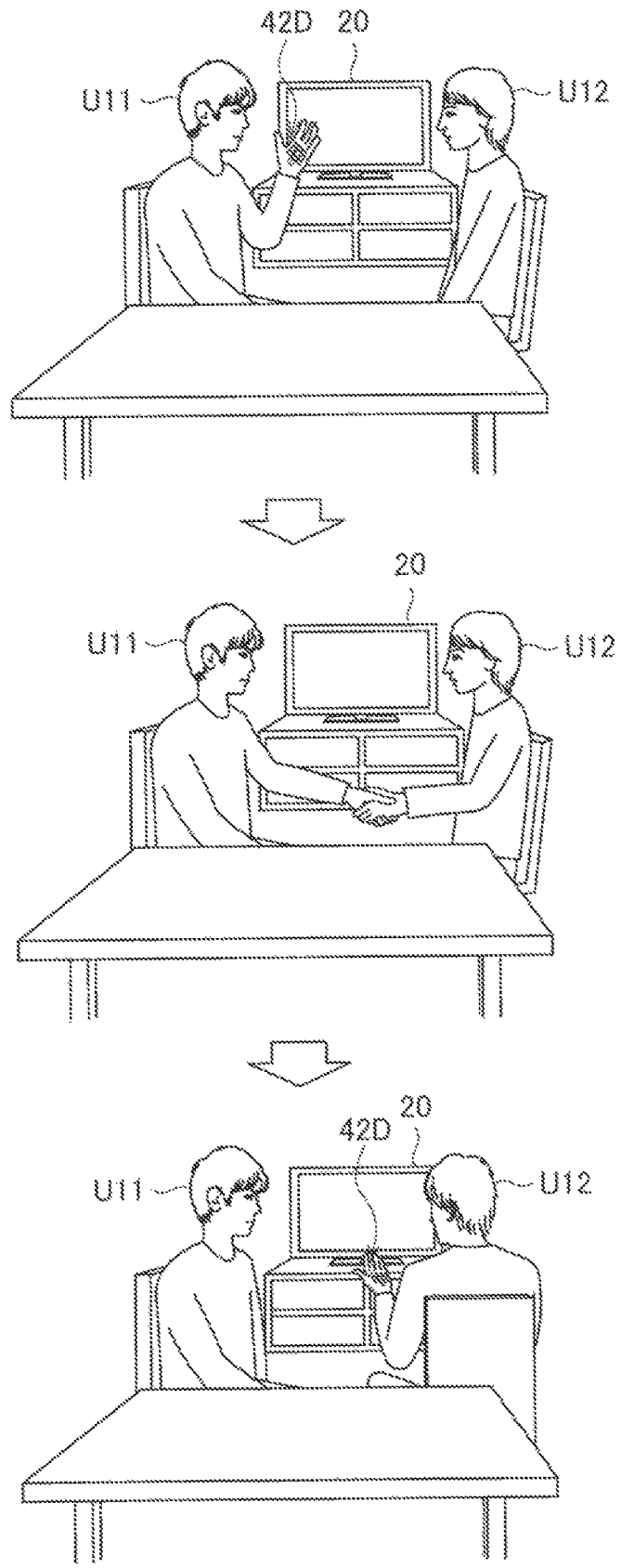
FIG. 49 is a diagram illustrating an example of a predetermined operation in an information processing system according to a first modification example of the embodiment.

In a first modification example of the embodiment, the predetermined operation may be another operation. Specifically, the predetermined operation includes contact between targets of references of the display location. If an object as a reference of the display location is recognized as having been brought into contact with another object by the recognition unit 101, for example, the projection control unit 103 changes the reference of the display location to this another object. Further, the modification example will be described in detail with reference to FIG. 49. FIG. 49 is a diagram illustrating an example of a predetermined operation in the information processing system 1 according to the first modification example of the embodiment.

The projection control unit 103 causes the projection imaging device 10 to project an operation object to the object as the reference of the display location. For example, an operation object 42D, the reference of the display location of which is a user U11 or a hand or a palm of the user U11, is projected to the palm of the user U11 as illustrated in the upper diagram in FIG. 49.

Next, if the object as the reference of the display location is recognized as having been brought into contact with another object, the projection control unit 103 changes the reference of the display location to this another object. If the user U11 with the hand on which the operation object 42D is being projected is recognized as having shaking hands with another user U12 with that hand as illustrated in the center diagram in FIG. 49, for example, the projection control unit 103 changes this another user U12 or the hand or the palm of the user U12 to the reference of the display location of the operation object 42D.

Then, the projection control unit 103 causes the projection imaging device 10 to project the operation object on the basis of the reference of the display location after the changing. As illustrated in the lower diagram in FIG. 49, for example, the operation object 42D is projected on the palm, which is the reference of the display location after the changing, of aforementioned another user U12. Note that the operation object 42D is not projected for the aforementioned user U11 who is the reference of the display location before the changing. In this manner, it is possible to prompt the user to visually recognize as if the operation object has been displaced by the user shaking hands.

The example in which the reference of the display location is changed by the contact between the targets of the references of the display location has been described above. However, the predetermined operation may be another operation. Specifically, the predetermined operation may be an operation of causing the operation object to rotate. For example, if the operation of rotating the operation object is recognized by the recognition unit 101, the projection control unit 103 changes the reference of the display location to an object at a rotation destination. Further another mode of the modification example will be described in detail with reference to FIG. 50. FIG. 50 is a diagram illustrating another example of the predetermined operation in the information processing system 1 according to the first modification example of the embodiment.

The projection control unit 103 causes the projection imaging device 10 to project the operation object on the basis of the reference of the display location. For example, the operation object 45, the reference of the display location of which is a user U13, is projected on a table such that the operation object 45 confronts the user 13 as illustrated in the upper diagram in FIG. 50.

Next, if an operation of rotating the operation object is recognized, the projection control unit 103 changes the reference of the display location to the reference of the display location for a user who is present in a direction related to the rotation. If the operation of causing the operation object 45 to rotate such that the operation object 45 faces the direction of a user U14, which is performed by the user U13, is recognized as illustrated in the upper diagram in FIG. 50, for example, the projection control unit 103 changes the reference of the display location of the operation object 45 from the user U13 to the user U14.

Then, the projection control unit 103 causes the projection imaging device 10 to project the operation object on the basis of the reference of the display location after the changing. For example, the operation object 45 is caused to rotate such that the operation object 45 confronts the user U14 as illustrated in the lower diagram in FIG. 50. In this manner, it is possible to prompt the user to visually recognize as if an owner of the operation object has been changed by the user's rotating operation.

Figure 52:
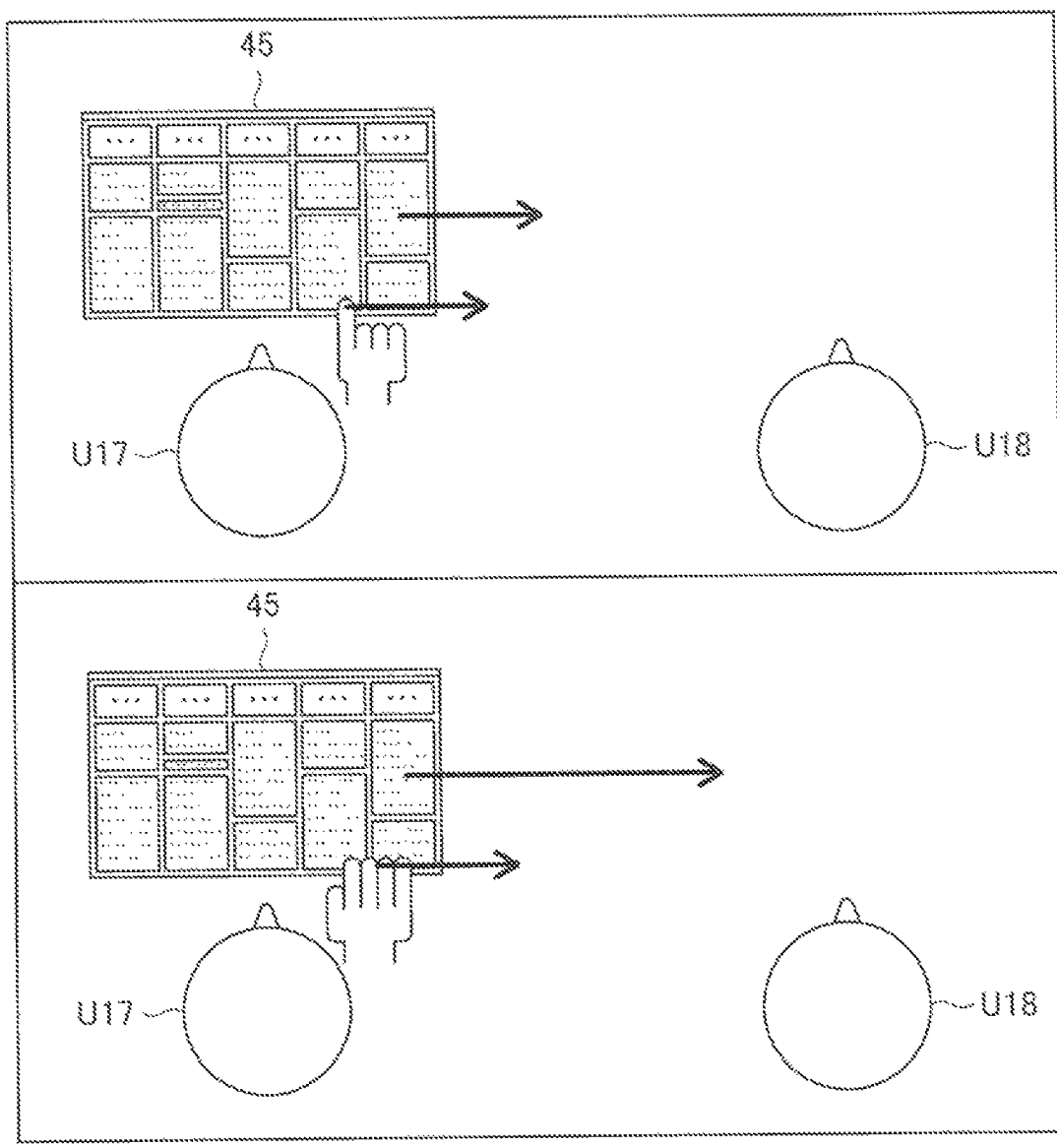
FIG. 52 is a diagram illustrating yet another example of a predetermined operation in the information processing system according to the first modification example of the embodiment.
Figure 53:
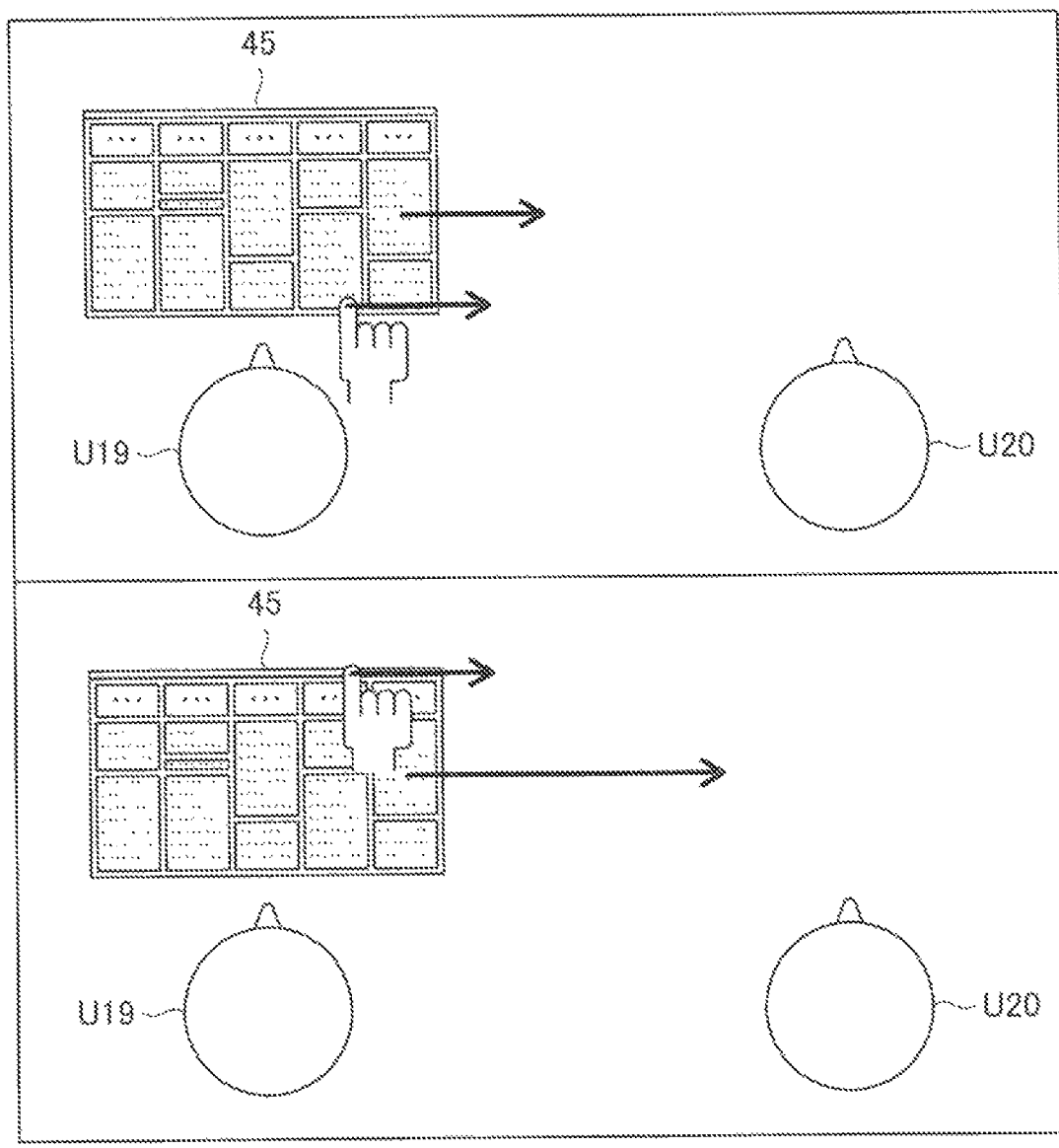
FIG. 53 is a diagram illustrating yet another example of a predetermined operation in the information processing system according to the first modification example of the embodiment.

The example in which the reference of the display location is changed by the operation of rotating the operation object has been described above. However, the predetermined operation may be another operation. Specifically, the predetermined operation may be an operation of snapping the operation object to the destination after changing of the reference of the display location. If the operation of snapping the operation object is recognized by the recognition unit 101, for example, the projection control unit 103 changes the reference of the display location to the object that is estimated from the snapping operation. Further, another mode of the modification example will be described with reference to FIGS. 51 to 53. FIGS. 51 to 53 are diagrams illustrating other examples of the predetermined operation in the information processing system 1 according to the first modification example of the embodiment.

First, a first example of control for the reference of the display location based on the operation of snapping the operation object will be described with reference to FIG. 51.

The projection control unit 103 causes the projection imaging device 10 to project the operation object on the basis of the reference of the display location. For example, the operation object 45, the reference of the display location of which is a user U15, is projected in a range that the hand of the user U15 reaches as illustrated in FIG. 51.

Next, if the operation of snapping the operation object is recognized, the projection control unit 103 changes the reference of the display location to an object that is present in the snapping direction on the basis of the amount of the operation. If the operation object 45 is displaced by the user U15 to an extend exceeding a predetermined range with reference to the projection location before the operation as illustrated in FIG. 51, for example, the projection control unit 103 estimates the direction in which the operation object 45 has been snapped. Then, the projection control unit 103 changes the reference of the display location to a user U16 who is present in the estimated direction. Note that in a case in which the operation object 45 is displaced within the predetermined range, the reference of the display location is not changed.

Then, the projection control unit 103 causes the projection imaging device 10 to project the operation object on the basis of the reference of the display location after the changing. For example, the operation object 45 is projected such that the operation object is displaced in the snapping direction until the operation object 45 reaches the range that the hand of the user U16 who is the reference of the display location after the changing reaches. Note that the operation object 45 may be temporarily deleted and then be projected near the user U16 instead of being projected such that the operation object 45 is displaced.

Next, a second example of control for the reference of the display location based on the operation of snapping the operation object will be described with reference to FIG. 52.

The projection control unit 103 causes the projection imaging device 10 to project the operation object on the basis of the reference of the display location. For example, the operation object 45, the reference of the display location of which is a user U17, is projected in a range that the hand of the user U17 reaches as illustrated in the upper diagram and the lower diagram of FIG. 52.

Next, if the operation of snapping the operation object is recognized, the projection control unit 103 changes the reference of the display location to an object that is present in the snapping direction on the basis of a form of an operation body that performs the operation. If an operation of snapping the operation object 45 with one finger as illustrated in the upper diagram in FIG. 52, which is performed by a user U17, is recognized, for example, the projection location of the operation object is displaced in accordance with the operation. In this case, the reference of the display location is not changed. Meanwhile, if an operation of snapping the operation object 45 with five fingers as illustrated in the lower diagram in FIG. 52, which is performed by the user U17, is recognized, the projection control unit 103 estimates the direction in which the operation object 45 has been snapped with the operation. Then, the projection control unit 103 changes the reference of the display location to a user U18 who is present in the estimated direction.

Then, the projection control unit 103 causes the projection imaging device 10 to project the operation object on the basis of the reference of the display location after the changing. Since details are substantially the same as those in the example in FIG. 51, description thereof will be omitted.

Next, a third example of control for the reference of the display location based on the operation of snapping the operation object will be described with reference to FIG. 53.

The projection control unit 103 causes the projection imaging device 10 to project the operation object on the basis of the reference of the display location. For example, the operation object 45, the reference of the display location of which is a user U19, is projected in a range that the hand of the user U19 reaches as illustrated in the upper diagram and the lower diagram of FIG. 53.

Next, if the operation of snapping the operation object is recognized, the projection control unit 103 changes the reference of the display location to an object that is present in the snapping direction on the basis of a part of the operation object that has been touched during the operation. If an operation of snapping the operation object 45 by a user U19 in a state in which an information display part of the operation object 45 is touched as illustrated in the upper diagram in FIG. 53 is recognized, for example, the projection location of the operation object 45 is displaced in accordance with the operation. In this case, the reference of the display location is not changed. Meanwhile, if an operation of snapping the operation object 45 by the user U19 in a state in which an upper end part of the operation object 45 is touched as illustrated in the lower diagram in FIG. 53 is recognized, the projection control unit 103 estimates the direction in which the operation object 45 has been snapped with the operation. Then, the projection control unit 103 changes the reference of the display location to a user U20 who is present in the estimated direction.

Then, the projection control unit 103 causes the projection imaging device 10 to project the operation object on the basis of the reference of the display location after the changing. Since details are substantially the same as those in the example in FIG. 51, description thereof will be omitted.

According to the first modification example of the embodiment, the predetermined operation includes contact between the targets of the references of the display locations as described above. Therefore, it is possible to prompt the user to visually recognize as if the operation object has been displaced between the objects. Accordingly, the user can intuitively pass and receive the operation object.

In addition, the predetermined operation includes the operation of rotating the operation object. Therefore, the user can change an operator of the operation object by changing the orientation of the operation object. Accordingly, the user can simply change the operator of the operation object.

In addition, the predetermined operation includes the operation of snapping the operation object to the destination after changing of the reference of the display location. Therefore, the user can change the operator of the operation object to a desired user even in a case in which the displacement destination of the operation object is not present at a close location. Accordingly, it is possible to reduce the burden on the user for the predetermined operation.

Second Modification Example

In a second modification example of the embodiment, the reference of the display location may be a position in a real space. Specifically, the projection control unit 103 causes the projection imaging device 10 to project the operation object on the basis of the position in the real space, which is the reference of the display location. Further, the projection control unit 103 controls the type of the reference of the display location in accordance with a form of the operation subject when the predetermined operation is performed. The modification example will be described in detail with reference to FIG. 54. FIG. 54 is a diagram illustrating an example of a change in the reference of the display location in the information processing system 1 according to the second modification example of the embodiment.

If the predetermined operation is recognized, the recognition unit 101 recognizes the form of the operation subject who is performing the predetermined operation. If an operation of opening the left hand toward the table as illustrated in the upper diagram in FIG. 54 (the aforementioned second operation) is recognized, for example, the recognition unit 101 recognizes that the user who is performing the operation is gripping his/her left wrist with his/her right hand.

The projection control unit 103 selects the type of the reference of the display location in accordance with the form of the operation subject who is performing the predetermined operation. Specifically, the projection control unit 103 selects the type of the reference of the display location from an object, a person, a position, and the like in accordance with the form of the user who is performing the predetermined operation, which has been recognized by the recognition unit 101. If the user who is performing the predetermined operation is recognized as gripping his/her wrist of the hand with which the operation is being performed with his/her other hand, for example, the projection control unit 103 selects the position in the real space as the target of the reference of the display location.

Then, the projection control unit 103 causes the projection imaging device 10 to project the operation object on the basis of the reference of the display location after the changing. For example, the operation object 45 is projected on a table that is arranged at the position that is the reference of the display location after the changing. Note that since the reference of the display location is the position at which the table is arranged rather than the table, the display location of the operation object 45 is not displaced even if the table is displaced as illustrated in the lower diagram in FIG. 54, for example, and the operation object 45 is projected on the floor.

According to the second modification example of the embodiment, the reference of the display location includes the position in the real space, and the display location of the operation object is displayed on the basis of the position in the real space as described above. Therefore, even if an object is arranged at the location at which the operation object is projected, it is possible to continue the projection of the operation object at the same position irrespective of the displacement of the object. Accordingly, it is possible to suppress displacement of the operation object despite user's intention.

In addition, the information processing apparatus 100-3 controls the type of the reference of the display location in accordance with the form of the operation subject when the predetermined operation is performed. Therefore, the user can designate the type of the destination after changing of the reference of the display location, that is, a destination to which the operation object is to be associated. Accordingly, the user can handle the operation object as the user intends, and it is possible to improve usability.

Third Modification Example

In a third modification example of the embodiment, a form of an operation object may be controlled on the basis of information related to an objective entity of an operation of the operation object when the reference of the display location is controlled. Specifically, the form of the operation object may be controlled on the basis of information related to a state of the operation object (hereinafter, also referred to as state information). In a case in which display content of the operation object differs from display content in an initial state when the reference of the display location of the operation object is changed, for example, the projection control unit 103 decides to return the display content of the operation object to the display content in the initial state.

In addition, the form of the operation object may be controlled on the basis of information related to a target to be operated via the operation object (hereinafter, also referred to as operation target information). For example, the projection control unit 103 decides display content of the operation object in accordance with the type of content that the device to be operated, which is operated by the operation object, reproduces when the reference of the display location of the operation object is changed.

Figure 55:
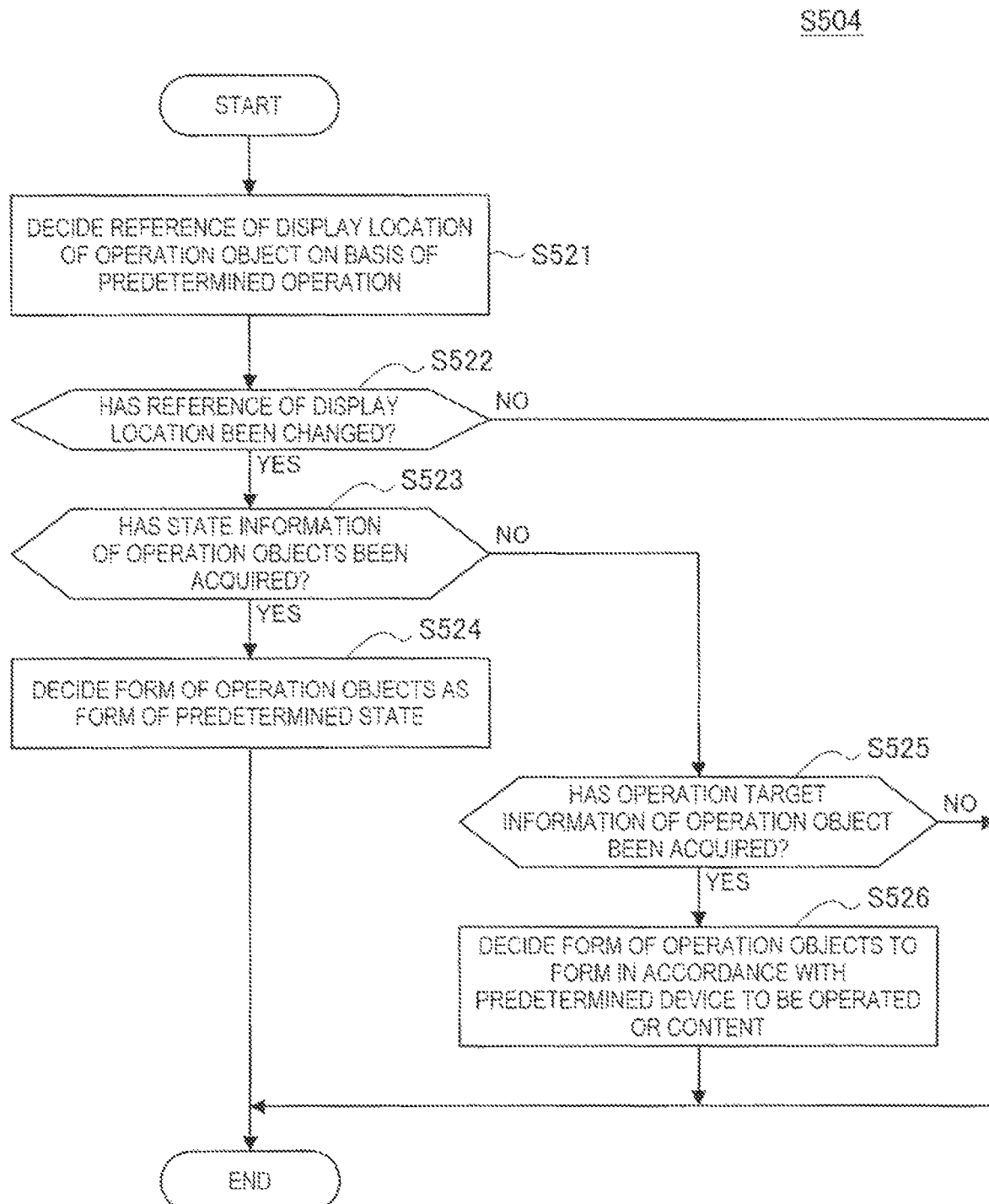
FIG. 55 is a flowchart conceptually illustrating an example of processing of controlling a reference of a display location in an information processing system according to a third modification example of the embodiment.

Further, processing in the modification example will be described in detail with reference to FIG. 55. FIG. 55 is a flowchart conceptually illustrating an example of processing of controlling the reference of the display location in the information processing system 1 according to the third modification example of the embodiment. Note that description of processing that is substantially the same as the aforementioned processing will be omitted.

The information processing system 1 decides a reference of a display location of the operation object on the basis of a predetermined operation (Step S521) and determines whether or not the reference of the display location has been changed (Step S522).

If it is determined that the reference of the display location has been changed, the information processing system 1 determines whether or not state information of the operation object has been acquired (Step S523) and decides a form of the operation object on the basis of the state information (Step S524). Specifically, if information with which complication of the operation object is specified is acquired, the projection control unit 103 determines whether or not complication of display content or operation functions of the operation object differs from complication in the initial state on the basis of the information. If it is determined that the complication differs from that in the initial state, the projection control unit 103 decides to return the complication of the operation object to complication in the initial state.

In addition, the information processing system 1 determines whether or not operation target information of the operation object has been acquired (Step S525) and decides a form of the operation object on the basis of the operation target information (Step S526). Specifically, if information from which the device to be operated or content handled by the device to be operated, which is operated by the operation object, is specified is acquired, the projection control unit 103 determines the type of the device to be operated or of the content specified from the information. Then, the projection control unit 103 decides the form of the operation object in accordance with the type of the device to be operated or of the content.

According to the third modification example of the embodiment, the form of the operation object is controlled on the basis of the information related to the objective entity of the operation in relation to the operation object as described above. In a case in which the change of the reference of the display location corresponds to a change in operators, for example, and the operation object is displaced directly to the operator after the changing, there may be a case in which operation content of the operator before the changing is known by the operator after the changing. In a case in which content for adults is operated by the operation object, in particular, it is not favorable to displace the operation object to a child in the same form. Meanwhile, according to the modification example, it is possible to cause the form of the operation object to change in accordance with the form of the operation object or content or the like that is operated by the operation object when the operation object is displaced. In this manner, it is possible to suppress the operation content from being known by the operator as the displacement destination.

Fourth Modification Example

Figure 56:
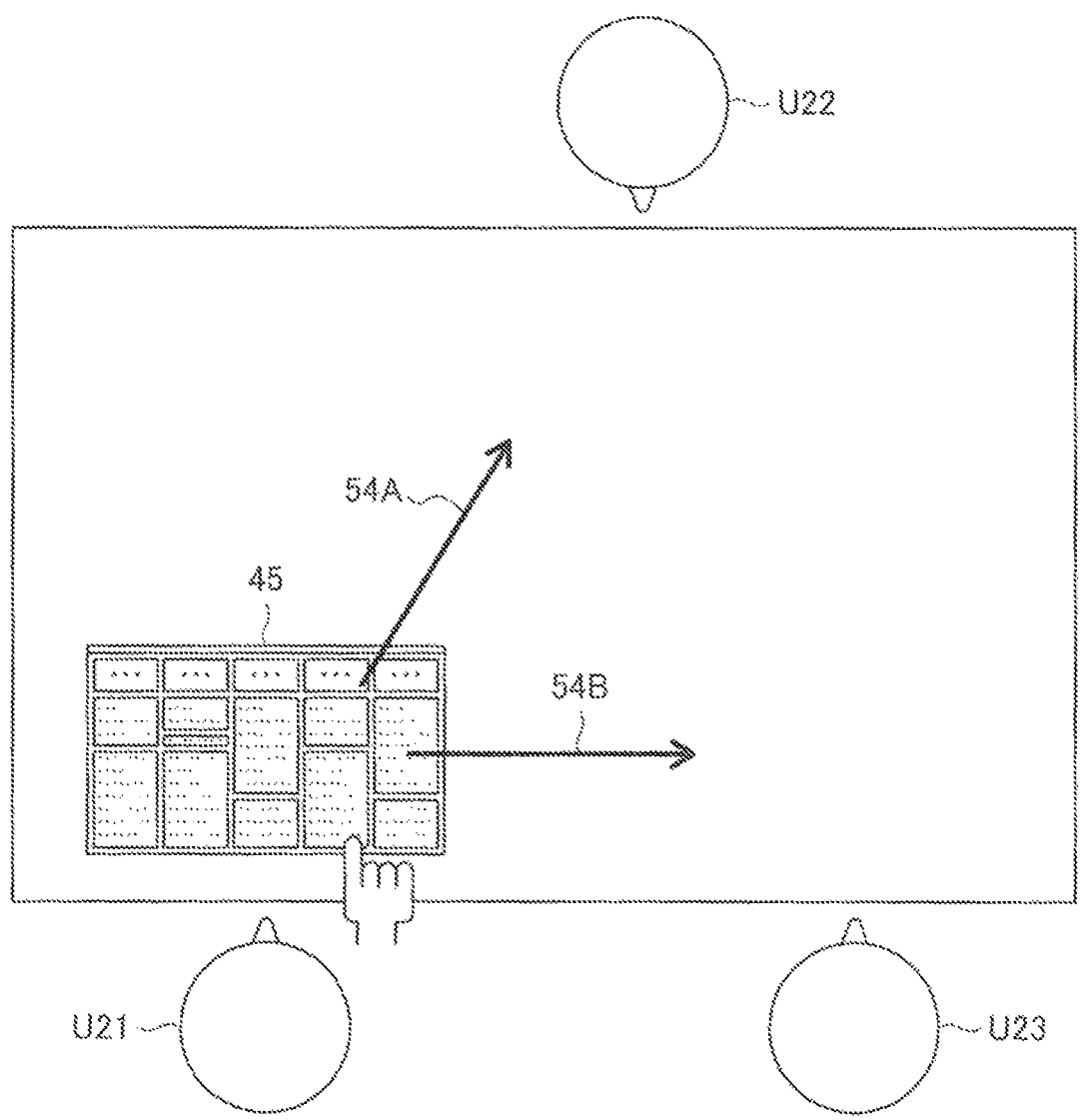
FIG. 56 is a diagram illustrating an example in which a destination after changing of a reference of a display location of an operation object is explicitly indicated in an information processing system according to a fourth modification example of the embodiment.

In a fourth modification example of the embodiment, a destination after changing of a reference of a display location may be explicitly presented for the user. Specifically, the projection control unit 103 controls display of a display object, from which a destination after changing of the reference of the display location is specified. For example, the projection control unit 103 estimates an object as a candidate of the destination after changing of the reference of the display location and causes the projection imaging device 10 to project the display object from which the estimated object is grasped by the user. Further, the modification example will be described in detail with reference to FIG. 56. FIG. 56 is a diagram illustrating an example in which the destination after changing of the reference of the display location of the operation object is explicitly represented in the information processing system 1 according to the fourth modification example of the embodiment.

The projection control unit 103 causes the projection imaging device 10 to project the operation object on the basis of the reference of the display location. For example, the operation object 45, the reference of the display location of which is a user U21, is projected in a range that the hand of the user U21 reaches as illustrated in FIG. 56.

Next, if a start of an operation of changing the reference of the display location of the operation object is recognized, the projection control unit 103 estimates an object as a candidate of the destination after changing of the reference of the display location. If an operation of touching the operation object 45 with a finger is recognized, for example, the projection control unit 103 searches for an object that can be a reference of a display location that is present in the surroundings of the operation object. As a result, users U22 and U23 are discovered, and the users U22 and U23 are estimated to be candidates for the destination after changing of the reference of the display location.

Next, the projection control unit 103 causes the projection imaging device 10 to project the display object in which the estimated candidates for the destination after changing are explicitly represented. For example, display objects MA and MB as arrows directed to the users U22 and U23 estimated as candidates for the destination after changing of the reference of the display location from the operation object 45 are respectively projected as illustrated in FIG. 56.

Then, the projection control unit 103 changes the reference of the display location in accordance with an operation of changing the reference of the display location of the operation object. As a result, the operation object is visually recognized by the user as if the operation object was displaced.

According to the fourth modification example of the embodiment, the information processing apparatus 100-3 controls display of the display object from which the destination after changing of the reference of the display location is specified as described above. Therefore, the user can previously grasp an object to which the operation object can be displaced. Accordingly, it is possible to suppress a concern that displacement of the operation object to the intended object is failed. In addition, it is possible to reduce a concern that the user fails the operation by the display object for guiding the operation direction, such as an arrow, being displayed.

Fifth Modification Example

In a fifth modification example of the embodiment, a plurality of operation objects may be merged. Specifically, in a case in which another operation object is present in relation to a destination after changing of a reference of a display location, the projection control unit 103 merges the operation object, the reference of the display location of which is changed, with this another operation object as the destination after changing of the reference of the display location. For example, an operation object, the reference of the display location of which is changed (hereinafter, also referred to as an operation object as a change source) and an operation object as the destination after changing of the display location (hereinafter, also referred to as an operation object as the destination after changing) may be integrated. Further, the modification example will be described in detail with reference to FIG. 57. FIG. 57 is a diagram illustrating an example of merging of operation objects in the information processing system 1 according to the fifth modification example of the embodiment.

The projection control unit 103 causes the projection imaging device 10 to project the operation objects on the basis of the reference of the display location. For example, the operation object 45, the reference of the display location of which is a user U24, is projected within a range that the hand of the user U24 reaches as illustrated in the upper diagram in FIG. 57. In addition, an operation object 49, the reference of the display location is a user U24, is projected in a range that the hand of the user U25 reaches as illustrated in the upper diagram in FIG. 57.

Next, if an operation of changing the reference of the display location of the operation objects is recognized, the projection control unit 103 changes the reference of the display location to an object at the destination after changing of the changing operation. Then, the operation objects are projected such that the operation objects are displaced to the object at the destination after changing. If an operation of displacing the operation object 45 toward the user U25, which is performed by the user U24, as illustrated in the upper diagram in FIG. 57, is recognized, for example, the projection control unit 103 changes the reference of the display location of the operation object 45 to the user U25. Then, the operation object 45 is projected such that the operation object 45 is displaced toward the user U25.

Then, if the operation object reaches the operation object in relation to the destination after changing of the reference of the display location, the projection control unit 103 integrates operation objects. Then, an operation object obtained through the integration is projected. If the operation object 45 is displaced to the operation object 49 for the user U25, for example, the projection control unit 103 causes a part of the operation object 45 and a part of the operation object 49 to be integrated with each other. Then, an operation object 55 obtained through the integration is projected for the user U25 as illustrated in the lower diagram in FIG. 57.

Note that the merging of the operation objects may be fusion of an operation object of a change source and an operation object of a destination after changing. For example, an operation object related to a recording reservation for a recording device, such as a hard disk recorder, may be displayed through fusion of an operation object for a display device and an operation object for a clock device.

In addition, one operation object may be divided into a plurality of operation objects. If a dividing operation performed by the user on a displayed operation object is recognized, for example, the projection control unit 103 decides a plurality of operation objects in relation to the operation object. Then, the decided plurality of operation objects are displayed instead of the original operation object.

According to the fifth modification example of the embodiment, in the case in which another operation object is present in relation to the destination after changing of the reference of the display location, the information processing apparatus 100-3 merges the operation object, the reference of the display location of which is changed, and this another operation object as the destination after changing of the reference of the display location as described above. Therefore, the user can intuitively organize the operation objects. In addition, the user can intuitively change the displayed operation object to the desired operation object by the operation object through which it is possible to perform an operation in relation to the operation object merged through the merging of the operation objects being displayed. Accordingly, it is possible to improve usability.

Sixth Modification Example

In a sixth modification example of the embodiment, the information processing apparatus 100-2 may further control attributes of an operation object on the basis of a predetermined operation. Specifically, if a predetermined operation is recognized by the recognition unit 101, the projection control unit 103 controls attributes of the operation object, to which the predetermined operation has been performed, in accordance with a target of the predetermined operation. Attributes of the operation object includes an operation subject who operates the operation object, for example. Further, the modification example will be described in detail with reference to FIGS. 49 and 58. FIG. 58 is a diagram illustrating an example of display control for an operation object in the information processing system 1 according to the sixth modification example of the embodiment.

If a predetermined operation performed to a person is recognized, the projection control unit 103 changes a reference of a display location and also changes attributes of the operation object. As described above with reference to FIG. 49, for example, if shaking hands of the user is recognized, the reference of the display location is changed to a user who is a counterpart of the hand shaking. At that time, an owner of the operation object, which is one of the attributes of the operation object, is also changed to a user who is the counterpart of the hand shaking.

Next, if a predetermined operation performed to an object except for a person is recognized, the projection control unit 103 changes only the reference of the display location. If a predetermined operation performed by the user who is the aforementioned counterpart of the hand shaking to a table is recognized as illustrated in the upper diagram in FIG. 58, for example, the projection control unit 103 changes the reference of the display location to the table. Then, the operation object 45 is projected on the table. In this case, the owner of the operation object is not changed. Note that other attributes of the operation object may be changed.

Next, the projection control unit 103 controls a form of the operation object on the basis of the attributes of the operation object. Specifically, the projection control unit 103 displaces the operation object on the basis of the reference of the display location in response to the displacement of the operation subject who operates the operation object. As illustrated in the lower diagram in FIG. 58, for example, the operation object 45 projected on the table is projected such that the operation object 45 is displaced on the table in accordance with the displacement of the user who is the owner of the operation object 45. Since the reference of the display location is the table, the operation object 45 is not projected outside the table even if the user moves away from the table, in this example. Note that in the case in which the reference of the display location is the user, the operation object is displaced to the outside of the table in accordance with the displacement of the user.

Note that although the example in which the display location of the operation object is controlled on the basis of the attributes of the operation object has been described above, complication of the operation object may be controlled. For example, an operation object with display content or operation functions in accordance with an owner of the operation object may be projected.

According to the sixth modification example of the embodiment, the information processing apparatus 100-3 further controls the attributes of the operation object on the basis of the predetermined operation as described above. Therefore, it is possible to more finely control the projection of the operation object by not only the reference of the display location but also the attributes of the operation object being controlled on the basis of the predetermined operation. Accordingly, it is possible to address a variety of user needs.

In addition, the aforementioned attributes of the operation object include the operation subject who operates the operation object. Therefore, it is possible to more finely control the projection of the operation object in accordance with the user of the operation object. Accordingly, it is possible to project the operation object in accordance with the individual users.

In addition, the information processing apparatus 100-3 controls the form of the operation object on the basis of the aforementioned attributes of the operation object. Therefore, it is possible to properly adjust visibility or operability of the operation object by the operation object being displayed in the form in accordance with the attributes of the operation object. In a case in which an attribute of the operation object is users, in particular, it is possible to further enhance usability since the operation object in the form suitable for the individual users is projected.

Seventh Modification Example

Figure 59:
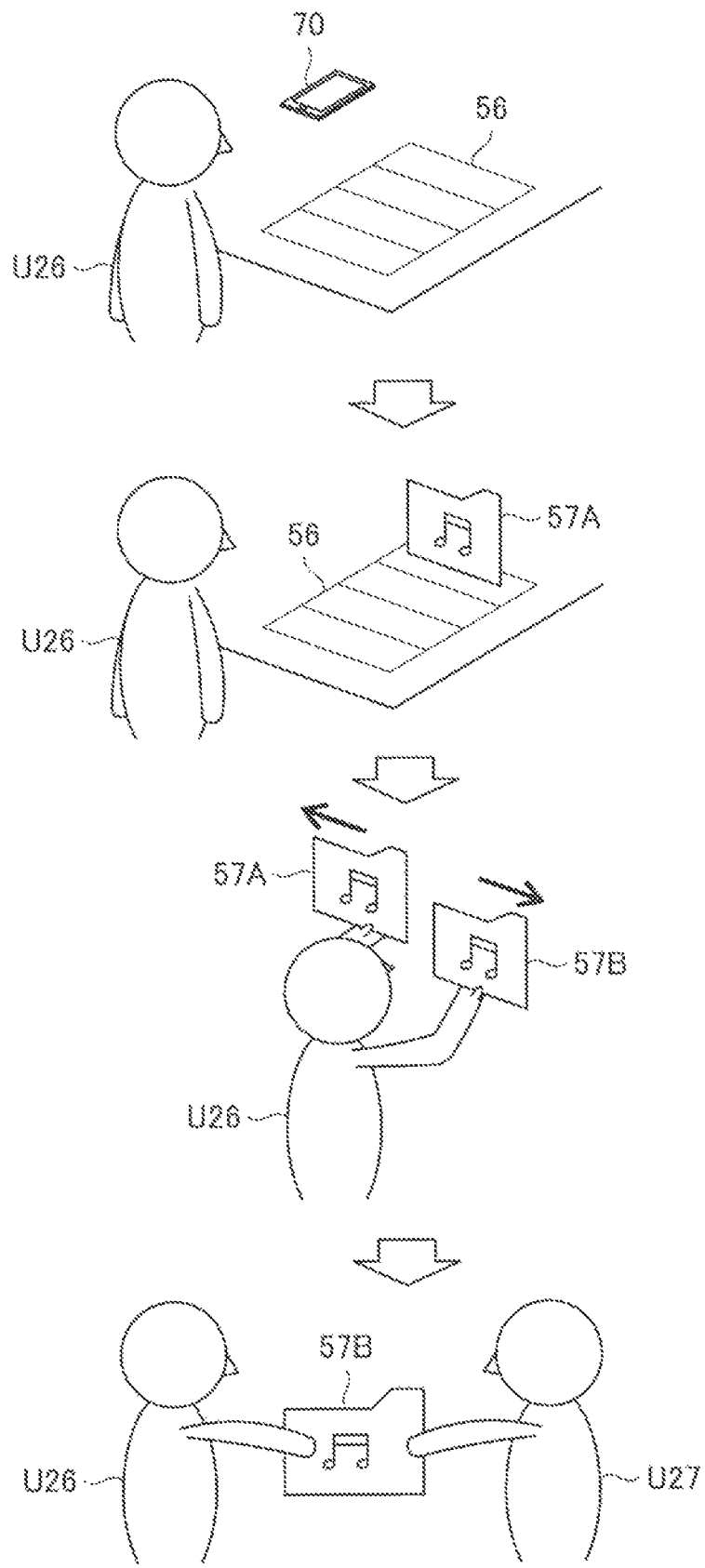
FIG. 59 is a diagram illustrating an example of display control for operation objects in an information processing system according to a seventh modification example of the embodiment.

In a seventh modification example of the embodiment, an operation object may be reproduced. Specifically, the projection control unit 103 reproduces the operation object on the basis of a predetermined operation. If the predetermined operation is recognized, for example, the projection control unit 103 causes the projection imaging device 10 to project a new operation object obtained through reproduction of an operation object related to the predetermined operation. The modification example will be described in detail with reference to FIG. 59. FIG. 59 is a diagram illustrating an example of display control for an operation object in the information processing system 1 according to the seventh modification example of the embodiment.

The projection control unit 103 causes the projection imaging device 10 to project an operation object for a device to be operated on the basis of a reference of a display location. For example, an operation object 56 for a smartphone 70 as illustrated in the left diagram in FIG. 59, for example, is projected on a table that a hand of a user U26 reaches. The operation object 56 may be a music file list, for example. Further, another operation object 57A as illustrated in the left diagram in FIG. 59 is newly projected by a selecting operation performed by the user U26 to the operation object 56. The operation object 57A may be a music file, for example.

Next, if a reproduction operation performed to the projected operation object is recognized, the projection control unit 103 causes the projection imaging device 10 to project the new operation object on the basis of the projected operation object. If an operation of dividing the operation object 57A into two as illustrated in the right diagram in FIG. 59 is recognized, for example, the projection control unit 103 causes the projection imaging device 10 to project an operation object 57B that is substantially the same as the operation object 57A.

Further, the reference of the display location of the new operation object obtained through the reproduction may be controlled on the basis of a predetermined operation. If an operation of passing the operation object 57B obtained through the reproduction by the user U26 to another user U27 is recognized as illustrated in the right diagram in FIG. 59, for example, the projection control unit 103 changes the reference of the display location of the operation object 57B to the user U27.

Note that the operation object may be displaced via communication. In a case in which the reference of the display location of the operation object has been changed to an object that is present in another building, for example, the projection control unit 103 may cause a projection device in this another building to project information related to the operation object via the communication. Further, the destination after changing of the reference of the display location may be a virtual object. For example, the user U27 as illustrated in the right diagram in FIG. 59 may be present in a building that is different from a building in which the user U26 is present, and a movie corresponding to the user U27 may be projected. Then, if an operation of passing the operation object 57B from the user U26 to the user U27 who is projected as the movie is recognized, the operation object 57B is projected for the user U27 as an actual object via the communication.

Figure 60:
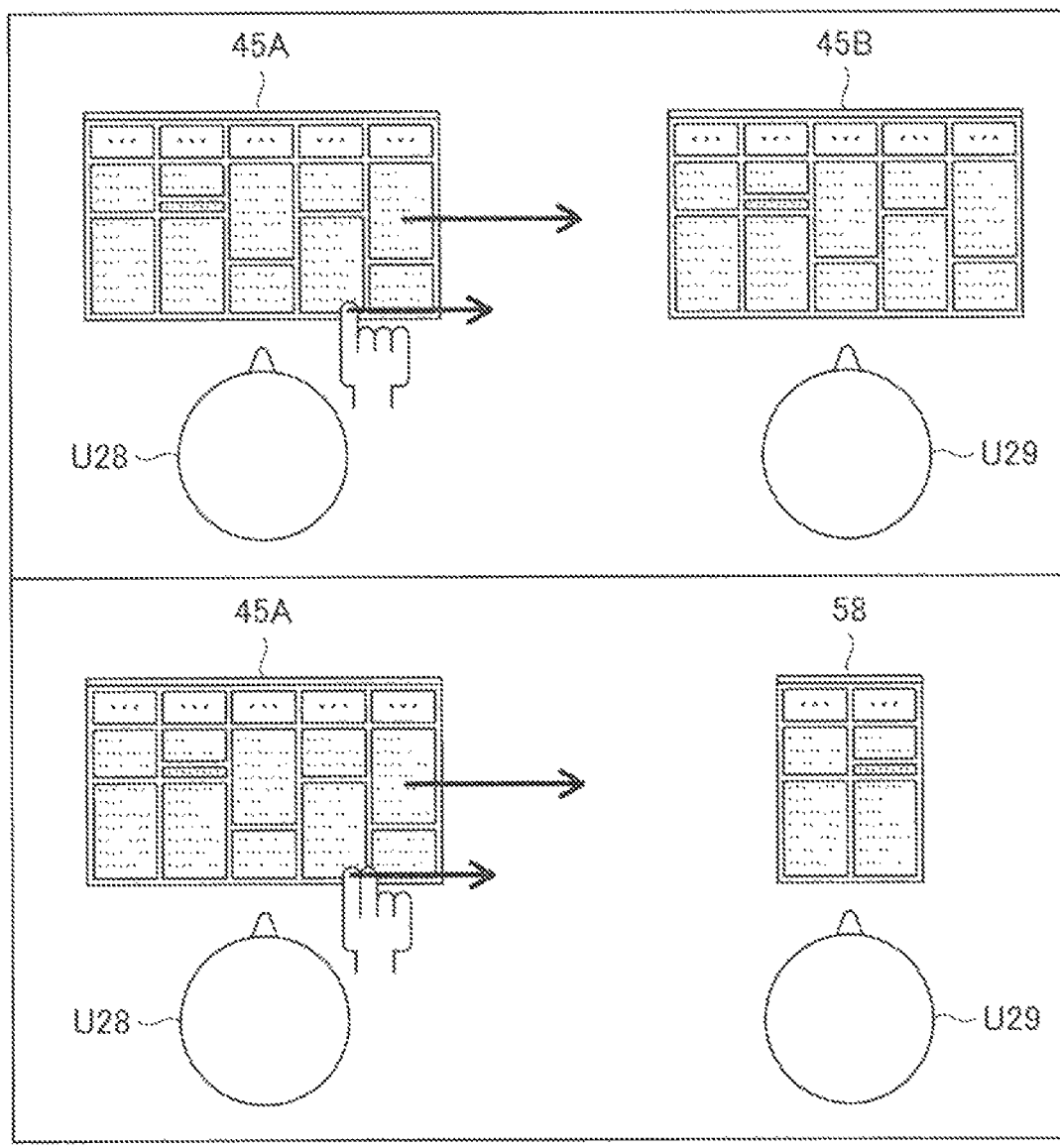
FIG. 60 is a diagram illustrating an example of display control for operation objects related to reproduction in an information processing system according to a seventh modification example of the embodiment.

The example in which the operation object is reproduced has been described above. Synchronization of the operation object related to the reproduction may further be controlled. Specifically, the projection control unit 103 controls synchronization between the reproduced operation object and the operation object as a reproduction source on the basis of the form of the operation subject of the predetermined operation. The control of the synchronization of the operation object related to the reproduction will be described in detail with reference to FIG. 60. FIG. 60 is a diagram illustrating an example of display control for an operation object related to reproduction in the information processing system 1 according to the seventh modification example of the embodiment.

The projection control unit 103 causes the projection imaging device 10 to project the operation object on the basis of the reference of the display location. As illustrated in the upper diagram and the lower diagram in FIG. 60, for example, an operation object 45A is projected within a range that the hand of the user U28 can reach.

Next, if a reproduction operation for the projected operation object is recognized, the recognition unit 101 recognizes the form of the reproduction operation. If an operation of snapping the operation object 45A performed by a user U28 is recognized as illustrated in the upper diagram and the lower diagram in FIG. 60, for example, the number of fingers of the user U28 with which the operation has been performed is recognized. One finger is recognized in the upper diagram in FIG. 60, and two fingers are recognized in the lower diagram in FIG. 60.

The projection control unit 103 decides whether or not the reproduced operation object has been synchronized with the operation object as a reproduction source on the basis of the form of the reproduction operation. For example, the projection control unit 103 decides whether or not the synchronization has been performed in accordance with the number of fingers in the recognized reproduction operation. Non-synchronization of the operation object related to the reproduction is decided in the upper diagram in FIG. 60 in which one finger is recognized while synchronization of the operation object related to the reproduction is decided in the lower diagram in FIG. 60 in which two fingers are recognized. Content of the synchronization includes synchronization of complication, such as display content or operation functions, for example, of the operation object.

Then, the projection control unit 103 causes the projection imaging device 10 to project the reproduced operation object, and the control related to the operation object is performed in accordance with whether or not the synchronization has been performed. As illustrated in the upper diagram in FIG. 60, for example, an operation object 45B that is substantially the same as the operation object 45A is projected on a user U29 as the reference of the display location. Since the operation objects 45A and 45B are not synchronized with each other, the operation objects 45A and 45B are independently operated. Meanwhile, an operation object 58 that is substantially the same as a part of the operation object 45A is projected on the user U29 as the reference of the display location as illustrated in the lower diagram in FIG. 60. Since the operation objects 45A and 58 are synchronized with each other, the display of the operation object 58 also changes if the display of the operation object 45A changes, for example. Note that the reproduction of the operation object may be reproduction of only a part of the operation object as the reproduction source as illustrated in the lower diagram in FIG. 60.

Note that although the example in which whether or not the operation object related to the reproduction has been synchronized is controlled has been described above, synchronization of other modes may be controlled. For example, a synchronized part of the operation object related to the reproduction may be controlled. In detail, a part of the operation object to be synchronized, whether the part is a part or entirety of the operation object, or the like may be controlled. In addition, a time during which synchronization or non-synchronization is active may be set, for example.

In addition, a management user for the operation object related to the reproduction may be set. For example, a display object indicating the management user may be displayed along with the operation object for the management user.

According to the seventh modification example of the embodiment, the operation object is reproduced on the basis of the aforementioned predetermined operation as described above. Therefore, a plurality of persons can control the same device to be operated. Therefore, it is not necessary to displace the operation object to a user who desires to operate the operation object, and it is possible to improve usability.

In addition, synchronization between the reproduced operation object and the operation object as the reproduction source is controlled on the basis of the form of the operation subject of the aforementioned predetermined operation. Therefore, the user can select the synchronization of the operation object in accordance with situations. For example, it is desirable to share information such as which program is being selected by all users in a case of an operation object such as a television program table, and it is thus considered that the operation object is to be synchronized. Meanwhile, since it is considered that the individual users perform different operations to an operation object such as a controller for a video game, it is considered that the operation object cannot be synchronized. In this manner, it is possible to improve usability by enabling selection of the synchronization in accordance with situations.

6. Hardware Configuration According to one Embodiment of the Present Disclosure The information processing apparatus 100 according to each embodiment of the present disclosure has been described above. The aforementioned processing of the information processing apparatus 100 is realized by cooperation of software and hardware of the information processing apparatus 100, which will be described below.

Figure 61:
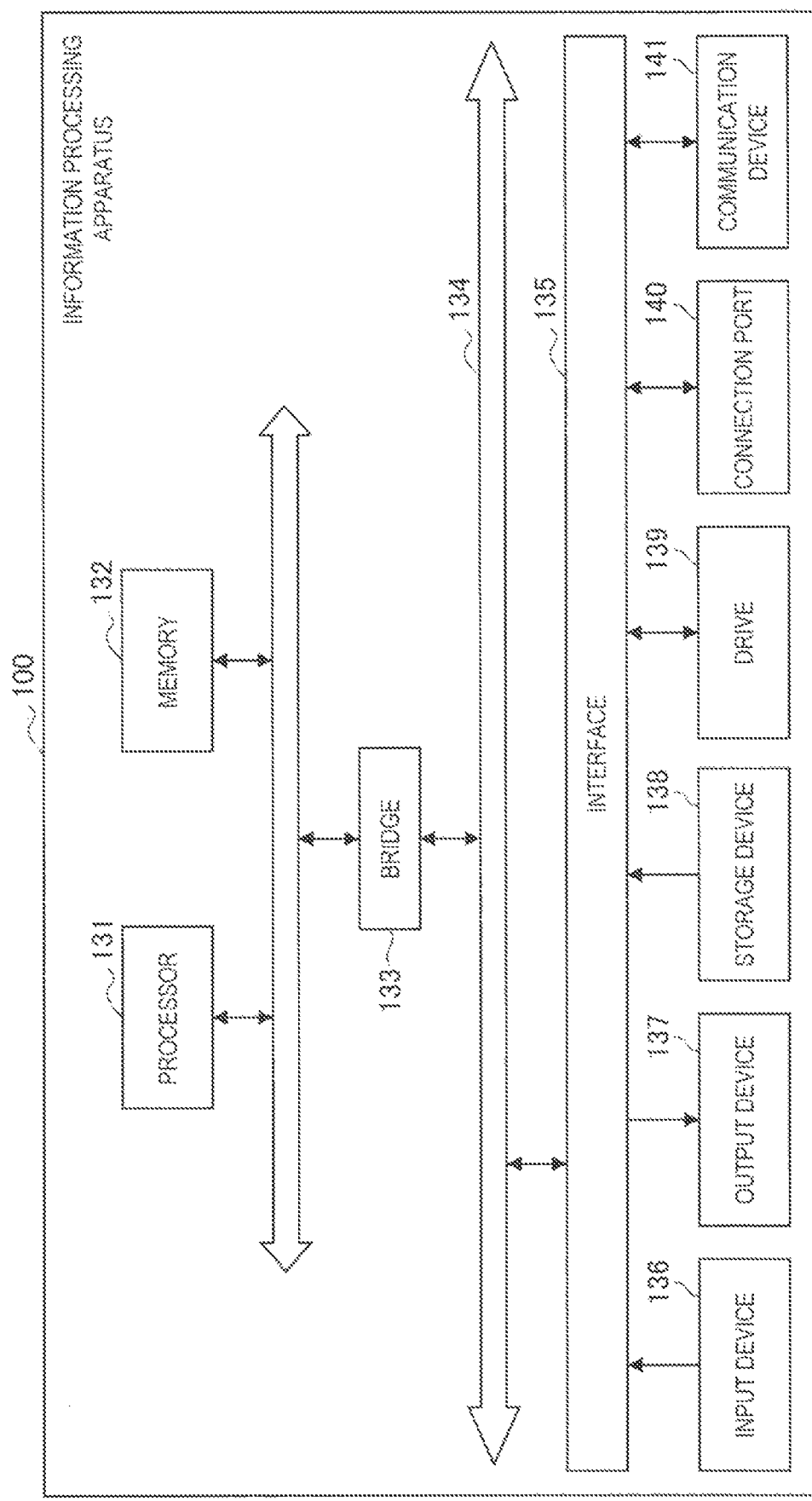
FIG. 61 is an explanatory diagram illustrating a hardware configuration of an information processing apparatus according to one embodiment of the present disclosure.

FIG. 61 is an explanatory diagram illustrating a hardware configuration of the information processing apparatus 100 according to an embodiment of the present disclosure. As illustrated in FIG. 61, the information processing apparatus 100 includes a processor 131, a memory 132, a bridge 133, a bus 134, an interface 135, an input device 136, an output device 137, a storage device 138, a drive 139, a connection port 140, and a communication device 141.

(Processor)

The processor 131 functions as an arithmetic processing device and realizes the functions of the recognition unit 101, the device selection unit 102, the projection control unit 103, and the device control unit 104 in the information processing apparatus 100 in cooperation with various programs. The processor 131 causes a variety of logical functions of the information processing apparatus 100 to operate by executing the programs stored in the memory 132 or another storage medium by using a control circuit. For example, the processor 131 can be a central processing unit (CPU), a graphics processing unit (GPU), a digital signal processor (DSP), or a system-on-a-chip (SoC).

(Memory)

The memory 132 stores programs, arithmetic parameters, or the like that are used by the processor 131. For example, the memory 132 includes a random access memory (RAM) and temporarily stores programs that are used by being executed by the processor 131 or parameters and the like that are appropriately changed in the execution. In addition, the memory 132 includes a read only memory (ROM), and the RAM and the ROM realize the functions of the storage unit. Note that an external storage device may be utilizes as a part of the memory 132 via the connection port 140, the communication device 141, or the like.

Note that the processor 131 and the memory 132 are connected to each other by an internal bus that includes a CPU bus or the like.

(Bridge and Bus)

The bridge 133 establishes connection between the buses. Specifically, the bridge 133 connects the internal bus to which the processor 131 and the memory 132 are connected and the bus 134 to which the interface 135 is connected.

(Input Device)

The input device 136 is used by the user to operate the information processing apparatus 100 or to input information to the information processing apparatus 100. For example, the input device 136 includes an input means for the user inputting information, an input control circuit that generates an input signal on the basis of the input by the user and outputs the input signal to the processor 131, and the like. Note that the input means may be a mouse, a keyboard, a touch panel, a switch, a lever, a microphone, or the like. The user of the information processing apparatus 100 can input various kinds of data or provide instructions for processing operations to the information processing apparatus 100 by operating the input device 136.

(Output Device)

The output device 137 is used to notify the user of information and realizes the functions of the input and output unit. The output device 137 may be a display device or a sound output device. For example, the output device 137 may be an apparatus such as a liquid crystal display (LCD) device, an organic light emitting diode (OLED) device, a projector, a speaker, or a headphone or a module that provides outputs to such an apparatus.

Note that the input device 136 or the output device 137 may include an input and output device. For example, the input and output device may be a touch screen.

(Storage Device)

The storage device 138 is a device for storing data. The storage device 138 may include a storage medium, a recording device that records data in a recording medium, a reading device that reads data from a recording medium, a deleting device that deletes data recorded in a recording medium, and the like. The storage device 138 stores programs that the CPU 131 executes and various kinds of data.

(Drive)

The drive 139 is a reader/writer for a recording medium and is incorporated in or externally attached to the information processing apparatus 100. The drive 139 reads information stored in a mounted removable storage medium such as a magnetic disk, an optical disc, a magneto-optical disc, or a semiconductor memory and outputs the information to the memory 132. In addition, the drive 139 can also write information in the removable recording medium.

(Connection Port)

The connection port 140 is a port for connecting equipment directly to the information processing apparatus 100. For example, the connection port 140 can be a universal serial bus (USB) port, an IEEE1394 port, a small computer system interface (SCSI) port, or the like. Alternatively, the connection port 140 may be an RS-232C port, an optical audio terminal, a High-Definition Multimedia Interface (HDMI) (registered trademark) port, or the like. Data may be exchanged between the information processing apparatus 100 and the external equipment by connecting the external equipment to the connection port 140.

(Communication Device)

The communication device 141 intermediates communication between the information processing apparatus 100 and an external device and realizes the functions of the communication unit 105. Specifically, the communication device 141 executes communication in accordance with a wireless communication scheme or a wired communication scheme. For example, the communication device 141 executes wireless communication in accordance with a cellular communication scheme such as Wideband Code Division Multiple Access (WCDMA) (registered trademark), WiMAX (registered trademark), long term evaluation (LTE), or LTE-A. Note that the communication device 141 may execute wireless communication in accordance with an arbitrary wireless communication scheme such as a near-field wireless communication scheme such as Bluetooth (registered trademark), near field communication (NFC), a wireless USB, or a TransferJet (registered trademark) or a wireless local area network (LAN) such as Wi-Fi (registered trademark). In addition, the communication device 141 may execute wired communication such as signal line communication or wired LAN communication.

Note that the information processing apparatus 100 may not have a part of the configuration described above with reference to FIG. 61 or may have an arbitrary additional configuration. In addition, a one-chip information processing module on which an entirety or a part of the configuration described above with reference to FIG. 61 is integrated may be provided.

7. Conclusion

As described above, according to the first embodiment of the present disclosure, candidates for a device to be operated, which is selected through the first device selection based on a user's body form, are presented to the user, and the user can select a device to be operated from among the candidates. Therefore, it is not necessary for the user to move to the device to be operated first. In addition, it is possible to suppress improper selection of the device to be operated and to prevent reselection of the device to be operated by the user selecting an operation target from among the presented candidates for the device to be operated. Also, it is possible to operate the device to be operated without any specific device such as a remote controller and to suppress occurrence of efforts to find the remote controller or the like by the device to be operated being operated on the basis of selection from among selection objects. Therefore, it is possible to reduce a burden on the user for selecting the device to be operated that the user desires to operate.

In addition, according to the second embodiment of the present disclosure, it is possible to display the operation object with complication in accordance with user's conditions that are estimated from the user's body form. Therefore, it is possible to enhance possibilities that operation objects suitable for an operation that the user desires are respectively displayed in each user's condition. Accordingly, it is possible to suppress variations in accordance with user's conditions in relation to user's satisfaction about the operation objects.

In addition, according to the third embodiment of the present disclosure, it is possible to control the display location of the operation object not only in accordance with a user's direct operation on the operation object but also in accordance with an indirect operation, conditions of the reference of the display location irrelevant to user's actions, and the like by the reference of the display location of the operation object being controlled. Therefore, the user can arrange or displace the operation object as if the user handled a real object. Accordingly, it is possible to operate the displacement location of the operation object with a sense of moving an actual object.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the selection objects and the operation objects are projected in the aforementioned embodiments, for example, the present technology is not limited to such an example. Specifically, the selection objects and the operation objects may be visually recognized by the user by being superimposed on an external world image. For example, an image related to the selection objects are superimposed on the external world image by the user wearing a display device (for example, an HUD (Head Up Display)) that transmits light of the external world image, and displaying an image related to the selection objects on a display unit of the display device, or projecting image light related to the image from the display device to the user's eye. Note that the aforementioned display device may be an HMD (Head Mount Display) on which the external world image and the image are displayed. In this case, the user can perceive the selection objects without the selection objects being projected in a real space. Therefore, it is possible to simplify the configuration of the information processing system 1 and to reduce costs and efforts for introduction of the information processing system 1. In addition, since the selection objects are not visually recognized by others who do not wear the aforementioned display device, it is possible to prevent eyesight of other persons to be disturbed. In addition, the same is true for the operation objects.

Although the example in which devices such as a display device, an air conditioner device, a blower device, a recording device, an illumination device, or a sound output device are controlled as devices to be operated has been described in the aforementioned embodiments, other devices may be controlled. For example, the devices may be an electric carpet, a microwave, a washing machine, a refrigerator, or a bathroom facility.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed in parallel or individually as well. Further, it is needless to say that even in steps which are processed chronologically, the order can be appropriately changed depending on circumstances.

In addition, a computer program for causing a computer system to exhibit functions equivalent to those of the above-described respective functional configurations of the information processing apparatus 100 can be produced as well. In addition, a storage medium in which the computer program is stored may also be provided. Here, the computer system includes a single computer like the hardware mounted in the information processing apparatus 100 or a plurality of computers that execute a series of processes.

Additionally, the present technology may also be configured as below.

(1)

An information processing apparatus including:

a display control unit that controls display of selection objects related to devices to be operated, which have been selected through first device selection based on information from which a form of a body of an operation subject directed to the devices to be operated is estimated; and a device control unit that controls the devices to be operated, which have been selected through second device selection based on information related to a selecting operation performed by the operation subject to the selection objects.

(2)

The information processing apparatus according to (1), in which the selection objects include objects indicating the devices to be operated, which have been selected through the first device selection.

(3)

The information processing apparatus according to (1) or (2), in which the selection objects are displayed such that the selection objects are visually recognized in a form based on priority information.

(4)

The information processing apparatus according to (3), in which the priority information includes information that is decided on the basis of information, from which the form of the body is estimated, in the first device selection.

(5)

The information processing apparatus according to (3) or (4), in which the priority information includes information that is decided on the basis of biological information of the operation subject or information related to a surrounding environment of the operation subject.

(6)

The information processing apparatus according to any one of (3) to (5), in which the priority information includes information that is decided on the basis of information related to operations of the devices to be operated in the past.

(7)

The information processing apparatus according to any one of (1) to (6), in which the display control unit controls display of operation objects for the devices to be operated, which have been selected through the second device selection.

(8)

The information processing apparatus according to any one of (1) to (7), in which the selection objects are displayed on a body of the operation subject or in surroundings of the operation subject, the body or the surroundings having a region in which the selection objects are able to be displayed such that the selection objects are visually recognized by the operation subject.

(9)

The information processing apparatus according to any one of (1) to (7), in which the selection objects are displayed at a location in accordance with a decision operation of the first device selection performed by the operation subject.

(10)

The information processing apparatus according to (9), in which the location in accordance with the decision operation includes a part of the body of the operation subject or the surroundings of the operation subject designated through the decision operation.

(11)

The information processing apparatus according to (9) or (10), in which the location in accordance with the decision operation includes a display unit designated through the decision operation.

(12)

The information processing apparatus according to any one of (1) to (11), further including:

a notification control unit that controls a notification of the devices to be operated, which have been selected through the first device selection when the selection objects are displayed.

(13)

The information processing apparatus according to (12), in which the notification includes a display output that indicates a linkage between the selected devices to be operated and the selection objects.

(14)

The information processing apparatus according to (12) or (13), in which the notification includes a sound output from a region in which the selected devices to be operated are situated.

(15)

The information processing apparatus according to any one of (1) to (14), in which the form of the body includes a form of visual recognition of the operation subject, and the devices to be operated, which are determined to fall within at least a part of an eyesight of the operation subject, are selected through the first device selection.

(16)

The information processing apparatus according to any one of (1) to (15), in which the form of the body includes a posture of the operation subject, and the devices to be operated, which are determined to fall within a region that is decided from the posture of the operation subject, are selected through the first device selection.

(17)

The information processing apparatus according to any one of (1) to (16), in which the form of the body includes motion of the operation subject, and the devices to be operated, which are determined to fall within a region that is decided from the motion of the operation subject, are selected through the first device selection.

(18)

The information processing apparatus according to any one of (1) to (17), in which the form of the body includes speech generation from the operation subject, and the devices to be operated, which are determined to fall within a region that is decided from the speech generation from the operation subject, are selected through the first device selection.

(19)

An information processing method including, by using a processor:

controlling display of selection objects related to devices to be operated, which have been selected through first device selection based on information from which a form of a body of an operation subject directed to the devices to be operated is estimated; and controlling the devices to be operated, which have been selected through second device selection based on information related to a selecting operation performed by the operation subject to the selection objects.

(20)

A program that is for causing a computer system to realize:

a display control function that controls display of selection objects related to devices to be operated, which have been selected through first device selection based on information from which a form of a body of an operation subject directed to the devices to be operated is estimated; and a device control function that controls devices to be operated, which have been selected through second device selection based on information related to a selecting operation performed by the operation subject to the selection objects.

Additionally, the present technology may also be configured as below.

(21)

An information processing apparatus including:

an acquisition unit that obtains information related to a body form of an operation subject; and a display control unit that controls complication of an operation object for a device to be operated, which is visually recognized as if the operation object was present in a real space, on the basis of information related to the body form.

(22)

The information processing apparatus according to (21), in which the body form includes a posture of the operation subject, and the operation object is displayed such that the operation object is visually recognized with complication in accordance with information related to the posture of the operation subject.

(23)

The information processing apparatus according to (21) or (22), in which information related to the body form includes biological information of the operation subject, and the operation object is displayed such that the operation object is visually recognized with complication in accordance with the biological information of the operation subject.

(24)

The information processing apparatus according to any one of (21) to (23), in which the body form includes an action of the operation object, and the operation object is displayed such that the operation object is visually recognized with complication in accordance with information related to the action of the operation subject.

(25)

The information processing apparatus according to any one of (21) to (24), in which the display control unit further controls complication of the operation object on the basis of information related to a location at which the operation object is visually recognized, information from which the operation subject is specified, or information from which attributes of the operation subject are specified.

(26)

The information processing apparatus according to any one of (21) to (25), in which the operation object is displayed on a body of the operation subject or in surroundings of the operation subject such that the operation object is visually recognized.

(27)

The information processing apparatus according to any one of (21) to (26), in which the operation object is displayed at a location in accordance with a degree of information safety related to an operation of the device to be operated such that the operation object is visually recognized.

(28)

The information processing apparatus according to any one of (21) to (27), in which the operation object is displayed at a location in accordance with information from which the operation subject is specified or information from which an attribute of the operation subject is specified.

(29)

The information processing apparatus according to any one of (21) to (28), in which the operation object is displayed at a location in accordance with the body form of the operation subject.

(30)

The information processing apparatus according to (29), in which the body form of the operation subject includes a predetermined motion of the operation subject, and the operation object is displayed at a location in accordance with the predetermined motion.

(31)

The information processing apparatus according to (30), in which the operation object includes the operation object associated with a target of the predetermined motion.

(32)

The information processing apparatus according to (31), in which the operation object associated with the target of the predetermined motion includes the operation object for the device to be operated, which is the target of the predetermined motion.

(33)

The information processing apparatus according to (31) or (32), in which the operation object associated with the target of the predetermined motion includes the operation object for the device to be operated, which is present in a real space same as a space of the target of the predetermined motion.

(34)

The information processing apparatus according to (33), in which the device to be operated, which is present in the same real space as a space of the target of the predetermined motion on the displayed operation object is selected on the basis of information related to an environment in the same real space as the space of the target of the predetermined motion, information related to a form of a person who is present in the same real space as the space of the target of the predetermined motion, or time information.

(35)

The information processing apparatus according to any one of (21) to (34), in which the operation object includes a notification operation object for a notification to the operation subject, and the notification operation object is displayed in accordance with reception of the notification.

(36)

The information processing apparatus according to (35), in which the notification to the operation subject includes a notification to a plurality of the operation subjects, and the notification operation object is displayed at a location at which the notification operation object is visually recognized by each of the plurality of operation subjects.

(37)

The information processing apparatus according to (35) or (36), in which the notification to the operation subject includes a notification to a specific operation subject, and the notification operation object is displayed at a location at which the notification operation object is visually recognized only by the specific operation subject.

(38)

The information processing apparatus according to (37), in which the notification operation object is displayed in a case in which no persons other than the specific operation subject are present in a space in which the specific operation subject is present.

(39)

An information processing method including, using a processor:

obtaining information related to a body form of an operation subject; and controlling complication of an operation object for a device to be operated, which is visually recognized as if the operation object was present in a real space, on the basis of information related to the body form.

(40)

A program for causing a computer system to achieve:

an acquisition function of acquiring information related to a body form of an operation subject; and a display control function of controlling complication of an operation object for a device to be operated, which is visually recognized as if the operation object was present in a real space, on the basis of information related to the body form.

Additionally, the present technology may also be configured as below.

(41)

An information processing apparatus including:

a display control unit that controls display of an operation object for a device to be operated; and a reference control unit that controls a reference of a location at which the operation object is displayed such that the operation object is able to be visually recognized, on the basis of a predetermined operation performed to the operation object by an operation subject of the device to be operated.

(42)

The information processing apparatus according to (41), in which the reference of the location includes an object in a real space, and the location at which the operation object is displayed is changed in accordance with displacement of the object.

(43)

The information processing apparatus according to (42), in which the object includes the operation subject, and the operation object is displayed such that the operation object is able to be visually recognized at a location in accordance with an attribute or a form of the operation subject.

(44)

The information processing apparatus according to any one of (41) to (43), in which the reference of the location includes a position in a real space, and the operation object is displayed on the basis of the position in the real space.

(45)

The information processing apparatus according to any one of (41) to (44), in which the display control unit further controls a type of the reference of the location in accordance with a form of the operation subject when the predetermined operation is performed.

(46)

The information processing apparatus according to any one of (41) to (45), in which the display control unit controls a form of the operation object when the reference of the location is controlled.

(47)

The information processing apparatus according to (46), in which the form of the operation object is controlled on the basis of information related to an objective of an operation performed to the operation object.

(48)

The information processing apparatus according to (46) or (47), in which the form of the operation object is controlled on the basis of information related to the reference of the location before control or the reference of the location after control.

(49)

The information processing apparatus according to (48), in which the information related to the reference of the location before control or the reference of the location after control includes information from which an attribute or a form of the reference of the location before control or of the reference of the location after control is specified.

(50)

The information processing apparatus according to any one of (46) to (49), in which the form of the operation object includes complication of the operation object or followability in response to displacement of the reference of the location.

(51)

The information processing apparatus according to any one of (41) to (50), in which the display control unit controls display of a display object from which a destination of changing of the reference of the location is specified.

(52)

The information processing apparatus according to any one of (41) to (51), in which in a case in which another operation object is present at a destination of changing of the reference of the location, the display control unit merges the operation objects whose the reference of the location is to be changed, and the another operation object at the destination of changing of the reference of the location.

(53)

The information processing apparatus according to any one of (41) to (52), in which the reference control unit further controls an attribute of the operation object on the basis of the predetermined operation.

(54)

The information processing apparatus according to (53), in which the attribute of the operation object includes the operation subject for operating the operation object.

(55)

The information processing apparatus according to (53) or (54), in which the display control unit controls a form of the operation object on the basis of the attribute of the operation object.

(56)

The information processing apparatus according to any one of (41) to (55), in which the operation object is copied on the basis of the predetermined operation.

(57)

The information processing apparatus according to (56), in which synchronization between a copy of the operation object and the operation object that is a source of the copying is controlled on the basis of a form of the operation subject in the predetermined operation.

(58)

The information processing apparatus according to any one of (41) to (57), in which the predetermined operation includes a set of a first operation and a second operation performed to the operation object, and the reference control unit changes the reference of the operation object selected through the first operation, on the basis of a location in accordance with the second operation.

(59)

An information processing method including, using a processor:

controlling display of an operation object for a device to be operated; and controlling a reference of a location at which the operation object is displayed such that the operation object is able to be visually recognized, on the basis of a predetermined operation performed to the operation object by an operation subject of the device to be operated.

(60)

A program for causing a computer system to achieve:

a display control function of controlling display of an operation object for a device to be operated; and a reference control function of controlling a reference of a location at which the operation object is displayed such that the operation object is able to be visually recognized, on the basis of a predetermined operation performed to the operation object by an operation subject of the device to be operated.

REFERENCE SIGNS LIST 10 projection imaging device
20 display device
21 air conditioner device
22 blower device
100 information processing apparatus
101 recognition unit
102 device selection unit
103 projection control unit
104 device control unit
105 communication unit
106 storage unit

The invention claimed is:

1. An information processing apparatus, comprising:
a processor configured to:
estimate a form of a body of an operation subject based on observation information, wherein the form of the body of the operation subject is directed to a plurality of operation target devices;
select the plurality of operation target devices by a first device selection based on the estimation;
control display of a plurality of selection objects associated with the selected plurality of operation target devices, wherein
the plurality of selection objects is displayed at a location on the operation subject, and
the location includes a body part of the operation subject; and
control an operation target device of the plurality of operation target devices, wherein the operation target device of the plurality of operation target devices is selected through a second device selection based on information associated with a selecting operation by the operation subject to the plurality of selection objects.

2. The information processing apparatus according to claim 1, wherein the plurality of selection objects includes objects corresponding to the plurality of operation target devices selected through the first device selection.

3. The information processing apparatus according to claim 1, wherein the plurality of selection objects is displayed such that the plurality of selection objects is visually recognized in a form based on priority information.

4. The information processing apparatus according to claim 3, wherein the priority information is based on the observation information from which the form of the body is estimated.

5. The information processing apparatus according to claim 3, wherein the priority information is based on biological information of the operation subject or information associated with a surrounding environment of the operation subject.

6. The information processing apparatus according to claim 3, wherein the priority information is based on history information associated with operations of the plurality of operation target devices.

7. The information processing apparatus according to claim 1, wherein the processor is further configured to display operation objects corresponding to the operation target device.

8. The information processing apparatus according to claim 1, wherein the body has a region in which the plurality of selection objects is displayed such that the plurality of selection objects is visually recognized by the operation subject.

9. The information processing apparatus according to claim 1, wherein the location is based on a decision operation of the first device selection by the operation subject.

10. The information processing apparatus according to claim 1, wherein
the processor is further configured to control a notification for the plurality of operation target devices, and
the plurality of operation target devices is selected through the first device selection based on the display of the plurality of selection objects.

11. The information processing apparatus according to claim 10, wherein the notification includes a display output that indicates a linkage between the selected plurality of operation target devices and the plurality of selection objects.

12. The information processing apparatus according to claim 10, wherein the notification includes a sound output from a region in which the selected plurality of operation target devices is situated.

13. The information processing apparatus according to claim 1, wherein
the form of the body includes a form of visual recognition of the operation subject,
the form of visual recognition corresponds to an eyesight of the operation subject, and
the plurality of operation target devices, which falls within at least a part of the eyesight of the operation subject, is selected through the first device selection.

14. The information processing apparatus according to claim 1, wherein
the form of the body includes a posture of the operation subject, and
the plurality of operation target devices, which falls within a region based on the posture of the operation subject, is selected through the first device selection.

15. The information processing apparatus according to claim 1, wherein
the form of the body includes motion of the operation subject, and
the plurality of operation target devices, which falls within a region based on the motion of the operation subject, is selected through the first device selection.

16. The information processing apparatus according to claim 1, wherein
the form of the body includes speech generation from the operation subject, and
the plurality of operation target devices, which falls within a region based on the speech generation from the operation subject, is selected through the first device selection.

17. An information processing method, comprising:
in an information processing apparatus comprising a processor:
estimating a form of a body of an operation subject based on observation information, wherein the form of the body of the operation subject is directed to a plurality of operation target devices;
selecting the plurality of operation target devices by a first device selection based on the estimation;
controlling display of a plurality of selection objects associated with the selected plurality of operation target devices, wherein
the plurality of selection objects is displayed at a location on the operation subject, and
the location includes a body part of the operation subject; and controlling an operation target device of the plurality of operation target devices, wherein the operation target device of the plurality of operation target devices is selected through a second device selection based on information associated with a selecting operation by the operation subject to the plurality of selection objects.

18. A non-transitory computer-readable medium having stored thereon, computer-executable instructions which, when executed by a computer cause the computer to execute operations, the operations comprising:
   estimating a form of a body of an operation subject based on observation information, wherein the form of the body of the operation subject is directed to a plurality of operation target devices;
   selecting the plurality of operation target devices by a first device selection based on the estimation;
   controlling display of a plurality of selection objects associated with the selected plurality of operation target devices, wherein
      the plurality of selection objects is displayed at a location on the operation subject, and
      the location includes a body part of the operation subject; and
   controlling an operation target device of the plurality of operation target devices, wherein the operation target device of the plurality of operation target devices is selected through a second device selection based on information associated with a selecting operation by the operation subject to the plurality of selection objects.

* * * * *